US012659011B2

(12) United States Patent
Zhu et al.

(10) Patent No.: US 12,659,011 B2
(45) Date of Patent: Jun. 16, 2026

(54) METHOD AND APPARATUS FOR TRANSMISSION CONFIGURATION INDICATION SIGNALING

(71) Applicant: Samsung Electronics Co., Ltd., Suwon-si (KR)

(72) Inventors: Dalin Zhu, Allen, TX (US); Emad Nader Farag, Flanders, NJ (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 18/342,529

(22) Filed: Jun. 27, 2023

(65) Prior Publication Data

US 2024/0014881 A1     Jan. 11, 2024

Related U.S. Application Data

(60) Provisional application No. 63/359,162, filed on Jul. 7, 2022, provisional application No. 63/359,158, filed on Jul. 7, 2022.

(51) Int. Cl.
*H04B 7/06* (2006.01)
*H04L 5/00* (2006.01)
(Continued)

(52) U.S. Cl.
CPC ....... *H04B 7/06968* (2023.05); *H04L 5/0051* (2013.01); *H04W 72/0453* (2013.01); *H04W 72/232* (2023.01)

(58) Field of Classification Search
None
See application file for complete search history.

(56) References Cited

U.S. PATENT DOCUMENTS

2020/0287610 A1* 9/2020 Zhou ..................... H04W 72/23
2020/0313819 A1* 10/2020 Zhou ...................... H04L 5/001
(Continued)

FOREIGN PATENT DOCUMENTS

EP          4040891 A1      8/2022
WO      2021063296 A1      4/2021
(Continued)

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
(Continued)

*Primary Examiner* — Otis L Thompson, Jr.

(57) ABSTRACT

Method and apparatuses for supporting or utilizing transmission configuration indication signaling. A method for operating a user equipment (UE) includes receiving a configuration enabling frequency selective beam indication (FSBI) and receiving, in a transmission configuration indication (TCI) state, a plurality of quasi co-location (QCL) parameters corresponding to a plurality of frequency subbands. The method further includes determining, based on the plurality of frequency subbands and the plurality of QCL parameters, one or more reception or transmission filters for receiving or transmitting, respectively, channels in the plurality of frequency subbands.

20 Claims, 10 Drawing Sheets

(51) Int. Cl.
   *H04W 72/0453*       (2023.01)
   *H04W 72/232*        (2023.01)

(56)                References Cited

U.S. PATENT DOCUMENTS

| | | | | |
|---|---|---|---|---|
| 2021/0014848 | A1* | 1/2021 | Davydov | H04W 72/23 |
| 2021/0036817 | A1* | 2/2021 | Bai | H04B 7/0404 |
| 2021/0067306 | A1* | 3/2021 | Ryu | H04W 72/0453 |
| 2021/0126761 | A1* | 4/2021 | Venugopal | H04L 5/0098 |
| 2021/0159966 | A1 | 5/2021 | Xi et al. | |
| 2021/0250947 | A1* | 8/2021 | Ryu | H04L 5/0096 |
| 2022/0015100 | A1 | 1/2022 | Yerramalli et al. | |
| 2022/0030593 | A1 | 1/2022 | Yerramalli et al. | |
| 2022/0173848 | A1* | 6/2022 | Guan | H04L 5/0023 |
| 2022/0217705 | A1* | 7/2022 | Zhou | H04L 5/001 |
| 2022/0225298 | A1* | 7/2022 | Zhang | H04L 5/0048 |
| 2022/0278891 | A1* | 9/2022 | Damnjanovic | H04W 76/30 |
| 2022/0322433 | A1* | 10/2022 | Zhang | H04W 74/0808 |
| 2023/0276450 | A1* | 8/2023 | Abdelghaffar | H04L 5/0048 370/329 |
| 2023/0291533 | A1* | 9/2023 | Zhou | H04B 7/088 |
| 2024/0171328 | A1* | 5/2024 | Nam | H04L 5/0035 |
| 2025/0293832 | A1* | 9/2025 | Ghanbarinejad | H04B 7/0695 |

FOREIGN PATENT DOCUMENTS

| | | | |
|---|---|---|---|
| WO | 2022067640 A1 | 4/2022 | |
| WO | 2022079460 A1 | 4/2022 | |

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

International Search Report and Written Opinion issued Sep. 21, 2023 regarding International Application No. PCT/KR2023/009544, 7 pages.

Extended European Search Report issued Apr. 4, 2025 regarding Application No. 23835850.1, 13 pages.

* cited by examiner

500

Beam Width

503

504

505

Point A

Beam Direction

501

502

Point B

506

550

Beam Width

Beam Direction

METHOD AND APPARATUS FOR TRANSMISSION CONFIGURATION INDICATION SIGNALING

CROSS-REFERENCE TO RELATED AND CLAIM OF PRIORITY

The present application claims priority under 35 U.S.C. § 119(e) to U.S. Provisional Patent Application No. 63/359,158 filed on Jul. 7, 2022, and U.S. Provisional Patent Application No. 63/359,162 filed on Jul. 7, 2022, which are hereby incorporated by reference in their entirety.

TECHNICAL FIELD

The present disclosure relates generally to wireless communication systems and, more specifically, the present disclosure relates to method and apparatuses for transmission configuration indication (TCI) signaling.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance. To meet the demand for wireless data traffic having increased since deployment of 4G communication systems, and to enable various vertical applications, 5G communication systems have been developed and are currently being deployed.

SUMMARY

The present disclosure relates to TCI signaling.

In one embodiment, a user equipment (UE) is provided. The UE includes a transceiver configured to receive a configuration enabling frequency selective beam indication (FSBI) and to receive, in a transmission configuration indication (TCI) state, a plurality of quasi co-location (QCL) parameters corresponding to a plurality of frequency subbands. The UE further includes a processor operably coupled to the transceiver. The processor is configured determine, based on the plurality of frequency subbands and the plurality of QCL parameters, one or more reception or transmission filters for receiving or transmitting, respectively, channels in the plurality of frequency subbands.

In another embodiment, a base station (BS) is provided. The BS includes a transceiver configured to transmit a configuration enabling FSBI and transmit, in a TCI state, a plurality of QCL parameters corresponding to a plurality of frequency subbands. The BS further includes a processor operably coupled to the transceiver. The processor is configured to determine, based on the plurality of frequency subbands and the plurality of QCL parameters, one or more reception or transmission filters for receiving or transmitting, respectively, channels in the plurality of frequency subbands.

In yet another embodiment, a method for operating a UE is provided. The method includes receiving a configuration enabling FSBI and receiving, in a TCI state, a plurality of QCL parameters corresponding to a plurality of frequency subbands. The method further includes determining, based on the plurality of frequency subbands and the plurality of QCL parameters, one or more reception or transmission filters for receiving or transmitting, respectively, channels in the plurality of frequency subbands.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-10, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v16.1.0, "NR; Physical channels and modulation;" [2] 3GPP TS 38.212 v16.1.0, "NR; Multiplexing and Channel coding;" [3] 3GPP TS 38.213 v16.1.0, "NR; Physical Layer Procedures for Control;" [4] 3GPP TS 38.214 v16.1.0, "NR; Physical Layer Procedures for Data;" [5] 3GPP TS 38.321 v16.1.0, "NR; Medium Access Control (MAC) protocol specification;" and [6] 3GPP TS 38.331 v16.1.0, "NR; Radio Resource Control (RRC) Protocol Specification."

Figure 1:
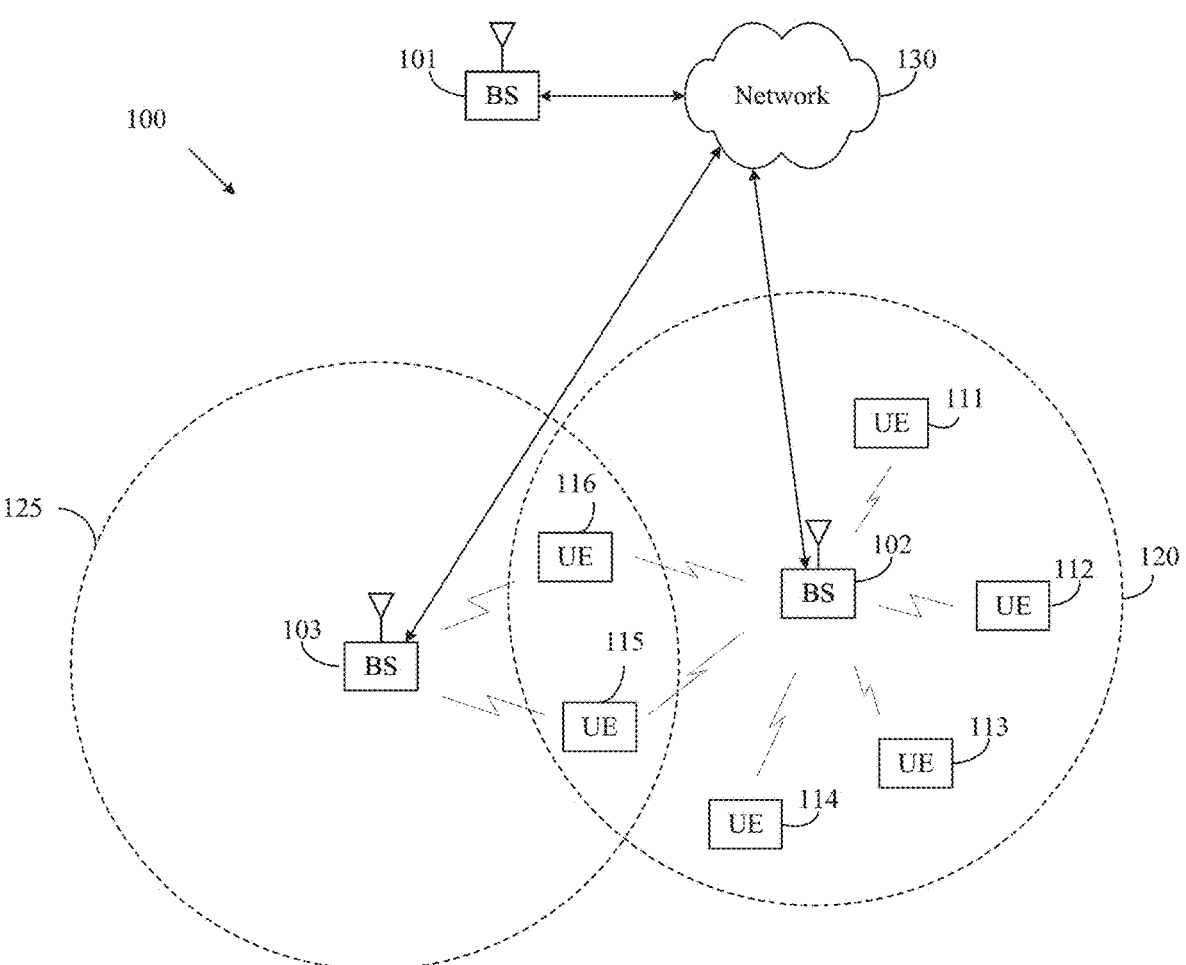
FIG. 1 illustrates an example wireless network according to embodiments of the present disclosure.
Figure 2:
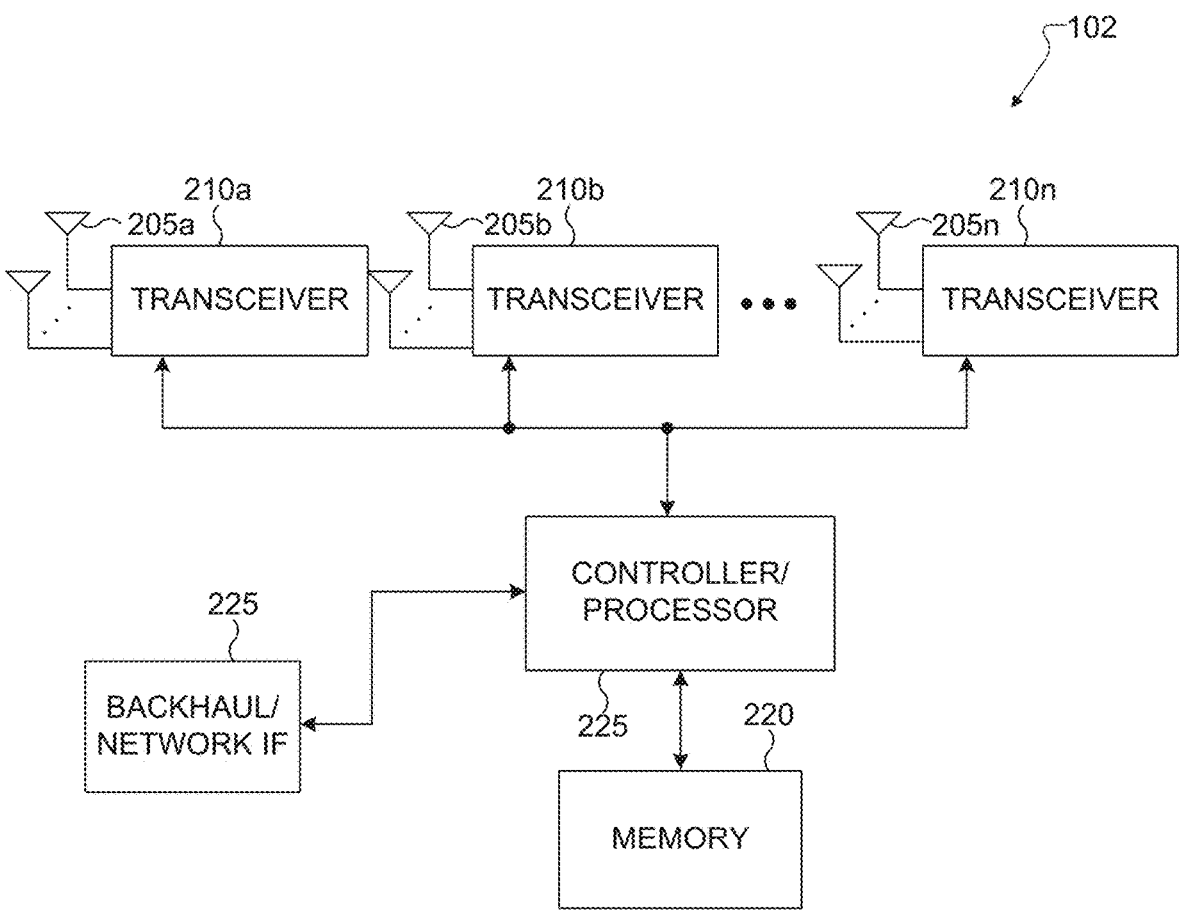
FIG. 2 illustrates an example gNodeB (gNB) according to embodiments of the present disclosure.
Figure 3:
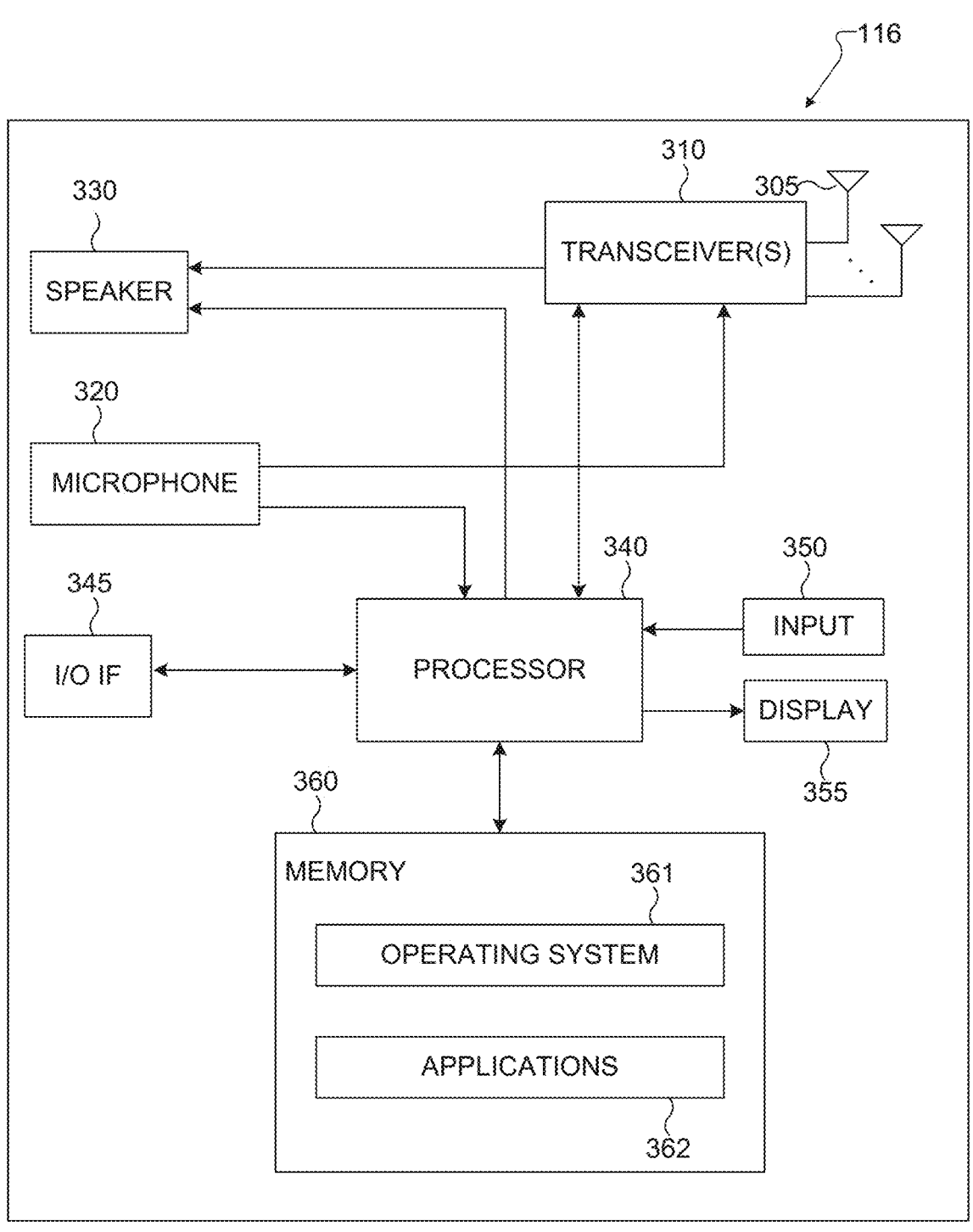
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for receiving or utilizing transmission configuration indication signaling. In certain embodiments, one or more of the BSs 101-103 include circuitry, programing, or a combination thereof for supporting transmission configuration indication signaling.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the wireless network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for transmission configuration indication signaling. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the ULE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for receiving or utilizing transmission configuration indication signaling as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
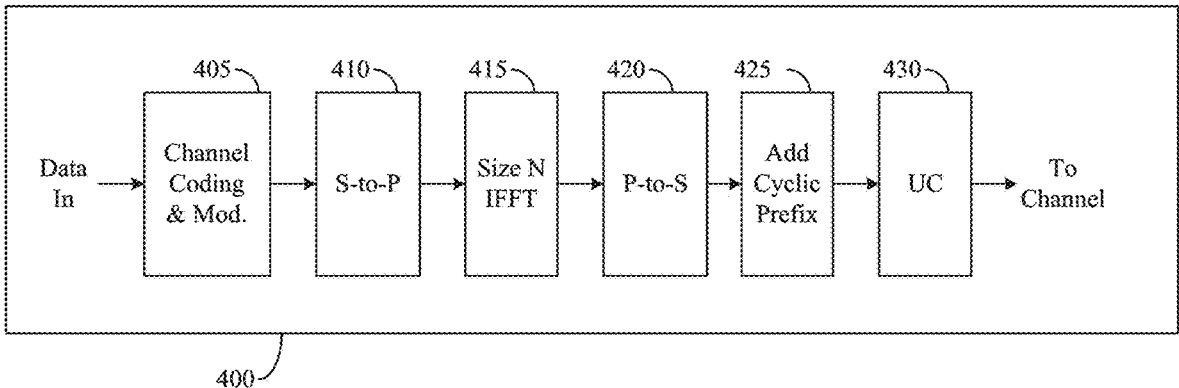
FIGS. 4A and 4B illustrate an example of a wireless transmit and receive paths according to embodiments of the present disclosure.
Figure 4B:
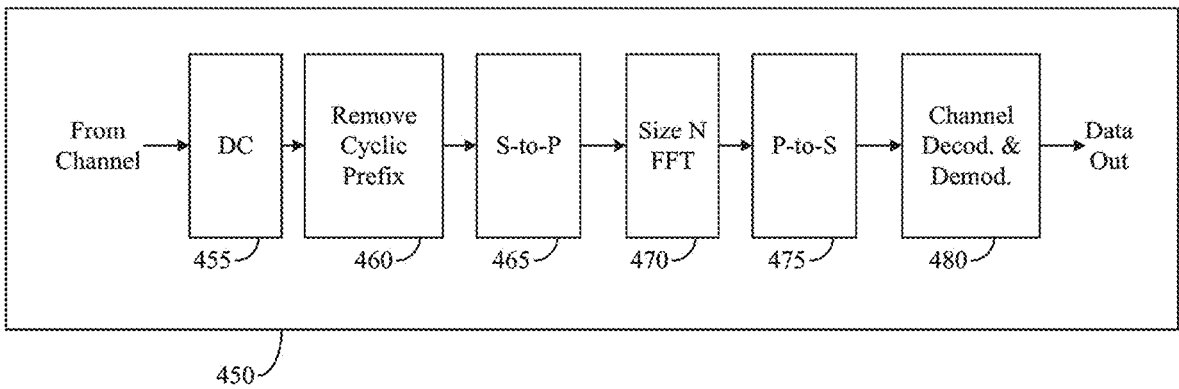

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured to support transmission configuration indication signaling as described in embodiments of the present disclosure.

As illustrated in FIG. 4A the transmit path 400 includes a channel coding and modulation block 205, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

As illustrated in FIG. 4B, in the transmit path 400 the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

A transmitted RF signal from the gNB 102 arrives at the UE 116 after passing through the wireless channel, and reverse operations to those at the gNB 102 are performed at the UE 116. The down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In embodiments of the present disclosure, a beam is determined by either a transmission configuration indicator (TCI) state that establishes a quasi-colocation (QCL) relationship between a source reference signal (RS) (e.g., single sideband (SSB) and/or Channel State Information Reference Signal (CSI-RS)) and a target RS or a spatial relation information that establishes an association to a source RS, such as SSB or CSI-RS or SRS. In either case, the ID of the source reference signal identifies the beam. The TCI state and/or the spatial relation reference RS can determine a spatial RX filter for reception of downlink channels at the UE 116, or a spatial TX filter for transmission of uplink channels from the UE 116.

Figure 5A:
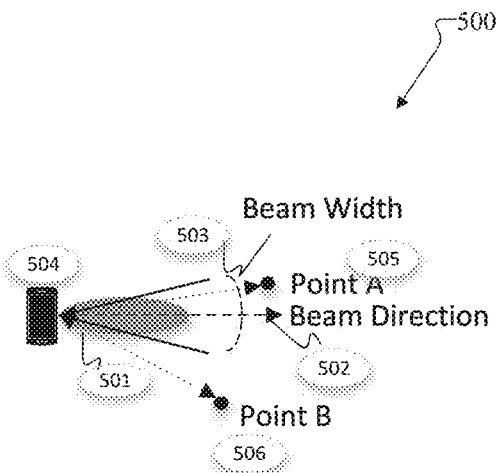
FIG. 5A illustrates an example of a wireless system according to embodiments of the present disclosure.

As illustrated in FIG. 5A, in a wireless system 500, a beam 501 for a device 504 can be characterized by a beam direction 502 and a beam width 503. For example, the device 504 (or UE 116) transmits RF energy in a beam direction and within a beam width. The device 504 receives RF energy in a beam direction and within a beam width. As illustrated in FIG. 5A, a device at point A 505 can receive from and transmit to device 504 as Point A is within a beam width and direction of a beam from device 504. As illustrated in FIG. 5A, a device at point B 506 cannot receive from and transmit to device 504 as Point B 506 is outside a beam width and direction of a beam from device 504. While FIG. 5A, for illustrative purposes, shows a beam in 2-dimensions (2D), it should be apparent to those skilled in the art, that a beam can be in 3-dimensions (3D), where the beam direction and beam width are defined in space.

Figure 5B:
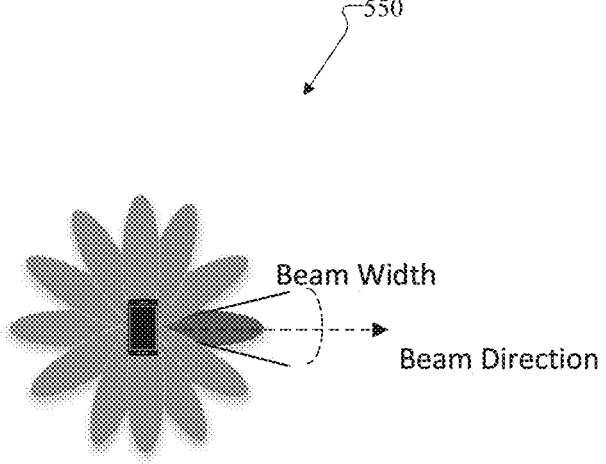
FIG. 5B illustrates an example of a multi-beam operation according to embodiments of the present disclosure.

FIG. 5B illustrates an example of a multi-beam operation 550 according to embodiments of the present disclosure. For example, the multi-beam operation 550 can be utilized by UE 116 of FIG. 3. This example is for illustration only and other embodiments can be used without departing from the scope of the present disclosure.

In a wireless system, a device can transmit and/or receive on multiple beams. This is known as "multi-beam operation". While FIG. 5B, for illustrative purposes, a beam is in 2D, it should be apparent to those skilled in the art, that a beam can be 3D, where a beam can be transmitted to or received from any direction in space.

Figure 6:
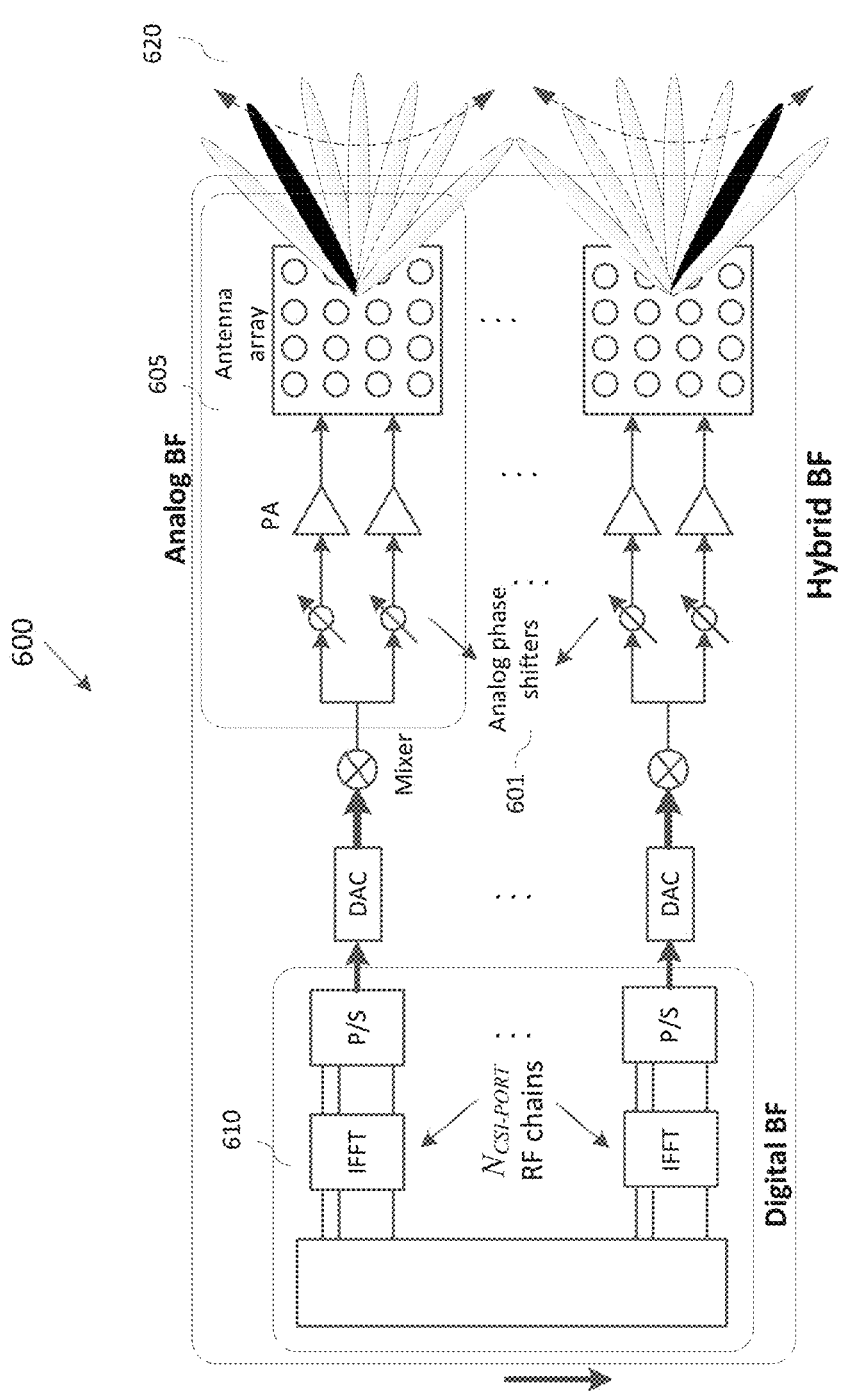
FIG. 6 illustrates an example of a transmitter structure for beamforming according to embodiments of the present disclosure.

FIG. 6 illustrates an example of a transmitter structure 600 for beamforming according to embodiments of the present disclosure. In certain embodiments, one or more of gNB 102 or UE 116 includes the transmitter structure 600. For example, one or more of antenna 205 and its associated systems or antenna 305 and its associated systems can be included in transmitter structure 600. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 6. Then, one CSI-RS port can be mapped onto a large number of antenna elements that can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or slots/subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase a precoding gain. While analog beams are wideband (hence not frequency-selective), digital precoding can be varied across frequency subbands or resource blocks. Receiver operation can be conceived analogously.

Since the transmitter structure 600 of FIG. 6 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 6 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 600 for beamforming is for illustration only and other embodiments can be used without departing from the scope of the present disclosure.

This disclosure provides various design aspects for frequency-selective beam management using a JPTA system as an example implementation, wherein one or more (analog) beams can be simultaneously transmitted/received over one or more frequency subbands. Specifically, various beam measurement and reporting configurations, beam indication mechanisms, and the corresponding signaling medium/procedures are specified/customized to enable frequency-selective beam management.

The present disclosure recognizes that due to the rising demand for traffic, wireless systems are moving towards higher frequencies of operation, such as millimeter-wave (mm-wave) and terahertz (THz) frequencies, where abundant spectrum is available, but the higher frequencies also suffer from a high channel propagation loss and therefore require a large antenna array to create sufficient beamforming gain to ensure a sufficient link budget for operation. Thus, these high frequency systems are usually built with a large antenna array at the transmitter and/or the receiver containing many individual antenna elements. At the operating bandwidths of these mm-wave and THz systems, the cost and power consumption of mixed-signal components such as ADCs and/or DACs also grow tremendously. Thus, fully digital transceiver implementations, where each antenna element is fed by a dedicated RF chain, are impractical. To keep the hardware cost and power consumption of such large antenna arrays manageable, typically an analog beamforming or hybrid beamforming architecture is adopted where the large antenna array is fed with a much smaller number of RF chains via the use of analog hardware such as phase-shifters. This reduces the number of mixed-signal components which significantly reduces the cost, size, and power consumption of the transceivers. When transmitting a signal at the transmitter, a combination of digital beamforming before DAC and analog beamforming using the phase-shifters is used to create the overall beam shape in the desired direction. Similarly, when receiving a signal at the receiver, a combination of analog beamforming using phase-shifters and digital beamforming after ADC is used to create the overall beam shape in the desired direction. However other approaches usually use a phase-shifter array or a combination of phase-shifters and switches to connect the large antenna array to a few number of RF chains.

Figure 7:
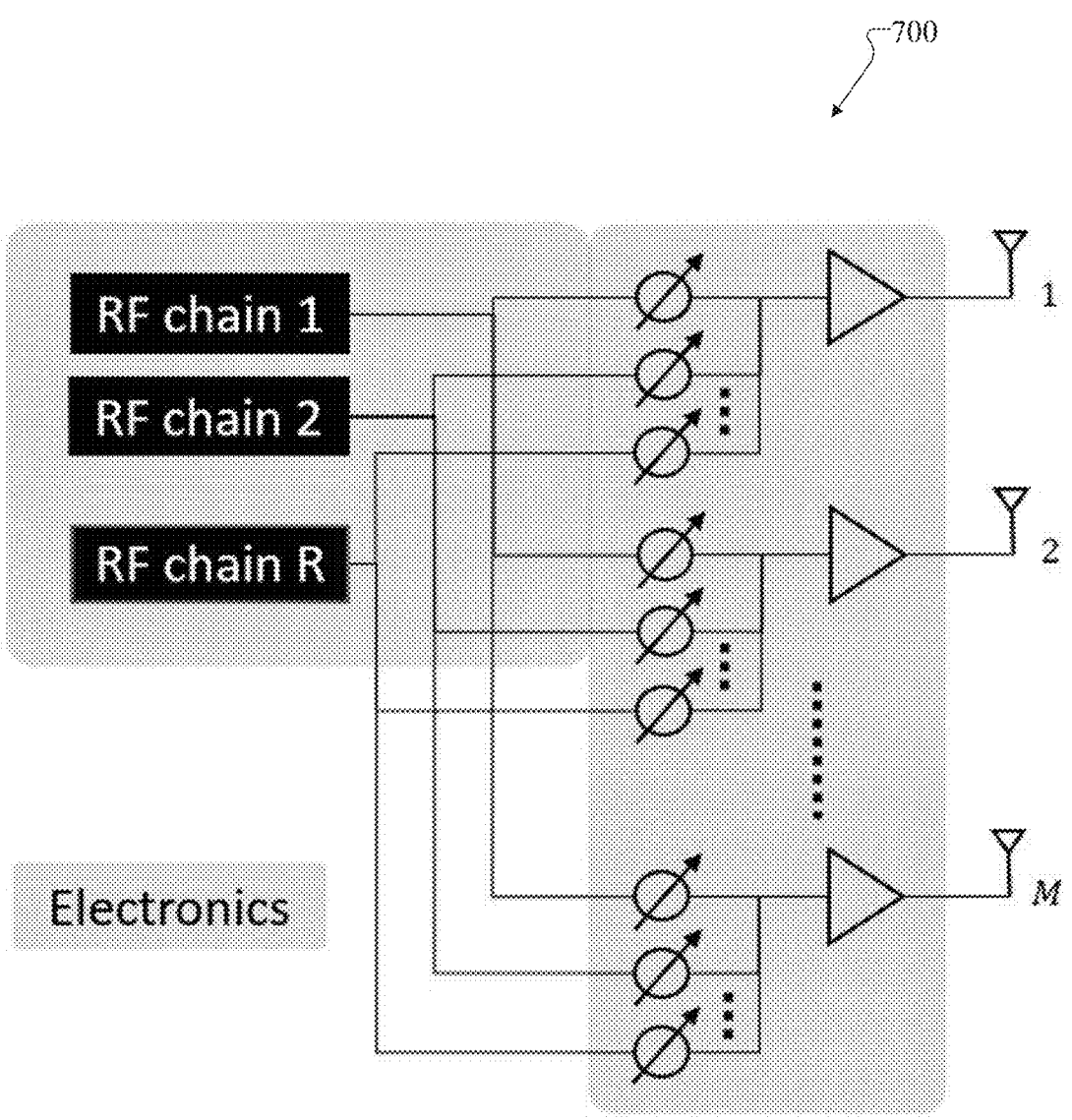
FIG. 7 illustrates an example of an array architecture for hybrid beamforming according to embodiments of the present disclosure.

FIG. 7 illustrates an example architecture 700 for an array architecture for hybrid beamforming according to embodiments of the present disclosure. For example, the architecture 700 may be located in the gNB 101 or the UE 116 in FIG. 1. This example is for illustration only and other embodiments can be sued without departing from the scope of the present disclosure.

With reference to FIG. 7, the case of hybrid beamforming at a BS with a single RF chain, i.e., R=1 is discussed. Note that with M antennas, the maximum possible beamforming gain in any direction is M. For the BS 102 to provide signal coverage to the UEs in the cell, the BS 102 would perform beam sweeping over time for its frequency-flat beams.

An alternative to frequency-flat hybrid beamforming is frequency-dependent hybrid beamforming, which we call JPTA beamforming. Note that, here, frequency-dependent beamforming refers to a technique where different components of the input signal may encounter a differently shaped analog beam based on their frequency.

Figure 8:
FIG. 8 illustrates an example of joint phase-time array (JPTA) based beamforming according to embodiments of the present disclosure.
Figure 8:
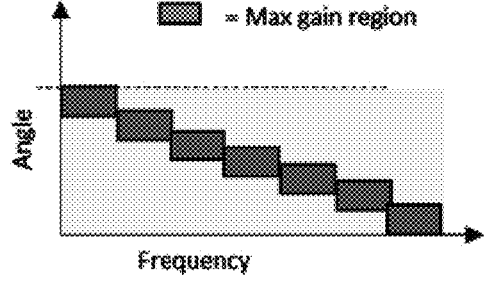
Figure 8:
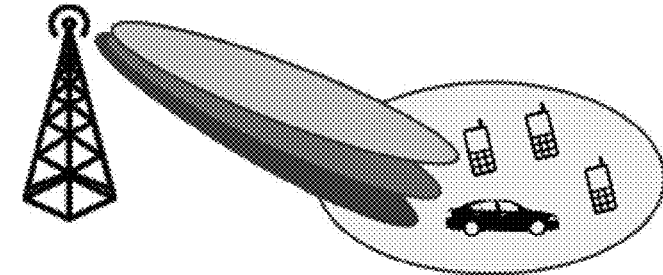

FIG. 8 illustrates an example of a system 800 for JPTA based beamforming according to embodiments of the present disclosure. For example, the system 800 may be located in the wireless network 100 in FIG. 1. This example is for illustration only and other embodiments can be used without departing from the scope of the present disclosure.

In one embodiment of JPTA beamforming, the maximum gain region of the beam sweeps over an angle range as the signal frequency varies. At any signal frequency f, the desired beam creates the maximum possible array-gain in one angular direction $\theta(f)$. As f varies linearly over the system bandwidth, the angular direction $\theta(f)$ also sweeps linearly over a certain angular region $[\theta_0 - \Delta\theta/2, \theta_0 + \Delta\theta/2]$ as shown in FIG. 8. In this disclosure, we assume such behavior of JPTA beamforming; however, it should be noted that the embodiments in this disclosure can be applied to other behaviors of JPTA beamforming 800 as well. This example is for illustration only and other embodiments can be used without departing from the scope of the present disclosure.

Figure 9:
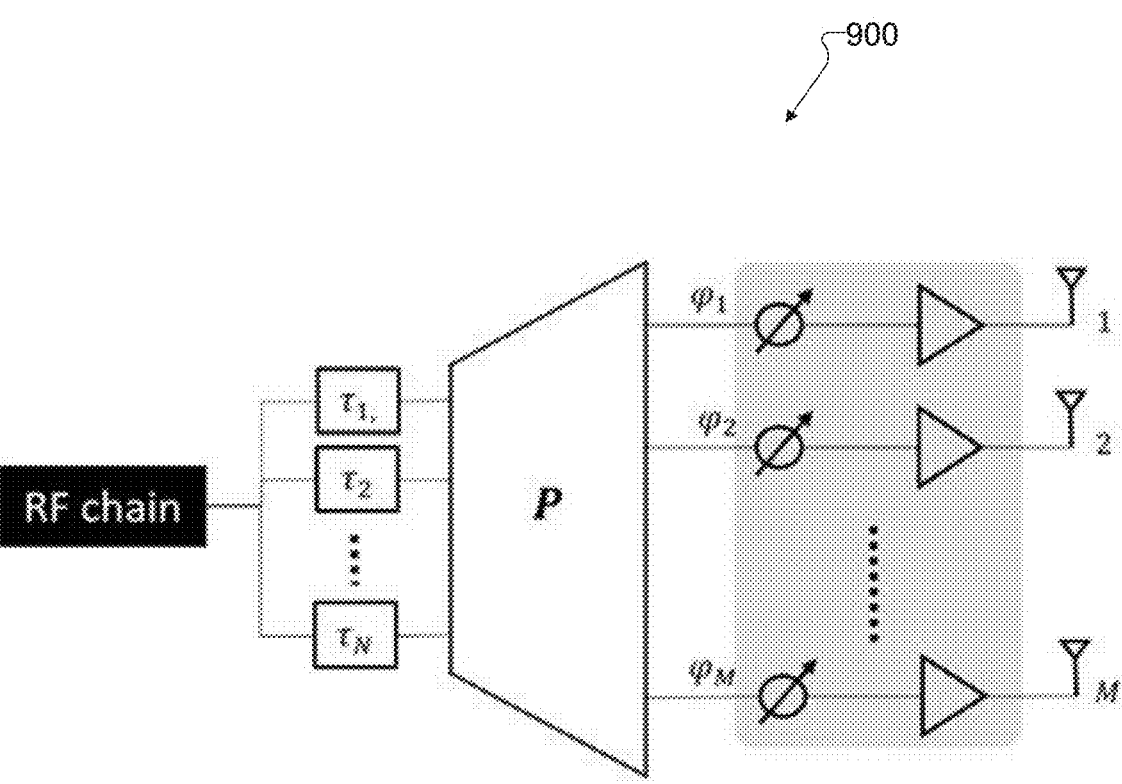
FIG. 9 illustrates an example of an array architecture for JPTA based beamforming according to embodiments of the present disclosure.

FIG. 9 illustrates an example of an array architecture for JPTA based beamforming 900 according to embodiments of the present disclosure. For example, the architecture 900 may be located in the gNB 101 or the UE 116 in FIG. 1. This example is for illustration only and other embodiments can be used without departing from the scope of the present disclosure.

In one embodiment, a layout with a single base-station (BS) serving many users in its coverage area and operating with a system bandwidth W around a center frequency $f_0$ is provided. The BS 102 is assumed to have a uniform linear antenna array having M elements, and $N_{RF}=1$ RF chain. Note that the disclosure can be directly extended to planar array configurations. The antenna spacing is half-wavelength at the center frequency $f_0$. Each of the M antennas has a dedicated phase-shifter, and they are connected to the single RF chain via a network of $N \le M$ Time Division Duplexing (TTDs) as shown in FIG. 9. Here P is a fixed $M \times N$ mapping matrix, where each row m has one non-zero entry and determines which of the N TTDs antenna m is connected to. The TTDs are assumed to be configurable, with a delay variation range of $0 \le \tau \le \kappa W$, where $\kappa$ is a design parameter to be selected. The phase-shifters are assumed to have unit magnitude and have arbitrarily reconfigurable phase $-\pi \le \phi < \pi$. Transmission in both uplink and downlink directions is performed using OFDM with K subcarriers indexed as $$\mathcal{K} := \left\{ \left\lfloor \frac{1-K}{2} \right\rfloor, \ldots, \left\lfloor \frac{K-1}{2} \right\rfloor \right\}.$$

Then, the M×1 downlink TX signal on sub-carrier k∈ K for a representative OFDM symbol can be expressed as $$x_k = \frac{1}{\sqrt{M}} \begin{bmatrix} e^{j\varphi_1} & \cdots & 0 \\ \vdots & \ddots & \vdots \\ 0 & \cdots & e^{j\varphi_M} \end{bmatrix} P \begin{bmatrix} e^{j2\pi f_k \tau_1} \\ \vdots \\ e^{j2\pi f_k \tau_N} \end{bmatrix} \alpha_k s_k = TP d_k \alpha_k s_k$$

where $S_k$ and $\alpha_k$ are the scalar data and digital beamforming on the k-th subcarrier, $f_k$ is the frequency of the k-th sub-carrier (including the carrier frequency), $\tau_n$ is the delay of the n-th TTD and $\phi_m$ is the phase of the m phase-shifter connected to the m-th antenna. Note that from the equation above the total transmit power of the BS 102 can be given by $P_{sum} = \Sigma_{k \in K} |\alpha_k|^2$. Note that for this JPTA architecture, the effective downlink unit-norm analog beamformer on sub-carrier k is $e_k = TP d_k$, where the M×M diagonal matrix T captures the effect of phase-shifters and the N×1 vector $d_k$ captures the effect of TTDs. It can be shown that the same beamformer is also applicable at the BS 102 for an uplink scenario.

It is evident that when JPTA beamforming implementation is utilized, a significant departure from analog-based beam management occurs. That is, while analog beam management applies one analog beam for the entire system bandwidth or bandwidth part, JPTA beamforming 800 implementation allows the system to use different analog beams for different parts of the system bandwidth or bandwidth part which amounts to "frequency-selective" beam management (FSBM). Therefore, there is a need for enabling frequency-selective beam management operation wherein different analog beams (associated with TCI states, source RS resources, and/or measurement RS resources) can be utilized for different parts/portions of the system bandwidth or bandwidth parts.

A UE could be configured by the network 130 with one or more RS resources for frequency-selective beam measurement for FSBM, wherein one RS resource (e.g., corresponding to a SSB resource index or a non-zero power (NZP) CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or medium access control (MAC) control elements (CE) command and/or dynamic downlink control information (DCI) based signaling. For instance, a higher layer parameter, e.g., denoted by FreqSelectiveBeamMeasurement, could be indicated/provided in CSI-ResourceConfig to turn on/off the frequency-selective beam measurement for FSBM.

In one example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in a CSI resource setting provided by CSI-ResourceConfig, a CSI resource set (e.g., provided by CSI-SSB-ResourceSet or NZP-CSI-RS-ResourceSet) comprising K≥1 CSI-RS resources (e.g., SSB resources or NZP CSI-RS resources) for FSBM. In particular, the k-th CSI-RS resource in the resource set could correspond to a set of $N_k \geq 1$ beams (and therefore, the corresponding set of $N_k \geq 1$ frequency subbands), where k=1, . . . , K. In the present disclosure, the set of $N_k \geq 1$ frequency-selective beams can also be referred to as a frequency-selective multi-beam. For a CSI-RS resource configured in the resource set for FSBM, the UE 116 could be indicated/configured by the network 130 with the corresponding/associated frequency subbands including their bandwidths/sizes, starting RBs and etc.; this indication/configuration could be via higher layer RRC signaling (e.g., indicated/configured in the same CSI resource setting/set provided by CSI-ResourceConfig/CSI-SSB-ResourceSet/NZP-CSI-RS-ResourceSet) and/or MAC CE command and/or dynamic DCI based signaling. There are various means to indicate/configure the frequency subbands corresponding/associated with the CSI-RS resource.

For example, the higher layer parameter that configures a CSI-RS resource (e.g., the k-th CSI-RS resource in the resource set), e.g., NZP-CSI-RS-Resource, could indicate/include $N_k$ CSI-RS resource mapping configurations each for a frequency subband. A CSI-RS resource mapping configuration (e.g., provided by CSI-RS-ResourceMapping) could contain/comprise at least a frequency subband index, a frequency domain allocation of REs for a frequency subband (e.g., provided by frequencyDomainAllocation) and a frequency domain allocation of RBs for a frequency subband (e.g., provided by CSI-FrequencyOccupation). The frequency domain allocation of RBs for a frequency subband could contain/comprise at least a starting RB (provided by startingRB) and a number of PRBs (provided by nrof-RBs) across which the corresponding frequency subband spans. For this case, the higher layer parameter NZP-CSI-RS-Resource that indicates/provides the $N_k$ CSI-RS resource mapping configurations could also include/provide/indicate the $N_k$ frequency subband indexes each associated/mapped to a CSI-RS resource mapping configuration indicated/configured therein. Alternatively, one or more of the discussed herein $N_k$ CSI-RS resource mapping configurations could be indicated in one or more DCIs, via one or more new DCI fields or by repurposing one or more bits/codepoints of one or more existing DCI fields in the DCI(s). Optionally, one or more of the discussed herein $N_k$ CSI-RS resource mapping configurations could be indicated/provided/included in one or more MAC CE commands; for this case, a MAC CE command could also include/indicate/provide the corresponding CSI-RS resource ID and/or frequency subband index(es). The $N_k$ CSI-RS resource mapping configurations discussed herein and the $N_k$ frequency subbands for the k-th CSI-RS resource in the resource set could be one-to-one mapped; for instance, the first CSI-RS resource mapping configuration could correspond to the first frequency subband, the second CSI-RS resource mapping configuration could correspond to the second frequency subband, and so on, and the $N_k$-th CSI-RS resource mapping configuration could correspond to the $N_k$-th frequency subband. Alternatively, the UE 116 could be indicated/provided by the network 130, e.g., via higher layer RRC signaling/parameter and/or MAC CE command and/or dynamic DCI based signaling, the mapping/association between the $N_k$ CSI-RS resource mapping configurations and the $N_k$ frequency subbands configured for the k-th CSI-RS resource in the CSI resource set for FSBM.

For another example, the higher layer parameter that provides a CSI-RS resource mapping configuration for a CSI-RS resource (e.g., the k-th CSI-RS resource in the resource set), e.g., CSI-RS-ResourceMapping, could indicate/include $N_k$ frequency domain allocations of REs each for a frequency subband and provided byfrequencyDomain-Allocation. Furthermore, the CSI-RS resource mapping configuration provided by CSI-RS-ResourceMapping could also indicate/include $N_k$ frequency domain allocations of RBs each for a frequency subband and provided by CSI-FrequencyOccupation. Each frequency domain allocation of RBs for a frequency subband, and therefore, the corresponding higher layer parameter CSI-FrequencyOccupation, could contain/comprise at least a starting RB (provided by startingRB) and a number of PRBs (provided by nrofRBs) across which the corresponding frequency subband spans. For this case, the higher layer parameter CSI-RS-ResourceMapping could also include/provide/indicate $N_k$ frequency subband indexes each associated/mapped to a frequency domain allocation of REs and/or a frequency domain allocation of RBs indicated/configured therein. Or the higher layer parameter frequencyDomainAllocation or CSI-FrequencyOccupation could provide/indicate/include a frequency subband index. Alternatively, one or more of the discussed herein $N_k$ frequency domain allocations of REs and/or one or more of the discussed herein $N_k$ frequency domain allocations of RBs could be indicated in one or more DCIs, via one or more new DCI fields or by repurposing one or more bits/codepoints of one or more existing DCI fields in the DCI(s). Optionally, one or more of the discussed herein $N_k$ frequency domain allocations of REs and/or one or more of the discussed herein $N_k$ frequency domain allocations of RBs could be indicated/provided/included in one or more MAC CE commands; for this case, a MAC CE command could also include/indicate/provide the corresponding CSI-RS resource ID and frequency subband index(es). The $N_k$ frequency domain allocations of REs/RBs discussed herein and the $N_k$ frequency subbands for the k-th CSI-RS resource in the resource set could be one-to-one mapped; for instance, the first frequency domain allocations of REs/RBs could correspond to the first frequency subband, the second frequency domain allocations of REs/RBs could correspond to the second frequency subband, and so on, and the $N_k$-th frequency domain allocations of REs/RBs could correspond to the $N_k$-th frequency subband. Alternatively, the UE 116 could be indicated/provided by the network, e.g., via higher layer RRC signaling/parameter and/or MAC CE command and/or dynamic DCI based signaling, the mapping/association between the $N_k$ frequency domain allocations of REs/RBs and the $N_k$ frequency subbands configured for the k-th CSI-RS resource in the CSI resource set for FSBM.

Yet for another example, the higher layer parameterfrequencyDomainAllocation could indicate/include $N_k$ frequency domain allocations of REs each for a frequency subband. In addition, the higher layer parameter CSI-FrequencyOccupation could indicate/include $N_k$ frequency domain allocations of RBs each for a frequency subband. For instance, the higher layer parameter CSI-FrequencyOccupation could provide $N_k$ starting RBs each for a frequency subband and provided by startingRB, and/or $N_k$ nrofRBs' each providing the number of PRBs across which the corresponding frequency subband spans. For this case, the higher layer parameter frequencyDomainAllocation or CSI-FrequencyOccupation could also include/provide/indicate $N_k$ frequency subband indexes each associated/mapped to a frequency domain allocation of REs and/or a frequency domain allocation of RBs indicated/configured therein. Alternatively, one or more of the discussed herein $N_k$ frequency domain allocations of REs and/or one or more of the discussed herein $N_k$ frequency domain allocations of RBs (including $N_k$ startingRB's and/or $N_k$ nrofRBs') could be indicated in one or more DCIs, via one or more new DCI fields or by repurposing one or more bits/codepoints of one or more existing DCI fields in the DCI(s). Optionally, one or more of the discussed herein $N_k$ frequency domain allocations of REs and/or one or more of the discussed herein $N_k$ frequency domain allocations of RBs (including $N_k$ startingRB's and/or $N_k$ nrofRBs') could be indicated/provided/included in one or more MAC CE commands; for this case, a MAC CE command could also include/indicate/provide the corresponding CSI-RS resource ID and/or frequency subband index(es). The $N_k$ frequency domain allocations of REs/RBs (e.g., $N_k$ startingRB's and/or $N_k$ nrofRBs') discussed herein and the $N_k$ frequency subbands for the k-th CSI-RS resource in the resource set could be one-to-one mapped; for instance, the first frequency domain allocations of REs/RBs (e.g., the first startingRB and/or the first nrofRBs) could correspond to the first frequency subband, the second frequency domain allocations of REs/RBs (e.g., the second startingRB and/or the second nrofRBs) could correspond to the second frequency subband, and so on, and the $N_k$-th frequency domain allocations of REs/RBs (e.g., the $N_k$-th startingRB and/or the $N_k$-th nrofRBs) could correspond to the $N_k$-th frequency subband. Alternatively, the UE 116 could be indicated/provided by the network 130, e.g., via higher layer RRC signaling/parameter and/or MAC CE command and/or dynamic DCI based signaling, the mapping/association between the $N_k$ frequency domain allocations of REs/RBs (e.g., $N_k$ startingRB's and/or $N_k$ nrofRBs') and the $N_k$ frequency subbands configured for the k-th CSI-RS resource in the CSI resource set for FSBM.

Yet for another example, the UE 116 could receive from the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, one or more bitmaps (e.g., $N_k$ bitmaps) each for a frequency subband corresponding/associated to the CSI-RS resource (e.g., the k-th CSI-RS resource in the resource set). Each bit position/entry in a bitmap could correspond to a PRB or PRB index among all the PRBs across which the corresponding CSI-RS resource spans. If a bit position/entry of a bitmap is set to '1' (or '0'), the corresponding PRB or PRB index is allocated for the frequency subband corresponding/associated with the bitmap. A bitmap for a frequency subband could contain/comprise more than one bit positions/entries set to '1' (or '0'). Different bitmaps for a CSI-RS resource could have the same bit position(s)/entry(s) set to '1' (or '0') meaning that different frequency subbands for a CSI-RS resource could be overlapped in frequency. The higher layer parameter(s), e.g., NZP-CSI-RS-Resource, CSI-RS-ResourceMapping, or CSI-FrequencyOccupation, that provides the one or more bitmaps could also include/provide/indicate $N_k$ frequency subband indexes each associated/mapped to a bitmap. If the frequency subband size/allocation for a CSI-RS resource (e.g., the one or more bitmaps discussed herein) is indicated via one or more DCIs, one or more new DCI fields can be introduced to indicate the one or more bitmaps; alternatively, one or more bits/codepoints of one or more existing DCI fields could be repurposed to indicate the one or more bitmaps. If the frequency subband size/allocation for a CSI-RS resource (e.g., the one or more bitmaps discussed herein) is indicated in one or more MAC CE commands, a MAC CE command could also indicate/provide/include the corresponding CSI-RS resource ID and/or frequency subband index(es). The $N_k$ bitmaps discussed herein and the $N_k$ frequency subbands for the k-th CSI-RS resource in the resource set could be one-to-one mapped; for instance, the first bitmap could correspond to the first frequency subband, the second bitmap could correspond to the second frequency subband, and so on, and the $N_k$-th bitmap could correspond to the $N_k$-th frequency subband. Alternatively, the UE 116 could be indicated/provided by the network 130, e.g., via higher layer RRC signaling/parameter and/or MAC CE command and/or dynamic DCI based signaling, the mapping/association between the $N_k$ bitmaps and the $N_k$ frequency subbands configured for the k-th CSI-RS resource in the CSI resource set for FSBM.

Yet for another example, the UE 116 could receive from the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, a bitmap for one or more of the frequency subbands corresponding/associated to the CSI-RS resource (e.g., the k-th CSI-RS resource in the resource set). Each bit position/entry in the bitmap could correspond to a PRB or PRB index among all the PRBs across which the corresponding CSI-RS resource spans. Furthermore, each bit position/entry in the bitmap could be mapped/associated with a frequency subband for the CSI-RS resource. The mapping/association between the bit positions/entries in the bitmap and the frequency subbands for the CSI-RS resource could be fixed. For instance, the bitmap can be partitioned into $N_k$ parts each comprising one or more bit positions/entries; for this case, the first part of the bitmap could correspond to the first frequency subband for the CSI-RS resource, the second part of the bitmap could correspond to the second frequency subband for the CSI-RS resource, and so on, and the $N_k$-th part of the bitmap could correspond to the $N_k$-th frequency subband for the CSI-RS resource; the UE 116 could be provided/indicated/configured by the network 130, via higher layer RRC signaling and/or MAC CE command and/or dynamic DCI based signaling, how the bitmap is partitioned. Alternatively, the UE 116 could be provided/indicated/configured by the network 130, via higher layer RRC signaling and/or MAC CE command and/or dynamic DCI based signaling, the mapping/association between the bit positions/entries in the bitmap and the frequency subbands for the CSI-RS resource. If a bit position/entry of a bitmap is set to '1' (or '0'), the corresponding PRB or PRB index is allocated for the frequency subband corresponding/associated with the bit position/entry. A bitmap for a CSI-RS resource could contain/comprise more than one bit positions/entries set to '1' (or '0'). The higher layer parameter(s), e.g., NZP-CSI-RS-Resource, CSI-RS-ResourceMapping, or CSI-Frequency-Occupation, that provides the bitmap could also include/provide/indicate $N_k$ frequency subband indexes each associated/mapped to one or more bit positions/entries (e.g., a part discussed herein) in the bitmap. If the frequency subband size/allocation for a CSI-RS resource (e.g., the bitmap discussed herein) is indicated via one or more DCIs, one or more new DCI fields can be introduced to indicate the bitmap; alternatively, one or more bits/codepoints of one or more existing DCI fields could be repurposed to indicate the bitmap. If the frequency subband size/allocation for a CSI-RS resource (e.g., the bitmap discussed herein) is indicated in one or more MAC CE command(s), a MAC CE command could also indicate/provide/include the corresponding CSI-RS resource ID and/or frequency subband index(es).

Yet for another example, the UE 116 could receive from the network 130 one or more MAC CE activation commands (e.g., $N_k$ MAC CE activation commands) each for a frequency subband corresponding/associated to the CSI-RS resource (e.g., the k-th CSI-RS resource in the resource set). Each MAC CE activation command could activate one or more PRBs or PRB indexes—from all the PRBs across which the corresponding CSI-RS resource spans—for the corresponding/associated frequency subband. For this case, each MAC CE activation command could include/provide/indicate the corresponding CSI-RS resource ID and/or frequency subband index(es).

Yet for another example, the UE 116 could receive from the network 130 a MAC CE activation command activating one or more PRBs or PRB indexes—from all the PRBs across which the corresponding CSI-RS resource spans—for one or more of the frequency subbands corresponding/associated to a CSI-RS resource. For instance, for the k-th CSI-RS resource in the resource set, the MAC CE activation command could activate one or more PRBs or PRB indexes—from all the PRBs across which the corresponding CSI-RS resource spans—for the first frequency subband corresponding/associated to the CSI-RS resource, one or more PRBs or PRB indexes—from all the PRBs across which the corresponding CSI-RS resource spans—for the second frequency subband corresponding/associated to the CSI-RS resource, and so on, and one or more PRBs or PRB indexes—from all the PRBs across which the corresponding CSI-RS resource spans—for the $N_k$-th frequency subband corresponding/associated to the CSI-RS resource. For this case, the MAC CE activation command could include/provide/indicate the corresponding CSI-RS resource ID.

Yet for another example, the frequency subbands for the CSI-RS resource—e.g., the $N_k$ frequency subbands for the k-th CSI-RS resource in the resource set—could have the same bandwidth/size. For this case, the UE 116 could be provided by the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, a common frequency subband bandwidth/size (e.g., in number of PRBs) and/or $N_k$ and/or one or more starting RBs of one or more frequency subbands. In addition, the frequency subbands for the CSI-RS resource—e.g., the $N_k$ frequency subbands for the k-th CSI-RS resource in the resource set—could equally divide the total PRBs across which the corresponding CSI-RS resource spans. For this case, the UE 116 could be provided by the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, $N_k$ and/or one or more starting RBs of one or more frequency subbands.

Yet for another example, the higher layer parameter that configures a CSI resource set for FSBM, e.g., CSI-SSB-ResourceSet or NZP-CSI-RS-ResourceSet, could include/indicate K sets of frequency domain resource allocation parameters each corresponding/associated to a CSI-RS resource configured therein. A set of frequency domain resource allocation parameters could comprise at least one or more (e.g., $N_k$) frequency domain allocations of REs (e.g., each provided by frequencyDomainAllocation) for one or more frequency subbands corresponding/associated to a CSI-RS resource (e.g., the k-th CSI-RS resource in the resource set) and one or more (e.g., $N_k$) frequency domain allocations of RBs (e.g., each provided by CSI-Frequency-Occupation, which comprises at least a starting RB provided by startingRB and the number of PRBs provided by nrofRBs across which the corresponding frequency subband spans) for one or more frequency subbands corresponding/associated to a CSI-RS resource (e.g., the k-th CSI-RS resource in the resource set). In one example, the K sets of frequency domain resource allocation parameters and the K CSI-RS resources configured in the same CSI resource set are one-to-one mapped; for instance, the first set of frequency domain resource allocation parameters could correspond to the first CSI-RS resource in the CSI resource set, the second set of frequency domain resource allocation parameters could correspond to the second CSI-RS resource in the CSI resource set, and so on, and the K-th set of frequency domain resource allocation parameters could correspond to the K-th CSI-RS resource in the CSI resource set. In another example, the UE 116 could be indicated/provided by the network 130, e.g., via higher layer RRC signaling/parameter and/or MAC CE command and/or dynamic DCI based signaling, the mapping/association between the K sets of frequency domain resource allocation parameters and the K CSI-RS resources configured in the same CSI resource set. Optionally, the higher layer parameter(s), e.g., CSI-SSB-ResourceSet or NZP-CSI-RS-ResourceSet, that configures a CSI resource set and provides/indicates the K sets of frequency domain resource allocation parameters could also include/provide/indicate the K CSI-RS resource IDs/indexes each associated/mapped to a set of frequency domain resource allocation parameters discussed herein. Alternatively, one or more of the discussed herein K sets of frequency domain resource allocation parameters could be indicated in one or more DCIs, via one or more new DCI fields or by repurposing one or more bits/codepoints of one or more existing DCI fields in the DCI(s). One or more of the discussed herein K sets of frequency domain resource allocation parameters could also be indicated in one or more MAC CE commands; for this case, the MAC CE command(s) that provides/indicates the K sets of frequency domain resource allocation parameters could also include/provide/indicate the K CSI-RS resource IDs/indexes each associated/mapped to a set of frequency domain resource allocation parameters discussed herein. For both MAC CE and DCI based indication of the K sets of frequency domain resource allocation parameters, the association/mapping between the MAC CE/DCI indicated K sets of frequency domain resource allocation parameters and the K CSI-RS resources configured in the same CSI resource set could follow those discussed herein for the RRC based configuration/indication of the K sets of frequency domain resource allocation parameters.

Yet for another example, the higher layer parameter that configures a CSI resource setting comprising at least one CSI resource set for FSBM, e.g., CSI-ResourceConfig, could include/indicate K sets of frequency domain resource allocation parameters each corresponding/associated to a CSI-RS resource configured in the CSI resource set(s) for FSBM. A set of frequency domain resource allocation parameters could comprise at least one or more (e.g., $N_k$) frequency domain allocations of REs (e.g., each provided by frequencyDomainAllocation) for one or more frequency subbands corresponding/associated to a CSI-RS resource (e.g., the k-th CSI-RS resource in the resource set for FSBM) and one or more (e.g., $N_k$) frequency domain allocations of RBs (e.g., each provided by CSI-FrequencyOccupation, which comprises at least a starting RB provided by startingRB and the number of PRBs provided by nrofRBs across which the corresponding frequency subband spans) for one or more frequency subbands corresponding/associated to a CSI-RS resource (e.g., the k-th CSI-RS resource in the resource set for FSBM). In one example, the K sets of frequency domain resource allocation parameters configured in the CSI resource setting and the K CSI-RS resources configured in the CSI resource set(s) for FSBM are one-to-one mapped; for instance, the first set of frequency domain resource allocation parameters in the CSI resource setting could correspond to the first CSI-RS resource in the CSI resource set(s) for FSBM, the second set of frequency domain resource allocation parameters in the CSI resource setting could correspond to the second CSI-RS resource in the CSI resource set(s) for FSBM, and so on, and the K-th set of frequency domain resource allocation parameters in the CSI resource setting could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of frequency domain resource allocation parameters in the CSI resource setting and the K CSI-RS resources configured in the CSI resource set(s) for FSBM. Optionally, the higher layer parameter(s), e.g., CSI-ResourceConfig, that configures a CSI resource setting and provides/indicates the K sets of frequency domain resource allocation parameters could also include/provide/indicate the K CSI-RS resource IDs/indexes each associated/mapped to a set of frequency domain resource allocation parameters discussed herein. Alternatively, one or more of the discussed herein K sets of frequency domain resource allocation parameters could be indicated in one or more DCIs, via one or more new DCI fields or by repurposing one or more bits/codepoints of one or more existing DCI fields in the DCI(s). One or more of the discussed herein K sets of frequency domain resource allocation parameters could also be indicated in one or more MAC CE commands; for this case, the MAC CE command(s) that provides/indicates the K sets of frequency domain resource allocation parameters could also include/provide/indicate the K CSI-RS resource IDs/indexes each associated/mapped to a set of frequency domain resource allocation parameters discussed herein. For both MAC CE and DCI based indication of the K sets of frequency domain resource allocation parameters, the association/mapping between the MAC CE/DCI indicated K sets of frequency domain resource allocation parameters and the K CSI-RS resources configured in the CSI resource set(s) for FSBM could follow those discussed herein for the RRC based configuration/indication of the K sets of frequency domain resource allocation parameters.

Yet for another example, the higher layer parameter that configures a CSI resource set for FSBM, e.g., CSI-SSB-ResourceSet or NZP-CSI-RS-ResourceSet, could include/indicate K sets of bitmaps with each set comprising one or more bitmaps for a CSI-RS resource (e.g., a set of $N_k$ bitmaps for the k-th CSI-RS resource in the resource set). In this example, the configuration/indication of the one or more bitmaps in a set, and the association/mapping between the one or more bitmaps in a set and the frequency subband(s) for the corresponding CSI-RS resource could follow one more examples described herein. In one example, the K sets of bitmaps and the K CSI-RS resources configured in the same CSI resource set are one-to-one mapped; for instance, the first set of bitmaps could correspond to the first CSI-RS resource in the CSI resource set, the second set of bitmaps could correspond to the second CSI-RS resource in the CSI resource set, and so on, and the K-th set of bitmaps could correspond to the K-th CSI-RS resource in the CSI resource set. In another example, the UE 116 could be indicated/ provided by the network 130, e.g., via higher layer RRC signaling/parameter and/or MAC CE command and/or dynamic DCI based signaling, the mapping/association between the K sets of bitmaps and the K CSI-RS resources configured in the CSI resource set. Optionally, the higher layer parameter(s), e.g., CSI-SSB-ResourceSet or NZP-CSI-RS-ResourceSet, that configures a CSI resource set and provides/indicates the K sets of bitmaps could also include/ provide/indicate the K CSI-RS resource IDs/indexes each associated/mapped to a set of bitmaps discussed herein. Alternatively, one or more of the discussed herein K sets of bitmaps could be indicated in one or more DCIs, via one or more new DCI fields or by repurposing one or more bits/ codepoints of one or more existing DCI fields in the DCI(s). The association/mapping between the DCI indicated K sets of bitmaps and the K CSI-RS resources configured in the same CSI resource set could follow those discussed herein for the RRC based configuration/indication of the K sets of bitmaps.

Yet for another example, the higher layer parameter that configures a CSI resource setting comprising at least one CSI resource set for FSBM, e.g., CSI-ResourceConfig, could include/indicate K sets of bitmaps with each set comprising one or more bitmaps for a CSI-RS resource configured in the CSI resource set(s) for FSBM (e.g., a set of $N_k$ bitmaps for the k-th CSI-RS resource in the resource set). In this example, the configuration/indication of the one or more bitmaps in a set, and the association/mapping between the one or more bitmaps in a set and the frequency subband(s) for the corresponding CSI-RS resource could follow one more examples described herein. In one example, the K sets of bitmaps in the CSI resource setting and the K CSI-RS resources configured in the CSI resource set(s) for FSBM are one-to-one mapped; for instance, the first set of bitmaps in the CSI resource setting could correspond to the first CSI-RS resource in the CSI resource set(s) for FSBM, the second set of bitmaps in the CSI resource setting could correspond to the second CSI-RS resource in the CSI resource set(s) for FSBM, and so on, and the K-th set of bitmaps in the CSI resource setting could correspond to the K-th CSI-RS resource in the CSI resource set(s) for FSBM. In another example, the UE 116 could be indicated/provided by the network 130, e.g., via higher layer RRC signaling/ parameter and/or MAC CE command and/or dynamic DCI based signaling, the mapping/association between the K sets of bitmaps configured in the CSI resource setting and the K CSI-RS resources configured in the CSI resource set(s) for FSBM. Optionally, the higher layer parameter(s), e.g., CSI-ResourceConfig, that configures a CSI resource setting and provides/indicates the K sets of bitmaps could also include/ provide/indicate the K CSI-RS resource IDs/indexes each associated/mapped to a set of bitmaps discussed herein. Alternatively, one or more of the discussed herein K sets of bitmaps could be indicated in one or more DCIs, via one or more new DCI fields or by repurposing one or more bits/ codepoints of one or more existing DCI fields in the DCI(s). The association/mapping between the DCI indicated K sets of bitmaps and the K CSI-RS resources configured in the CSI resource set(s) for FSBM could follow those discussed herein for the RRC based configuration/indication of the K sets of bitmaps.

Yet for another example, the higher layer parameter that configures a CSI resource set for FSBM, e.g., CSI-SSB-ResourceSet or NZP-CSI-RS-ResourceSet, could include/ indicate K bitmaps each corresponding/associated to a CSI-RS resource configured therein. In this example, the configuration/indication of a bitmap, and the association/ mapping between each bit position/entry in a bitmap and the frequency subband(s) for the corresponding CSI-RS resource could follow one more examples described herein. In one example, the K bitmaps and the K CSI-RS resources configured in the same CSI resource set are one-to-one mapped; for instance, the first bitmap could correspond to the first CSI-RS resource in the CSI resource set, the second bitmap could correspond to the second CSI-RS resource in the CSI resource set, and so on, and the K-th bitmap could correspond to the K-th CSI-RS resource in the CSI resource set. In another example, the UE 116 could be indicated/ provided by the network 130, e.g., via higher layer RRC signaling/parameter and/or MAC CE command and/or dynamic DCI based signaling, the mapping/association between the K bitmaps and the K CSI-RS resources configured in the CSI resource set. Optionally, the higher layer parameter(s), e.g., CSI-SSB-ResourceSet or NZP-CSI-RS-ResourceSet, that configures a CSI resource set and provides/indicates the K bitmaps could also include/provide/ indicate the K CSI-RS resource IDs/indexes each associated/ mapped to a bitmap discussed herein. Alternatively, one or more of the discussed herein K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI-RS resources configured in the same CSI resource set could follow those discussed herein for the RRC based configuration/indication of the K bitmaps.

Yet for another example, the higher layer parameter that configures a CSI resource setting comprising at least one CSI resource set for FSBM, e.g., CSI-ResourceConfig, could include/indicate K bitmaps each corresponding/asso-ciated to a CSI-RS resource configured in the CSI resource set(s) for FSBM. In this example, the configuration/indica-tion of a bitmap, and the association/mapping between each bit position/entry in a bitmap and the frequency subband(s) for the corresponding CSI-RS resource could follow one more examples described herein. In one example, the K bitmaps in the CSI resource setting and the K CSI-RS resources configured in the CSI resource set(s) for FSBM are one-to-one mapped; for instance, the first bitmap in the CSI resource setting could correspond to the first CSI-RS resource in the CSI resource set(s) for FSBM, the second bitmap in the CSI resource setting could correspond to the second CSI-RS resource in the CSI resource set(s) for FSBM, and so on, and the K-th bitmap in the CSI resource setting could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the map-ping/association between the K bitmaps configured in the CSI resource setting and the K CSI-RS resources configured in the CSI resource set(s) for FSBM. Optionally, the higher layer parameter(s), e.g., CSI-ResourceConfig, that config-ures a CSI resource setting and provides/indicates the K bitmaps could also include/provide/indicate the K CSI-RS resource IDs/indexes each associated/mapped to a bitmap discussed herein. Alternatively, one or more of the discussed herein K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI-RS resources configured in the CSI resource set(s) for FSBM could follow those discussed herein for the RRC based configuration/indication of the K bitmaps.

Yet for another example, the UE 116 could receive from the network 130 a MAC CE command indicating/providing/including K sets of bitmaps with each set comprising one or more bitmaps for a CSI-RS resource configured in the CSI resource set(s) for FSBM (e.g., a set of $N_k$ bitmaps for the k-th CSI-RS resource in the resource set). In this example, the configuration/indication of the one or more bitmaps in a set, and the association/mapping between the one or more bitmaps in a set and the frequency subband(s) for the corresponding CSI-RS resource could follow one more examples described herein. In one example, the K sets of bitmaps in the MAC CE command and the K CSI-RS resources configured in the CSI resource set(s) for FSBM are one-to-one mapped; for instance, the first set of bitmaps in the MAC CE command could correspond to the first CSI-RS resource in the CSI resource set(s) for FSBM, the second set of bitmaps in the MAC CE command could correspond to the second CSI-RS resource in the CSI resource set(s) for FSBM, and so on, and the K-th set of bitmaps in the MAC CE command could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of bitmaps configured in the MAC CE command and the K CSI-RS resources configured in the CSI resource set(s) for FSBM. Optionally, the MAC CE command that provides/indicates the K sets of bitmaps could also include/provide/indicate the K CSI-RS resource IDs/indexes each associated/mapped to a set of bitmaps discussed herein.

Yet for another example, a UE could receive from the network 130 a MAC CE command indicating/providing/including K bitmaps each corresponding/associated to a CSI-RS resource configured in a CSI-RS resource set for FSBM. In this example, the configuration/indication of a bitmap, and the association/mapping between each bit position/entry in a bitmap and the frequency subband(s) for the corresponding CSI-RS resource could follow one more examples described herein. In one example, the K bitmaps indicated in the MAC CE activation command and the K CSI-RS resources configured in the CSI resource set(s) for FSBM are one-to-one mapped; for instance, the first bitmap in the MAC CE command could correspond to the first CSI-RS resource in the CSI resource set(s) for FSBM, the second bitmap in the MAC CE command could correspond to the second CSI-RS resource in the CSI resource set(s) for FSBM, and so on, and the K-th bitmap in the MAC CE command could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K bitmaps in the MAC CE command and the K CSI-RS resources configured in the CSI resource set(s) for FSBM. Optionally, the MAC CE command that provides/indicates the K bitmaps could also include/provide/indicate the K CSI-RS resource IDs/indexes each associated/mapped to a bitmap discussed herein.

Yet for another example, one or more of the discussed herein design examples can be combined to indicate/configure one or more frequency subbands for each of the K CSI-RS resources configured in the CSI RS resource set(s) for FSBM.

A UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. For a CSI-RS resource configured in the CSI resource set for FSBM, and therefore, the corresponding/associated frequency subbands (e.g., the $N_k$ frequency subbands for the k-th CSI-RS resource in the resource set) configured/indicated according to one or more of the discussed herein design examples, the UE 116 could be further indicated/configured/provided by the network 130, via higher layer RRC signaling/parameter and/or MAC CE command and/or dynamic DCI based signaling, one or more of the total configured/indicated frequency subbands (e.g., one or more of the $N_k$ frequency subbands for the k-th CSI-RS resource in the resource set) for FSBM on the corresponding CSI-RS resource.

For example, the UE 116 could receive from the network 130, via higher layer RRC signaling/parameter and/or MAC CE command and/or dynamic DCI based signaling, a bitmap of length $N_k$ for the k-th CSI-RS resource in the resource set, where $k \in \{1, \ldots, K\}$. Each bit position/entry in the bitmap could correspond to a frequency subband corresponding/associated with the k-th CSI-RS resource in the resource set. If a bit position/entry in the bitmap is set to '1' (or '0'), the corresponding frequency subband is used/active for FSBM on the corresponding/associated CSI-RS resource (the k-th CSI-RS resource in the resource set in this example). The bitmap could comprise more than one bit positions/entries set to '1' (or '0') indicating that more than one frequency subbands can be used/active for FSBM on the corresponding/associated CSI-RS resource. The UE 116 could receive at least one bitmap for each CSI-RS resource configured in the resource set for FSBM.

In one example of an RRC based configuration, the bitmap(s) corresponding/associated to a CSI-RS resource could be provided in the higher layer parameter NZP-CSI-RS-Resource that configures the CSI-RS resource, or CSI-RS-ResourceMapping/CSI-FrequencyOccupation that configures resource allocations for the CSI-RS resource.

In another example, the higher layer parameter that configures a CSI resource set for FSBM, e.g., NZP-CSI-RS-ResourceSet, could include/indicate a set of one or more (e.g., K) such bitmaps each corresponding/associated to a CSI-RS resource configured in the same CSI resource set. For example, the K bitmaps are one-to-one mapped to the K CSI-RS resources configured in the same CSI resource set; for instance, the first bitmap could correspond to the first CSI-RS resource in the resource set, the second bitmap could correspond to the second CSI-RS resource in the resource set, and so on, and the K-th bitmap could correspond to the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K bitmaps and the K CSI-RS resources indicated/configured in the same CSI resource set. Optionally, the higher layer parameter(s), e.g., CSI-SSB-ResourceSet/NZP-CSI-RS-Resource-Set, that configures a CSI resource set and provides the K bitmaps could also include/provide/indicate the K CSI-RS resource IDs/indexes each associated/mapped to a bitmap discussed herein.

In yet another example, the higher layer parameter that configures a CSI resource setting comprising at least one CSI resource set for FSBM, e.g., CSI-ResourceConfig, could include/indicate a set of one or more (e.g., K) such bitmaps each corresponding/associated to a CSI-RS resource configured in the CSI resource set(s) for FSBM. For example, the K bitmaps provided in the CSI resource setting are one-to-one mapped to the K CSI-RS resources configured in the CSI resource set(s) for FSBM; for instance, the first bitmap in the resource setting could correspond to the first CSI-RS resource in the resource set, the second bitmap in the resource setting could correspond to the second CSI-RS resource in the resource set, and so on, and the K-th bitmap in the resource setting could correspond to the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K bitmaps indicated/configured in the CSI resource setting and the K CSI-RS resources indicated/configured in the CSI resource set(s) for FSBM. Optionally, the higher layer parameter(s), e.g., CSI-ResourceConfig, that configures a CSI resource setting and provides the K bitmaps could also include/ provide/indicate the K CSI-RS resource IDs/indexes each associated/mapped to a bitmap discussed herein.

In one example for MAC CE based indication, a MAC CE command could contain/comprise/include at least one bitmap corresponding/associated to a CSI-RS resource configured/indicated in the CSI resource set for FSBM. For this case, the MAC CE command could also contain/comprise/ include the corresponding CSI-RS resource ID.

In another example, a MAC CE command could contain/ comprise/include multiple (e.g., K) bitmaps each corresponding/associated to a CSI-RS resource configured/indicated in the CSI resource set for FSBM. For example, the K bitmaps provided in the MAC CE command are one-to-one mapped to the K CSI-RS resources configured in the CSI resource set(s) for FSBM; for instance, the first bitmap in the MAC CE command could correspond to the first CSI-RS resource in the resource set, the second bitmap in the MAC CE command could correspond to the second CSI-RS resource in the resource set, and so on, and the K-th bitmap in the MAC CE command could correspond to the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K bitmaps indicated/configured/provided in the MAC CE command and the K CSI-RS resources indicated/configured in the CSI resource set(s) for FSBM. Optionally, the MAC CE command that provides the K bitmaps could also include/provide/indicate the K CSI-RS resource IDs/indexes each associated/mapped to a bitmap discussed herein.

For dynamic DCI based signaling, one or more new DCI fields can be introduced to indicate one or more of the bitmaps each indicating one or more frequency subbands for FSBM on the corresponding CSI-RS resource; alternatively, one or more bits/codepoints of one or more existing DCI fields could be repurposed to indicate one or more of the bitmaps each indicating one or more frequency subbands for FSBM on the corresponding CSI-RS resource.

For another example, the UE 116 could receive from the network 130, via higher layer RRC signaling/parameter and/or MAC CE command and/or dynamic DCI based signaling, a set of one or more frequency subband indexes each determined from $\{1, \ldots, N_k\}$ for the k-th CSI-RS resource in the resource set, where $k \in \{1, \ldots, K\}$. For this case, the frequency subband(s) corresponding to the indicated/configured/provided frequency subband index(es) is used/active for FSBM on the corresponding/associated CSI-RS resource (the k-th CSI-RS resource in the resource set in this example). The UE 116 could receive at least one set of one or more frequency subband indexes for each CSI-RS resource configured in the resource set for FSBM. For RRC based configuration:

In one example, the set of one or more frequency subband indexes corresponding/associated to a CSI-RS resource could be provided in the higher layer parameter NZP-CSI-RS-Resource that configures the CSI-RS resource, or CSI-RS-ResourceMapping/CSI-FrequencyOccupation that configures resource allocations for the CSI-RS resource.

In another example, the higher layer parameter that configures a CSI resource set for FSBM, e.g., NZP-CSI-RS-ResourceSet, could include/indicate one or more sets (e.g., K) of one or more frequency subband indexes with each set corresponding/associated to a CSI-RS resource configured in the same CSI resource set. For example, the K sets of frequency subband index(es) are one-to-one mapped to the K CSI-RS resources configured in the same CSI resource set; for instance, the first set of one or more frequency subband indexes could correspond to the first CSI-RS resource in the resource set, the second set of one or more frequency subband indexes could correspond to the second CSI-RS resource in the resource set, and so on, and the K-the set of one or more frequency subband indexes could correspond to the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K sets of frequency subband index(es) and the K CSI-RS resources indicated/configured in the same CSI resource set. Optionally, the higher layer parameter(s), e.g., CSI-SSB-Resource-Set/NZP-CSI-RS-ResourceSet, that configures a CSI resource set and provides the K sets of frequency subband indexes could also include/provide/indicate the K CSI-RS resource IDs/indexes each associated/mapped to a set of frequency subband indexes discussed herein.

In yet another example, the higher layer parameter that configures a CSI resource setting comprising at least one CSI resource set for FSBM, e.g., CSI-ResourceConfig, could include/indicate one or more sets (e.g., K) of one or more frequency subband indexes with each set corresponding/associated to a CSI-RS resource configured in the CSI resource set(s) for FSBM. For example, the K sets of frequency subband index(es) configured in the resource setting are one-to-one mapped to the K CSI-RS resources configured in the CSI resource set(s) for FSBM; for instance, the first set of one or more frequency subband indexes in the resource setting could correspond to the first CSI-RS resource in the resource set, the second set of one or more frequency subband indexes in the resource setting could correspond to the second CSI-RS resource in the resource set, and so on, and the K-th set of one or more frequency subband indexes in the resource setting could correspond to the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K sets of frequency subband index(es) indicated/configured in the CSI resource setting and the K CSI-RS resources indicated/configured in the CSI resource set(s) for FSBM. Optionally, the higher layer parameter(s), e.g., CSI-ResourceConfig, that configures a CSI resource setting and provides the K sets of frequency subband indexes could also include/provide/indicate the K CSI-RS resource IDs/indexes each associated/mapped to a set of frequency subband indexes discussed herein.

In one example for MAC CE based indication, a MAC CE command could contain/comprise/include at least one set of frequency subband index(es) corresponding/associated to a CSI-RS resource configured/indicated in the CSI resource set for FSBM. For this case, the MAC CE command could also contain/comprise/include the corresponding CSI-RS resource ID.

In another example, a MAC CE command could contain/comprise/include multiple (e.g., K) sets of frequency subband index(es) each corresponding/associated to a CSI-RS resource configured/indicated in the CSI resource set for FSBM. For example, the K sets of frequency subband index(es) provided in the MAC CE command are one-to-one mapped to the K CSI-RS resources configured in the CSI resource set(s) for FSBM; for instance, the first set of one or more frequency subband indexes in the MAC CE command could correspond to the first CSI-RS resource in the resource set, the second set of one or more frequency subband indexes in the MAC CE command could correspond to the second CSI-RS resource in the resource set, and so on, and the K-th set of one or more frequency subband indexes in the MAC CE command could correspond to the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K sets of frequency subband index(es) indicated/configured/provided in the MAC CE command and the K CSI-RS resources indicated/configured in the CSI resource set(s) for FSBM. Optionally, the MAC CE command that provides the K sets of frequency subband indexes could also include/provide/indicate the K CSI-RS resource IDs/indexes each associated/mapped to a set of frequency subband indexes discussed herein.

For dynamic DCI based signaling, one or more new DCI fields can be introduced to indicate one or more of the sets of frequency subband index(es), wherein each set could indicate one or more frequency subbands for FSBM on the corresponding CSI-RS resource; alternatively, one or more bits/codepoints of one or more existing DCI fields in a DCI format could be repurposed to indicate one or more of the sets of frequency subband index(es), wherein each set could indicate one or more frequency subbands for FSBM on the corresponding CSI-RS resource.

Yet for another example, the UE 116 could receive from the network 130 one or more MAC CE activation commands each activating one or more of the frequency subbands configured/indicated for one or more CSI-RS resources, where the activated one or more frequency subbands are used/active for FSBM on the corresponding CSI-RS resource(s).

In one example, a MAC CE activation command could activate one or more of the frequency subbands configured/indicated for a CSI-RS resource, and the activated one or more frequency subbands are used/active for FSBM on the CSI-RS resource. For this case, the MAC CE activation command could also contain/comprise/include the corresponding CSI-RS resource ID.

In another example, a MAC CE activation command could activate multiple (e.g., K) sets of one or more frequency subbands with each set corresponding/associated to a CSI-RS resource configured/indicated in the CSI resource set for FSBM. For example, the MAC CE command could activate the first set of one or more frequency subbands from the frequency subbands indicated/configured for the first CSI-RS resource in the resource set, the second set of one or more frequency subbands from the frequency subbands indicated/configured for the second CSI-RS resource in the resource set, and so on, and the K-th set of one or more frequency subbands from the frequency subbands indicated/configured for the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K sets of frequency subbands activated by the MAC CE activation command and the K CSI-RS resources indicated/configured in the CSI resource set(s) for FSBM. A set of frequency subbands activated by the MAC CE activation command are used/active for FSBM on the corresponding CSI-RS resource. Optionally, the MAC CE activation command that activates the K sets of frequency subbands could also include/provide/indicate the K CSI-RS resource IDs/indexes each associated/mapped to a set of activated frequency subbands.

Yet for another example, the higher layer parameter that configures a frequency subband for a CSI-RS resource (e.g., the k-th CSI-RS resource configured in the resource set) could include/indicate/comprise an indicator. If the indicator is set to 'enabled'/'on' or the like, the corresponding frequency subband is used/active for FSBM on the corresponding CSI-RS resource. Alternatively, the indicator could correspond to a one-big flag indicator. That is, if the one-bit flag indicator is set to '1' (or '0') or the like, the corresponding frequency subband is used/active for FSBM on the corresponding CSI-RS resource.

In another example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in one or more CSI resource settings each provided by CSI-ResourceConfig, one or more CSI resource sets (e.g., each provided by CSI-SSB-ResourceSet or NZP-CSI-RS- ResourceSet) each comprising at least one CSI-RS resource (e.g., a SSB resource or NZP CSI-RS resource) for FSBM. In particular, a CSI-RS resource for FSBM could correspond to one or more frequency-selective beams, and therefore, span across the corresponding one or more frequency subbands. The indication/configuration of the frequency subbands (in terms of their sizes and/or frequency domain resource allocations, etc.) for one or more CSI-RS resources, the mapping/association between the frequency subbands, and the CSI-RS resources could follow one more examples described herein (e.g., by replacing CSI resource set with CSI resource setting in one or more of these design examples). Furthermore, the activation/indication of one or more frequency subbands for FSBM on the corresponding CSI-RS resource could follow one more examples described herein (e.g., by replacing CSI resource set with CSI resource setting in one or more of these design examples).

In yet another example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in a CSI resource set provided by CSI-SSB-ResourceSet or NZP-CSI-RS-ResourceSet, a CSI resource subset/group comprising $K \geq 1$ CSI-RS resources (e.g., SSB resources or NZP CSI-RS resources) for FSBM. In particular, the k-th CSI-RS resource in the resource subset/group could correspond to a set of $N_k \geq 1$ frequency-selective beams (and therefore, span across the corresponding set of $N_k \geq 1$ frequency subbands), where k=1, . . . , K. In the present disclosure, the set of $N_k \geq 1$ frequency-selective beams can also be referred to as a frequency-selective multi-beam. The indication/configuration of the frequency subbands (in terms of their sizes and/or frequency domain resource allocations, etc.) for one or more CSI-RS resources, and the mapping/association between the frequency subbands and the CSI-RS resources could follow one more examples described herein (e.g., by replacing CSI resource set with CSI resource subset/group in one or more of these design examples). Furthermore, the activation/indication of one or more frequency subbands for FSBM on the corresponding CSI-RS resource could follow one more examples described herein (e.g., by replacing CSI resource set with CSI resource subset/group in one or more of these design examples).

In yet another example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in one or more CSI resource sets each provided by CSI-SSB-ResourceSet or NZP-CSI-RS-ResourceSet, one or more CSI resource subsets/groups each comprising at least one CSI-RS resource (e.g., a SSB resource or NZP CSI-RS resource) for FSBM. In particular, a CSI-RS resource for FSBM could correspond to one or more frequency-selective beams (also referred to as a frequency-selective multi-beam), and therefore, span across the corresponding one or more frequency subbands. The indication/configuration of the frequency subbands (in terms of their sizes and/or frequency domain resource allocations, etc.) for one or more CSI-RS resources, and the mapping/association between the frequency subbands and the CSI-RS resources could follow one more examples described herein (e.g., by replacing CSI resource set with CSI resource subset/group in one or more of these design examples). Furthermore, the activation/indication of one or more frequency subbands for FSBM on the corresponding CSI-RS resource could follow one more examples described herein (e.g., by replacing CSI resource set with CSI resource subset/group in one or more of these design examples).

In yet another example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in a CSI resource setting provided by CSI-ResourceConfig, a CSI resource set (e.g., provided by CSI-SSB-ResourceSet or NZP-CSI-RS-ResourceSet) comprising one or more (e.g., $K \geq 1$) groups of CSI-RS resources (e.g., SSB resources or NZP CSI-RS resources) with each group comprising one or more (e.g., $N_k$) CSI-RS resources for FSBM, where k=1, . . . , K. Here, a group of CSI-RS resources can be referred to as a CSI resource subset or a CSI resource group for FSBM. In particular, the k-th CSI resource subset/group, and therefore, the $N_k$ CSI-RS resources configured therein, in the resource set could correspond to a set of $N_k \geq 1$ frequency-selective beams (and therefore, the corresponding set of $N_k \geq 1$ frequency subbands), where each CSI-RS resource configured in the k-th CSI resource subset/group could correspond to a frequency-selective beam (and therefore, the corresponding frequency subband). In the present disclosure, the set of $N_k \geq 1$ frequency-selective beams can also be referred to as a frequency-selective multi-beam. There are various means to indicate/configure/provide one or more CSI resource subsets/groups in a CSI resource set.

For example, the UE 116 could be provided/indicated/configured by the network 130, via higher layer RRC signaling/parameter (e.g., in a CSI resource set provided by CSI-SSB-ResourceSet/NZP-CSI-RS-ResourceSet or in a CSI resource setting provided by CSI-ResourceConfig) and/ or MAC CE command and/or dynamic DCI based signaling, K CSI resource subsets/groups each provided by a different higher layer parameter with a different/unique CSI resource subset/group ID/index. Each CSI resource subset/group could comprise/provide one or more CSI-RS resources each corresponding to a SSB resource index and/or a NZP CSI-RS resource configuration index.

For another example, the UE 116 could be provided/indicated/configured by the network 130, via higher layer RRC signaling/parameter (e.g., in a CSI resource set provided by CSI-SSB-ResourceSet/NZP-CSI-RS-ResourceSet or in a CSI resource setting provided by CSI-ResourceConfig) and/or MAC CE command and/or dynamic DCI based signaling, the number of CSI resource subsets/groups configured in the CSI resource set and/or the number of CSI-RS resources in each (or one or more) of the CSI resource subsets/groups. For this case, the indexes/IDs of the CSI-RS resources configured in the first CSI resource subset/group, the second CSI resource subset/group, and so on, could be continuous from low to high (or high to low).

Yet for another example, the UE 116 could be provided/indicated/configured by the network 130, via higher layer RRC signaling/parameter (e.g., in a CSI resource set provided by CSI-SSB-ResourceSet/NZP-CSI-RS-ResourceSet or in a CSI resource setting provided by CSI-ResourceConfig) and/or MAC CE command and/or dynamic DCI based signaling, the number of CSI resource subsets/groups configured in the CSI resource set and/or the number of CSI-RS resources for each CSI resource subset/group. For this case, the number of CSI-RS resources configured in each CSI resource subset/group is equal, and the indexes/IDs of the CSI-RS resources configured in the first CSI resource subset/group, the second CSI resource subset/group, and so on, could be continuous from low to high (or high to low).

Yet for another example, the UE 116 could be provided/indicated/configured by the network 130, via higher layer RRC signaling/parameter (e.g., in a CSI resource set provided by CSI-SSB-ResourceSet/NZP-CSI-RS-ResourceSet or in a CSI resource setting provided by CSI-ResourceConfig) and/or MAC CE command and/or dynamic DCI based signaling, one or more bitmaps each corresponding/associated to a CSI resource subset/group. For instance, the first bitmap could correspond to the first CSI resource subset/group in the resource set, the second bitmap could correspond to the second CSI resource subset/group in the resource set, and so on, and the last bitmap could correspond to the last CSI resource subset/group in the resource set. Alternatively, the UE 116 could be indicated/provided/configured by the network 130, via higher layer RRC signaling/parameter and/or MAC CE command and/or dynamic DCI based signaling, the mapping/association between the bitmaps and the CSI resource subsets/groups in the CSI resource set for FSBM. Each bitmap could have the same length/size as that of the CSI resource set, and each bit position/entry in a bitmap could correspond to a CSI-RS resource in the corresponding CSI resource set. If a bit position/entry of a bitmap is set to '1' (or '0'), the CSI-RS resource in the resource set corresponding/associated to the bit position/entry is configured/indicated/provided/included in the CSI resource subset/group corresponding/associated to the bitmap. Furthermore, the higher layer parameter(s), e.g., CSI-SSB-ResourceSet/NZP-CSI-RS-ResourceSet/CSI-ResourceConfig, and/or the MAC CE command and/or the DCI format that provides/indicates/configures the one or more bitmaps could also include/indicate/provide one or more CSI resource subset/group IDs/indexes each corresponding/associated to a bitmap indicated/configured therein.

Yet for another example, the UE 116 could receive from the network 130 a MAC CE activation command activating one or more CSI-RS resources—from all the CSI-RS resources configured in the CSI resource set—for a CSI resource subset/group. For this case, the MAC CE command could also include/indicate/provide the corresponding CSI resource subset/group ID/index. Furthermore, the UE 116 could receive from the network 130 K MAC CE activation commands each activating one or more CSI-RS resources for one of the K CSI resource subsets/groups.

Yet for another example, the UE 116 could receive from the network 130 a MAC CE activation command activating one or more CSI-RS resources—from all the CSI-RS resources configured in the CSI resource set—for each of the K CSI resource subset/group configured in the CSI resource set for FSBM. For instance, the MAC CE activation command could activate a first set of one or more CSI-RS resources—from all the CSI-RS resources configured in the CSI resource set—for the first CSI resource subset/group, a second set of one or more CSI-RS resources—from all the CSI-RS resources configured in the CSI resource set—for the second CSI resource subset/group, and so on, and a K-th set of one or more CSI-RS resources—from all the CSI-RS resources configured in the CSI resource set—for the K-th CSI resource subset/group. The MAC CE command could also include/indicate/provide one or more CSI resource subset/group IDs/indexes each corresponding/associated to a set of activated CSI-RS resources.

Yet for another example, one or more of the examples described herein could be combined to indicate/configure/provide one or more CSI resource subsets/groups in a CSI resource set for FSBM.

A UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. For a CSI resource subset/group (and therefore, the corresponding CSI-RS resources configured therein for FSBM) configured in the resource set, the UE 116 could be indicated/configured by the network 130 with the corresponding/associated frequency subbands including their bandwidths/sizes, starting RBs, etc.; this indication/configuration could be via higher layer RRC signaling and/or MAC CE command and/or dynamic DCI based signaling. There are various means to indicate/configure the frequency subbands corresponding/associated to the CSI resource subset/group (and therefore, the corresponding CSI-RS resources configured therein for FSBM).

For example, the frequency subband for FSBM, across which the $n_k$-th CSI-RS resource in the k-th CSI resource subset/group spans, could be determined according to the (existing) frequency domain resource allocation for the CSI-RS resource, where $n_k = 1, \ldots, N_k$. Here, the (existing)

frequency domain resource allocation for a CSI-RS resource could comprise/include/contain at least the frequency domain allocation of REs provided by frequencyDomainAllocation in CSI-RS-ResourceMapping for the CSI-RS resource and/or the frequency domain allocation of RBs provided by CSI-FrequencyOccupation (including the starting RB provided by startingRB and the number of PRBs provided by nrofRBs) in CSI-RS-ResourceMapping for the CSI-RS resource.

For another example, the UE 116 could be provided/indicated/configured by the network 130, e.g., via higher layer RRC signaling/parameter and/or MAC CE command and/or dynamic DCI based signaling, a set of frequency domain resource allocation parameters for the frequency subband for FSBM, across which the $n_k$-th CSI-RS resource in the k-th CSI resource subset/group spans, where $n_k=1, \ldots, N_k$. The set of frequency domain resource allocation parameters could comprise/include/contain at least a frequency domain allocation of REs and a frequency domain allocation of RBs (comprising at least a starting RB and the number of PRBs across which the corresponding frequency subband spans). The set of frequency domain resource allocation parameters for the frequency subband could be provided in the higher layer parameter, e.g., NZP-CSI-RS-Resource, that configures the corresponding CSI-RS resource (i.e., the $n_k$-th CSI-RS resource in the k-th CSI resource subset/group in this example), and/or the higher layer parameter, e.g., CSI-RS-ResourceMapping/CSI-FrequencyOccupation, that provides resource allocation for the corresponding CSI-RS resource (i.e., the $n_k$-th CSI-RS resource in the k-th CSI resource subset/group in this example). Alternatively, the set of frequency domain resource allocation parameters discussed herein could be indicated in one or more DCIs, via one or more new DCI fields or by repurposing one or more bits/codepoints of one or more existing DCI fields in the DCI(s). Optionally, the set of frequency domain resource allocation parameters discussed herein could be indicated/provided/included in one or more MAC CE commands; for this case, a MAC CE command could also include/indicate/provide the corresponding CSI-RS resource ID/index and or frequency subband index.

Yet for another example, the UE 116 could receive from the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, a bitmap to indicate/provide the frequency domain resource allocation (e.g., configuration of a frequency subband) for the $n_k$-th CSI-RS resource in the k-th CSI resource subset/group, where $n_k=1, \ldots, N_k$. Each bit position/entry in a bitmap could correspond to a PRB or PRB index among all the PRBs across which all the $N_k$ CSI-RS resources in the k-th CSI resource subset/group spans. If a bit position/entry of a bitmap is set to '1' (or '0'), the corresponding PRB or PRB index is allocated for the frequency subband for the CSI-RS resource corresponding/associated with the bitmap. A bitmap for a CSI-RS resource (and therefore, the corresponding frequency subband) could contain/comprise more than one bit positions/entries set to '1' (or '0'). Different bitmaps for different CSI-RS resources could have the same bit position(s)/entry(s) set to '1' (or '0') meaning that different frequency subbands for different CSI-RS resources in a CSI resource subset/group for FSBM could be overlapped in frequency. If the frequency subband size/allocation for a CSI-RS resource (e.g., the bitmap discussed herein) is indicated via one or more DCIs, one or more new DCI fields can be introduced to indicate the bitmap; alternatively, one or more bits/codepoints of one or more existing DCI fields could be repurposed to indicate the bitmap. If the frequency subband size/allocation for a CSI-RS resource (e.g., the bitmap discussed herein) is indicated in one or more MAC CE commands, a MAC CE command could also indicate/provide/include the corresponding CSI-RS resource ID/index and/or frequency subband index(es).

Yet for another example, the higher layer parameter that configures a CSI resource subset/group (e.g., the k-th CSI resource subset/group in the resource set), e.g., NZP-CSI-RS-ResourceSubSet, could indicate/include $N_k$ CSI-RS resource mapping configurations each for a frequency subband. A CSI-RS resource mapping configuration could contain/comprise at least a CSI-RS resource ID/index or a frequency subband index, a frequency domain allocation of REs for a CSI-RS resource/frequency subband, and a frequency domain allocation of RBs for a CSI-RS resource/frequency subband. The frequency domain allocation of RBs for a CSI-RS resource/frequency subband could contain/comprise at least a starting RB and a number of PRBs across which the corresponding CSI-RS resource/frequency subband spans. For this case, the higher layer parameter NZP-CSI-RS-ResourceSubSet that indicates/provides the $N_k$ CSI-RS resource mapping configurations could also include/provide/indicate the $N_k$ CSI-RS resource IDs/indexes and/or the $N_k$ frequency subband indexes each associated/mapped to a CSI-RS resource mapping configuration indicated/configured therein. Alternatively, one or more of the discussed herein $N_k$ CSI-RS resource mapping configurations could be indicated in one or more DCIs, via one or more new DCI fields or by repurposing one or more bits/codepoints of one or more existing DCI fields in the DCI(s). Optionally, one or more of the discussed herein $N_k$ CSI-RS resource mapping configurations could be indicated/provided/included in one or more MAC CE commands; for this case, a MAC CE command could also include/indicate/provide the corresponding CSI resource subset/group ID and/or CSI-RS resource ID(s)/index(es) and/or frequency subband index(es). The $N_k$ CSI-RS resource mapping configurations discussed herein and the $N_k$ CSI-RS resources configured in the k-th CSI resource subset/group for JTPA measurement could be one-to-one mapped; for instance, the first CSI-RS resource mapping configuration could correspond to the first CSI-RS resource in the CSI resource subset/group, the second CSI-RS resource mapping configuration could correspond to the second CSI-RS resource in the CSI resource subset/group, and so on, and the $N_k$-th CSI-RS resource mapping configuration could correspond to the $N_k$-th CSI-RS resource in the CSI resource subset/group. Alternatively, the UE 116 could be indicated/provided by the network 130, e.g., via higher layer RRC signaling/parameter and/or MAC CE command and/or dynamic DCI based signaling, the mapping/association between the $N_k$ CSI-RS resource mapping configurations and the $N_k$ CSI-RS resources configured in the k-th CSI resource subset/group.

Yet for another example, the UE 116 could receive from the network 130, via higher layer RRC signaling (e.g., in a CSI resource subset/group provided by NZP-CSI-RS-ResourceSubSet) and/or MAC CE command and/or dynamic DCI based signaling, one or more bitmaps (e.g., $N_k$ bitmaps) each for a frequency subband corresponding/associated to a CSI-RS resource (e.g., the $n_k$-th CSI-RS resource in the k-th CSI resource subset/group for FSBM). Each bit position/entry in a bitmap could correspond to a PRB or PRB index among all the PRBs across which all the $N_k$ CSI-RS resources in the k-th CSI resource subset/group spans. If a bit position/entry of a bitmap is set to '1' (or '0'), the corresponding PRB or PRB index is allocated for the frequency subband for the CSI-RS resource corresponding/associated with the bitmap. A bitmap for a CSI-RS resource/frequency subband could contain/comprise more than one bit positions/entries set to '1' (or '0'). Different bitmaps for different CSI-RS resources could have the same bit position(s)/entry(s) set to '1' (or '0') meaning that different frequency subbands for different CSI-RS resources configured in a CSI resource subset/group for FSBM could be overlapped in frequency. For this case, the higher layer parameter NZP-CSI-RS-ResourceSubSet that indicates/provides the $N_k$ bitmaps could also include/provide/indicate $N_k$ CSI-RS resource IDs/indexes and/or $N_k$ frequency subband indexes each associated/mapped to a bitmap indicated/configured therein. If the frequency subband size/allocation for one or more CSI-RS resources in the CSI resource subset/group (e.g., the one or more bitmaps discussed herein) is indicated via one or more DCIs, one or more new DCI fields can be introduced to indicate the one or more bitmaps; alternatively, one or more bits/codepoints of one or more existing DCI fields could be repurposed to indicate the one or more bitmaps. If the frequency subband size/allocation for one or more CSI-RS resources in the CSI resource subset/group (e.g., the one or more bitmaps discussed herein) is indicated in one or more MAC CE commands, a MAC CE command could also indicate/provide/include the corresponding CSI resource subset/group ID and/or CSI-RS resource ID(s)/index(es) and/or frequency subband index(es). The $N_k$ bitmaps discussed herein and the $N_k$ CSI-RS resources configured in the k-th CSI resource subset/group for FSBM could be one-to-one mapped; for instance, the first bitmap could correspond to the first CSI-RS resource in the CSI resource subset/group, the second bitmap could correspond to the second CSI-RS resource in the CSI resource subset/group, and so on, and the $N_k$-th bitmap could correspond to the $N_k$-th CSI-RS resource in the CSI resource subset/group. Alternatively, the UE 116 could be indicated/provided by the network 130, e.g., via higher layer RRC signaling/parameter and/or MAC CE command and/or dynamic DCI based signaling, the mapping/association between the $N_k$ bitmaps and the $N_k$ CSI-RS resources configured in the k-th CSI resource subset/group.

Yet for another example, the UE 116 could receive from the network 130, via higher layer RRC signaling (e.g., in a CSI resource subset/group provided by NZP-CSI-RS-ResourceSubSet) and/or MAC CE command and/or dynamic DCI based signaling, a bitmap for one or more of the frequency subbands corresponding/associated to one or more of the $N_k$ CSI-RS resources configured in the k-th CSI resource subset/group for FSBM. Each bit position/entry in the bitmap could correspond to a PRB or PRB index among all the PRBs across which all the $N_k$ CSI-RS resources in the k-th CSI resource subset/group spans. Furthermore, each bit position/entry in the bitmap could be mapped/associated with a frequency subband for a CSI-RS resource. The mapping/association between the bit positions/entries in the bitmap and the frequency subbands for the CSI-RS resources in a CSI resource subset/group could be fixed. For instance, the bitmap can be partitioned into $N_k$ parts each comprising one or more bit positions/entries; for this case, the first part of the bitmap could correspond to the first frequency subband for the first CSI-RS resource in the CSI resource subset/group, the second part of the bitmap could correspond to the second frequency subband for the second CSI-RS resource in the CSI resource subset/group, and so on, and the $N_k$-th part of the bitmap could correspond to the $N_k$-th frequency subband for the $N_k$-th CSI-RS resource in the CSI resource subset/group; the UE 116 could be provided/indicated/configured by the network 130, via higher layer RRC signaling and/or MAC CE command and/or dynamic DCI based signaling, how the bitmap is partitioned. Alternatively, the UE 116 could be provided/indicated/configured by the network 130, via higher layer RRC signaling and/or MAC CE command and/or dynamic DCI based signaling, the mapping/association between the bit positions/entries in the bitmap and the frequency subbands for the corresponding CSI-RS resources in the CSI resource subset/group for FSBM. If a bit position/entry of a bitmap is set to '1' (or '0'), the corresponding PRB or PRB index is allocated for the frequency subband (and therefore, the corresponding CSI-RS resource) corresponding/associated to the bit position/entry. The bitmap could contain/comprise more than one bit positions/entries set to '1' (or '0'). The higher layer parameter(s), e.g., NZP-CSI-RS-ResourceSubSet, that provides the bitmap could also include/provide/indicate the $N_k$ CSI-RS resource IDs/indexes and/or the $N_k$ frequency subband indexes each associated/mapped to one or more bit positions/entries (e.g., a part discussed herein) in the bitmap. If the frequency subband size/allocation for one or more CSI-RS resources in the CSI resource subset/group (e.g., the bitmap discussed herein) is indicated via one or more DCIs, one or more new DCI fields can be introduced to indicate the bitmap; alternatively, one or more bits/codepoints of one or more existing DCI fields could be repurposed to indicate the bitmap. If the frequency subband size/allocation for one or more CSI-RS resources in the CSI resource subset/group (e.g., the bitmap discussed herein) is indicated in one or more MAC CE commands, a MAC CE command could also indicate/provide/include the corresponding CSI resource subset/group ID and/or CSI-RS resource ID(s)/index(es) and/or frequency subband index(es).

Yet for another example, the UE 116 could receive from the network 130 one or more MAC CE activation commands (e.g., $N_k$ MAC CE activation commands) each for a frequency subband corresponding/associated to a CSI-RS resource configured in a CSI resource subset/group for FSBM (e.g., the $n_k$-th CSI-RS resource in the k-th CSI resource subset/group in the resource set). Each MAC CE activation command could activate one or more PRBs or PRB indexes—from all the PRBs across which all the $N_k$ CSI-RS resources in the k-th CSI resource subset/group spans—for the corresponding/associated frequency subband (and therefore, the corresponding CSI-RS resource). For this case, each MAC CE activation command could include/provide/indicate the corresponding CSI resource subset/group ID/index and/or CSI-RS resource ID/index and frequency subband index.

Yet for another example, the UE 116 could receive from the network 130 a MAC CE activation command activating one or more PRBs or PRB indexes—from all the PRBs across which all the $N_k$ CSI-RS resources in the k-th CSI resource subset/group spans—for one or more of the frequency subbands corresponding/associated to the one or more of the $N_k$ CSI-RS resources in the k-th CSI resource subset/group for FSBM. For instance, for the k-th CSI resource subset/group in the resource set, the MAC CE activation command could activate one or more PRBs or PRB indexes—from all the PRBs across which all the $N_k$ CSI-RS resources in the k-th CSI resource subset/group spans—for the first frequency subband corresponding/associated to the first CSI-RS resource in the CSI resource subset/group, one or more PRBs or PRB indexes—from all the PRBs across which all the $N_k$ CSI-RS resources in the k-th CSI resource subset/group spans—for the second frequency subband corresponding/associated to the second CSI-RS resource in the CSI resource subset/group, and so on, and one or more PRBs or PRB indexes—from all the PRBs across which all the $N_k$ CSI-RS resources in the k-th CSI resource subset/group spans—for the $N_k$-th frequency subband corresponding/associated to the $N_k$-th CSI-RS resource in the CSI resource subset/group. For this case, the MAC CE activation command could include/provide/indicate the corresponding CSI resource subset/group ID and/or CSI-RS resource ID(s)/index(es) and/or frequency subband index(es).

Yet for another example, the frequency subbands for different CSI-RS resources configured in the same CSI resource subset/group—e.g., the $N_k$ frequency subbands for the $N_k$ CSI-RS resources configured in the k-th CSI resource subset/group in the CSI resource set—could have the same bandwidth/size. For this case, the UE 116 could be provided by the network 130, via higher layer RRC signaling (e.g., in a CSI resource subset/group provided by NZP-CSI-RS-ResourceSubSet, or in a CSI-RS resource provided by NZP-CSI-RS-Resource, CSI-RS-ResourceMapping or CSI-FrequencyOccupation) and/or MAC CE command and/or dynamic DCI based signaling, a common frequency subband bandwidth/size (e.g., in number of PRBs) and/or one or more starting RBs of one or more frequency subbands. In addition, the frequency subbands for different CSI-RS resources configured in the same CSI resource subset/group—e.g., the $N_k$ frequency subbands for the $N_k$ CSI-RS resources configured in the k-th CSI resource subset/group in the CSI resource set—could equally divide the total PRBs across which all the $N_k$ CSI-RS resources in the k-th CSI resource subset/group spans. For this case, the UE 116 could be provided by the network 130, via higher layer RRC signaling (e.g., in a CSI resource subset/group provided by NZP-CSI-RS-ResourceSubSet, or in a CSI-RS resource provided by NZP-CSI-RS-Resource, CSI-RS-ResourceMapping or CSI-FrequencyOccupation) and/or MAC CE command and/or dynamic DCI based signaling, one or more starting RBs of one or more frequency subbands for one or more CSI-RS resources configured in the CSI resource subset/group.

Yet for another example, the higher layer parameter that configures a CSI resource set for FSBM, e.g., CSI-SSB-ResourceSet or NZP-CSI-RS-ResourceSet, could include/indicate K sets of frequency domain resource allocation parameters each corresponding/associated to a CSI resource subset/group configured therein. A set of frequency domain resource allocation parameters could comprise at least one or more (e.g., $N_k$) frequency domain allocations of REs for one or more frequency subbands corresponding/associated with one or more CSI-RS resources configured in a CSI resource subset/group (e.g., the $N_k$ CSI-RS resources in the k-th CSI resource subset/group in the resource set) and one or more (e.g., $N_k$) frequency domain allocations of RBs (comprising at least a starting RB and the number of PRBs across which the corresponding CSI-RS resource/frequency subband spans) for one or more frequency subbands corresponding/associated to one or more CSI-RS resources configured in a CSI resource subset/group (e.g., the $N_k$ CSI-RS resources in the k-th CSI resource subset/group in the resource set). In one example, the K sets of frequency domain resource allocation parameters and the K CSI resource subsets/groups configured in the same CSI resource set are one-to-one mapped; for instance, the first set of frequency domain resource allocation parameters could correspond to the first CSI resource subset/group (and therefore, the $N_1$ CSI-RS resources for FSBM configured therein) in the CSI resource set, the second set of frequency domain resource allocation parameters could correspond to the second CSI resource subset/group (and therefore, the $N_2$ CSI-RS resources for FSBM configured therein) in the CSI resource set, and so on, and the K-th set of frequency domain resource allocation parameters could correspond to the K-th CSI resource subset/group (and therefore, the $N_K$ CSI-RS resources for FSBM configured therein) in the CSI resource set. In another example, the UE 116 could be indicated/provided by the network 130, e.g., via higher layer RRC signaling/parameter and/or MAC CE command and/or dynamic DCI based signaling, the mapping/association between the K sets of frequency domain resource allocation parameters and the K CSI resource subsets/groups (and therefore, the corresponding CSI-RS resources for FSBM configured therein) configured in the same CSI resource set. Optionally, the higher layer parameter(s), e.g., CSI-SSB-ResourceSet/NZP-CSI-RS-ResourceSet, that configures a CSI resource set and provides the K sets of frequency domain resource allocation parameters could also include/provide/indicate the K CSI resource subset IDs/indexes each associated/mapped to a set of frequency domain resource allocation parameters discussed herein. Alternatively, one or more of the discussed herein K sets of frequency domain resource allocation parameters could be indicated in one or more DCIs, via one or more new DCI fields or by repurposing one or more bits/codepoints of one or more existing DCI fields in the DCI(s). One or more of the discussed herein K sets of frequency domain resource allocation parameters could also be indicated in one or more MAC CE commands; for this case, the MAC CE command(s) that provides/indicates the K sets of frequency domain resource allocation parameters could also include/provide/indicate the K CSI resource subset IDs/indexes each associated/mapped to a set of frequency domain resource allocation parameters discussed herein. For both MAC CE and DCI based indication of the K sets of frequency domain resource allocation parameters, the association/mapping between the MAC CE/DCI indicated K sets of frequency domain resource allocation parameters and the K CSI resource subsets/groups (and therefore, the corresponding CSI-RS resources for FSBM configured therein) configured in the same CSI resource set could follow those discussed herein for the RRC based configuration/indication of the K sets of frequency domain resource allocation parameters.

Yet for another example, the higher layer parameter that configures a CSI resource setting comprising at least one CSI resource set for FSBM, e.g., CSI-ResourceConfig, could include/indicate K sets of frequency domain resource allocation parameters each corresponding/associated to a CSI resource subset/group configured in the CSI resource set(s) for FSBM. A set of frequency domain resource allocation parameters could comprise at least one or more (e.g., $N_k$) frequency domain allocations of REs for one or more frequency subbands corresponding/associated with one or more CSI-RS resources configured in a CSI resource subset/group (e.g., the $N_k$ CSI-RS resources in the k-th CSI resource subset/group in the resource set for FSBM) and one or more (e.g., $N_k$) frequency domain allocations of RBs (comprising at least a starting RB and the number of PRBs across which the corresponding CSI-RS resource/frequency subband spans) for one or more frequency subbands corresponding/associated to one or more CSI-RS resources in a CSI resource subset/group (e.g., the $N_k$ CSI-RS resources in the k-th CSI resource subset/group in the resource set for FSBM). In one example, the K sets of frequency domain resource allocation parameters configured in the CSI resource setting and the K CSI resource subsets/groups configured in the CSI resource set(s) for FSBM are one-to-one mapped; for instance, the first set of frequency domain resource allocation parameters in the CSI resource setting could correspond to the first CSI resource subset/group (and therefore, the $N_1$ CSI-RS resources for FSBM configured therein) in the CSI resource set(s) for FSBM, the second set of frequency domain resource allocation parameters in the CSI resources setting could correspond to the second CSI resource subset/group (and therefore, the $N_2$ CSI-RS resources for FSBM configured therein) in the CSI resource set(s) for FSBM, and so on, and the K-th set of frequency domain resource allocation parameters in the CSI resource setting could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of frequency domain resource allocation parameters in the CSI resource setting and the K CSI resource subsets/groups (and therefore, the corresponding CSI-RS resources for FSBM configured therein) configured in the CSI resource set(s) for FSBM. Optionally, the higher layer parameter(s), e.g., CSI-ResourceConfig, that configures a CSI resource setting and provides the K sets of frequency domain resource allocation parameters could also include/provide/indicate the K CSI resource subset IDs/indexes each associated/mapped to a set of frequency domain resource allocation parameters discussed herein. Alternatively, one or more of the discussed herein K sets of frequency domain resource allocation parameters could be indicated in one or more DCIs, via one or more new DCI fields or by repurposing one or more bits/codepoints of one or more existing DCI fields in the DCI(s). One or more of the discussed herein K sets of frequency domain resource allocation parameters could also be indicated in one or more MAC CE commands; for this case, the MAC CE command(s) that provides/indicates the K sets of frequency domain resource allocation parameters could also include/provide/indicate the K CSI resource subset IDs/indexes each associated/ mapped to a set of frequency domain resource allocation parameters discussed herein. For both MAC CE and DCI based indication of the K sets of frequency domain resource allocation parameters, the association/mapping between the MAC CE/DCI indicated K sets of frequency domain resource allocation parameters and the K CSI resource subsets/groups (and therefore, the corresponding CSI-RS resources for FSBM configured therein) configured in the CSI resource set(s) for FSBM could follow those discussed herein for the RRC based configuration/indication of the K sets of frequency domain resource allocation parameters.

Yet for another example, the higher layer parameter that configures a CSI resource set for FSBM, e.g., CSI-SSB-ResourceSet or NZP-CSI-RS-ResourceSet, could include/indicate K sets of bitmaps with each set comprising one or more bitmaps for a CSI resource subset/group (e.g., a set of $N_k$ bitmaps for the $N_k$ CSI-RS resources configured in the k-th CSI resource subset/group in the resource set). In this example, the configuration/indication of the one or more bitmaps in a set, and the association/mapping between the one or more bitmaps in a set and the frequency subband(s) for the corresponding CSI-RS resource(s) could one more examples described herein. In one example, the K sets of bitmaps and the K CSI resource subsets/groups configured in the same CSI resource set are one-to-one mapped; for instance, the first set of bitmaps could correspond to the first CSI resource subset/group (and therefore, the $N_1$ CSI-RS resources for FSBM configured therein) in the CSI resource set, the second set of bitmaps could correspond to the second CSI resource subset/group (and therefore, the $N_2$ CSI-RS resources for FSBM configured therein) in the CSI resource set, and so on, and the K-th set of bitmaps could correspond to the K-th CSI resource subset/group (and therefore, the $N_K$ CSI-RS resources for FSBM configured therein) in the CSI resource set. In another example, the UE 116 could be indicated/provided by the network 130, e.g., via higher layer RRC signaling/parameter and/or MAC CE command and/or dynamic DCI based signaling, the mapping/association between the K sets of bitmaps and the K CSI resource subsets/groups (and therefore, the corresponding CSI-RS resources for FSBM configured therein) configured in the CSI resource set. Optionally, the higher layer parameter(s), e.g., CSI-SSB-ResourceSet/NZP-CSI-RS-ResourceSet, that configures a CSI resource set and provides the K sets of bitmaps could also include/provide/indicate the K CSI resource subset IDs/indexes each associated/mapped to a set of bitmaps discussed herein. Alternatively, one or more of the discussed herein K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI resource subsets/groups (and therefore, the corresponding CSI-RS resources for FSBM configured therein) configured in the same CSI resource set could follow those discussed herein for the RRC based configuration/indication of the K sets of bitmaps.

Yet for another example, the higher layer parameter that configures a CSI resource setting comprising at least one CSI resource set for FSBM, e.g., CSI-ResourceConfig, could include/indicate K sets of bitmaps with each set comprising one or more bitmaps for a CSI resource subset/ group configured in the CSI resource set(s) for FSBM (e.g., a set of $N_k$ bitmaps for the $N_k$ CSI-RS resources configured in the k-th CSI resource subset/group in the resource set). In this example, the configuration/indication of the one or more bitmaps in a set, and the association/mapping between the one or more bitmaps in a set and the frequency subband(s) for the corresponding CSI-RS resource(s) could follow one more examples described herein. In one example, the K sets of bitmaps in the CSI resource setting and the K CSI resource subsets/groups configured in the CSI resource set(s) for FSBM are one-to-one mapped; for instance, the first set of bitmaps in the CSI resource setting could correspond to the first CSI resource subset/group (and therefore, the $N_1$ CSI-RS resources for FSBM configured therein) in the CSI resource set(s) for FSBM, the second set of bitmaps in the CSI resource setting could correspond to the second CSI resource subset/group (and therefore, the $N_2$ CSI-RS resources for FSBM configured therein) in the CSI resource set(s) for FSBM, and so on. The K-th set of bitmaps in the CSI resource setting could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of bitmaps configured in the CSI resource setting and the K CSI resource subsets/groups (and therefore, the corresponding CSI-RS resources for FSBM configured therein) configured in the CSI resource set(s) for FSBM. Optionally, the higher layer parameter(s), e.g., CSI-ResourceConfig, that configures a CSI resource setting and provides the K sets of bitmaps could also include/provide/indicate the K CSI resource subset IDs/indexes each associated/mapped to a set of bitmaps discussed herein. Alternatively, one or more of the discussed herein K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI resource subsets/groups (and therefore, the corresponding CSI-RS resources for FSBM configured therein) configured in the CSI resource set(s) for FSBM could follow those discussed herein for the RRC based configuration/indication of the K sets of bitmaps.

Yet for another example, the higher layer parameter that configures a CSI resource set for FSBM, e.g., CSI-SSB-ResourceSet or NZP-CSI-RS-ResourceSet, could include/indicate K bitmaps each corresponding/associated to a CSI resource subset/group configured therein. In this example, the configuration/indication of a bitmap, and the association/mapping between each bit position/entry in a bitmap and the frequency subband(s) for the corresponding CSI-RS resource(s) could follow one more examples described herein. In one example, the K bitmaps and the K CSI resource subsets/groups configured in the same CSI resource set are one-to-one mapped; for instance, the first bitmap could correspond to the first CSI resource subset/group (and therefore, the $N_1$ CSI-RS resources for FSBM configured therein) in the CSI resource set, the second bitmap could correspond to the second CSI resource subset/group (and therefore, the $N_2$ CSI-RS resources for FSBM configured therein) in the CSI resource set, and so on, and the K-th bitmap could correspond to the K-th CSI resource subset/group (and therefore, the $N_K$ CSI-RS resources for FSBM configured therein) in the CSI resource set. In another example, the UE 116 could be indicated/provided by the network 130, e.g., via higher layer RRC signaling/parameter and/or MAC CE command and/or dynamic DCI based signaling, the mapping/association between the K bitmaps and the K CSI resource subsets/groups (and therefore, the corresponding CSI-RS resources for FSBM configured therein) configured in the CSI resource set. Optionally, the higher layer parameter(s), e.g., CSI-SSB-ResourceSet or NZP-CSI-RS-ResourceSet, that configures a CSI resource set and provides the K bitmaps could also include/provide/indicate the K CSI resource subset IDs/indexes each associated/mapped to a bitmap discussed herein. Alternatively, one or more of the discussed herein K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI resource subsets/groups (and therefore, the corresponding CSI-RS resources for FSBM configured therein) configured in the same CSI resource set could follow those discussed herein for the RRC based configuration/indication of the K bitmaps.

Yet for another example, the higher layer parameter that configures a CSI resource setting comprising at least one CSI resource set for FSBM, e.g., CSI-ResourceConfig, could include/indicate K bitmaps each corresponding/associated to a CSI resource subset/group configured in the CSI resource set(s) for FSBM. In this example, the configuration/indication of a bitmap, and the association/mapping between each bit position/entry in a bitmap and the frequency subband(s) for the corresponding CSI-RS resource(s) could follow one more examples described herein. In one example, the K bitmaps in the CSI resource setting and the K CSI resource subsets/groups configured in the CSI resource set(s) for FSBM are one-to-one mapped; for instance, the first bitmap in the CSI resource setting could correspond to the first CSI resource subset/group (and therefore, the $N_1$ CSI-RS resources for FSBM configured therein) in the CSI resource set(s) for FSBM, the second bitmap in the CSI resource setting could correspond to the second CSI resource subset/group (and therefore, the $N_2$ CSI-RS resources for FSBM configured therein) in the CSI resource set(s) for FSBM, and so on, and the K-th bitmap in the CSI resource setting could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K bitmaps configured in the CSI resource setting and the K CSI resource subsets/groups (and therefore, the corresponding CSI-RS resources for FSBM configured therein) configured in the CSI resource set(s) for FSBM. Optionally, the higher layer parameter(s), e.g., CSI-ResourceConfig, that configures a CSI resource setting and provides the K bitmaps could also include/provide/indicate the K CSI resource subset IDs/indexes each associated/mapped to a bitmap discussed herein. Alternatively, one or more of the discussed herein K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI resource subsets/groups (and therefore, the corresponding CSI-RS resources for FSBM configured therein) configured in the CSI resource set(s) for FSBM could follow those discussed herein for the RRC based configuration/indication of the K bitmaps.

Yet for another example, the UE 116 could receive from the network 130 a MAC CE command indicating/providing/including K sets of bitmaps with each set comprising one or more bitmaps for a CSI resource subset/group (and therefore, the corresponding CSI-RS resources configured therein) configured in the CSI resource set(s) for FSBM (e.g., a set of $N_k$ bitmaps for the $N_k$ CSI-RS resources configured in the k-th CSI resource subset/group in the resource set). In this example, the configuration/indication of the one or more bitmaps in a set, and the association/mapping between the one or more bitmaps in a set and the frequency subband(s) for the corresponding CSI-RS resource(s) could follow one more examples described herein. In one example, the K sets of bitmaps in the MAC CE command and the K CSI resource subsets/groups configured in the CSI resource set(s) for FSBM are one-to-one mapped; for instance, the first set of bitmaps in the MAC CE command could correspond to the first CSI resource subset/group (and therefore, the $N_1$ CSI-RS resources for FSBM configured therein) in the CSI resource set(s) for FSBM, the second set of bitmaps in the MAC CE command could correspond to the second CSI resource subset/group (and therefore, the $N_2$ CSI-RS resources for FSBM configured therein) in the CSI resource set(s) for FSBM, and so on, and the K-th set of bitmaps in the MAC CE command could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of bitmaps configured in the MAC CE command and the K CSI resource subsets/groups (and therefore, the corresponding CSI-RS resources for FSBM configured therein) configured in the CSI resource set(s) for FSBM. Optionally, the MAC CE command that provides/indicates the K sets of bitmaps could also include/provide/indicate the K CSI resource subset IDs/indexes each associated/mapped to a set of bitmaps discussed herein.

Yet for another example, a UE could receive from the network 130 a MAC CE command indicating/providing/including K bitmaps each corresponding/associated to a CSI resource subset/group configured in a CSI-RS resource set for FSBM. In this example, the configuration/indication of a bitmap, and the association/mapping between each bit position/entry in a bitmap and the frequency subband(s) for the corresponding CSI-RS resource(s) could follow one more examples described herein. In one example, the K bitmaps indicated in the MAC CE command and the K CSI resource subsets/groups configured in the CSI resource set(s) for FSBM are one-to-one mapped; for instance, the first bitmap in the MAC CE command could correspond to the first CSI resource subset/group (and therefore, the $N_1$ CSI-RS resources for FSBM configured therein) in the CSI resource set(s) for FSBM, the second bitmap in the MAC CE command could correspond to the second CSI resource subset/group (and therefore, the $N_2$ CSI-RS resources for FSBM configured therein) in the CSI resource set(s) for FSBM, and so on, and the K-th bitmap in the MAC CE command could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K bitmaps in the MAC CE command and the K CSI resource subsets/groups (and therefore, the corresponding CSI-RS resources for FSBM configured therein) configured in the CSI resource set(s) for FSBM. Optionally, the MAC CE command that provides/indicates the K bitmaps could also include/provide/indicate the K CSI resource subset IDs/indexes each associated/mapped to a bitmap discussed herein.

Yet for another example, one or more of the examples described herein can be combined to indicate/configure one or more frequency subbands for one or more CSI-RS resources in each of the K CSI resource subsets/groups configured in the CSI resource set(s) for FSBM.

A UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. For a CSI resource subset/group configured in the CSI resource set for FSBM, and therefore, the corresponding/associated frequency subbands (e.g., the $N_k$ frequency subbands for the $N_k$ CSI-RS resources configured in the k-th CSI resource subset/group in the resource set for FSBM) configured/indicated according to one or more of the discussed herein design examples, the UE 116 could be further indicated/configured/provided by the network 130, via higher layer RRC signaling/parameter and/or MAC CE command and/or dynamic DCI based signaling, one or more of the total configured/indicated frequency subbands (e.g., one or more of the $N_k$ frequency subbands for the k-th CSI resource subset/group in the resource set), and therefore, the corresponding one or more of the total configured/indicated CSI-RS resources in the CSI resource subset/group (e.g., one or more of the $N_k$ CSI-RS resources in the k-th CSI resource subset/group in the resource set), for FSBM.

For example, the UE 116 could receive from the network 130, via higher layer RRC signaling/parameter and/or MAC CE command and/or dynamic DCI based signaling, a bitmap of length $N_k$ for the k-th CSI resource subset/group in the resource set, where $k \in \{1, \ldots, K\}$. Each bit position/entry in the bitmap could correspond to a frequency subband, and therefore a CSI-RS resource—configured in the k-th CSI resource subset/group in the resource set—corresponding/associated to the frequency subband. If a bit position/entry in the bitmap is set to '1' (or '0'), the corresponding frequency subband/CSI-RS resource in the CSI resource subset/group is used/active for FSBM. The bitmap could comprise more than one bit positions/entries set to '1' (or '0') indicating that more than one frequency subbands/CSI-RS resources in the CSI resource subset/group can be used/active for FSBM. The UE 116 could receive at least one bitmap for each CSI resource subset/group configured in the resource set for FSBM.

In one example for RRC based configuration, the bitmap(s) corresponding/associated to a CSI resource subset/group could be provided in the higher layer parameter NZP-CSI-RS-ResourceSubSet that configures the CSI resource subset/group.

In another example, the higher layer parameter that configures a CSI resource set for FSBM, e.g., NZP-CSI-RS-ResourceSet, could include/indicate a set of one or more (e.g., K) such bitmaps each corresponding/associated to a CSI resource subset/group configured in the same CSI resource set. For example, the K bitmaps are one-to-one mapped to the K CSI resource subsets/groups configured in the same CSI resource set; for instance, the first bitmap could correspond to the first CSI resource subset/group (and therefore, the $N_1$ CSI-RS resources for FSBM configured therein) in the resource set, the second bitmap could correspond to the second CSI resource subset/group (and therefore, the $N_2$ CSI-RS resources for FSBM configured therein) in the resource set, and so on, and the K-th bitmap could correspond to the K-th CSI resource subset/group (and therefore, the $N_K$ CSI-RS resources for FSBM configured therein) in the resource set. For another example, the UE 116 could be provided/indicated by the network 130, via higher layer RRC signaling/parameter and/or MAC CE command and/or dynamic DCI based signaling, the mapping/association between the K bitmaps and the K CSI resource subsets/groups (and therefore, the corresponding CSI-RS resources for FSBM configured therein) indicated/configured in the same CSI resource set. Optionally, the higher layer parameter(s), e.g., CSI-SSB-ResourceSet/NZP-CSI-RS-ResourceSet, that configures a CSI resource set and provides the K bitmaps could also include/provide/indicate the K CSI resource subset/group IDs/indexes each associated/mapped to a bitmap discussed herein.

In yet another example, the higher layer parameter that configures a CSI resource setting comprising at least one CSI resource set for FSBM, e.g., CSI-ResourceConfig, could include/indicate a set of one or more (e.g., K) such bitmaps each corresponding/associated to a CSI resource subset/group configured in the CSI resource set(s) for FSBM. For example, the K bitmaps provided in the CSI resource setting are one-to-one mapped to the K CSI resource subsets/groups configured in the CSI resource set(s) for FSBM; for instance, the first bitmap in the resource setting could correspond to the first CSI resource subset/group (and therefore, the $N_1$ CSI-RS resources for FSBM configured therein) in the resource set, the second bitmap in the resource setting could correspond to the second CSI resource subset/group (and therefore, the $N_2$ CSI-RS resources for FSBM configured therein) in the resource set, and so on, and the K-th bitmap in the resource setting could correspond to the K-th CSI resource subset/group (and therefore, the $N_K$ CSI-RS resources for FSBM configured therein) in the resource set. For another example, the UE 116 could be provided/indicated by the network 130, via higher layer RRC signaling/parameter and/or MAC CE command and/or dynamic DCI based signaling, the mapping/association between the K bitmaps indicated/configured in the CSI resource setting and the K CSI resource subsets/groups (and therefore, the corresponding CSI-RS resources for FSBM configured therein) indicated/configured in the CSI resource set(s) for FSBM. Optionally, the higher layer parameter(s), e.g., CSI-ResourceConfig, that configures a CSI resource setting and provides the K bitmaps could also include/provide/indicate the K CSI resource subset/group IDs/indexes each associated/mapped to a bitmap discussed herein.

In one example for MAC CE based indication, a MAC CE command could contain/comprise/include/provide at least one bitmap corresponding/associated to a CSI resource subset/group configured/indicated in the CSI resource set for FSBM. For this case, the MAC CE command could also contain/comprise/include the corresponding CSI resource subset/group ID.

In another example, a MAC CE command could contain/comprise/include/provide multiple (e.g., K) bitmaps each corresponding/associated to a CSI resource subset/group configured/indicated in the CSI resource set for FSBM. For example, the K bitmaps provided in the MAC CE command are one-to-one mapped to the K CSI resource subsets/groups configured in the CSI resource set(s) for FSBM; for instance, the first bitmap in the MAC CE command could correspond to the first CSI resource subset/group (and therefore, the $N_1$ CSI-RS resources for FSBM configured therein) in the resource set, the second bitmap in the MAC CE command could correspond to the second CSI resource subset/group (and therefore, the $N_2$ CSI-RS resources for FSBM configured therein) in the resource set, and so on, and the K-th bitmap in the MAC CE command could correspond to the K-th CSI resource subset/group (and therefore, the $N_K$ CSI-RS resources for FSBM configured therein) in the resource set. For another example, the UE 116 could be provided/indicated by the network 130, via higher layer RRC signaling/parameter and/or MAC CE command and/or dynamic DCI based signaling, the mapping/association between the K bitmaps indicated/configured/provided in the MAC CE command and the K CSI resource subsets/groups (and therefore, the corresponding CSI-RS resources for FSBM configured therein) indicated/configured in the CSI resource set(s) for FSBM. Optionally, the MAC CE command that provides the K bitmaps could also include/provide/indicate the K CSI resource subset/group IDs/indexes each associated/mapped to a bitmap discussed herein.

For dynamic DCI based signaling, one or more new DCI fields can be introduced to indicate one or more of the bitmaps each indicating one or more frequency subbands/CSI-RS resources (in a CSI resource subset/group) for FSBM; alternatively, one or more bits/codepoints of one or more existing DCI fields could be repurposed to indicate one or more of the bitmaps each indicating one or more frequency subbands/CSI-RS resources (in a CSI resource subset/group) for FSBM.

For another example, the UE 116 could receive from the network 130, via higher layer RRC signaling/parameter and/or MAC CE command and/or dynamic DCI based signaling, a set of one or more frequency subband indexes each determined from $\{1, \ldots, N_k\}$ for the k-th CSI resource subset/group in the resource set, where $k \in \{1, \ldots, K\}$. Here, a frequency subband index is equivalent to a CSI-RS resource ID/index, a frequency subband is equivalent to a CSI-RS resource, a set of one or more frequency subband indexes are equivalent to a set of one or more CSI-RS resource indexes/IDs, and a set of one or more frequency subbands are equivalent to a set of one or more CSI-RS resources. For this case, the frequency subband(s) corresponding to the indicated/configured/provided frequency subband index(es), and therefore, the corresponding CSI-RS resource(s) configured in the CSI resource subset/group, is used/active for FSBM. The UE 116 could receive at least one set of one or more frequency subband indexes for each CSI resource subset/group configured in the resource set for FSBM.

In one example for RRC based configuration, the set of one or more frequency subband indexes corresponding/associated to a CSI resource subset/group could be provided in the higher layer parameter NZP-CSI-RS-ResourceSubSet that configures the CSI resource subset/group.

In another example, the higher layer parameter that configures a CSI resource set for FSBM, e.g., NZP-CSI-RS-ResourceSet, could include/indicate one or more sets (e.g., K) of one or more frequency subband indexes with each set corresponding/associated to a CSI resource subset/group configured in the same CSI resource set. For example, the K sets of frequency subband index(es) are one-to-one mapped to the K CSI resource subsets/groups configured in the same CSI resource set; for instance, the first set of one or more frequency subband indexes could correspond to the first CSI resource subset/group (and therefore, the $N_1$ CSI-RS resources for FSBM configured therein) in the resource set, the second set of one or more frequency subband indexes could correspond to the second CSI resource subset/group (and therefore, the $N_2$ CSI-RS resources for FSBM configured therein) in the resource set, and so on, and the K-th set of one or more frequency subband indexes could correspond to the K-th CSI resource subset/group (and therefore, the $N_K$ CSI-RS resources for FSBM configured therein) in the resource set. For another example, the UE 116 could be provided/indicated by the network 130, via higher layer RRC signaling/parameter and/or MAC CE command and/or dynamic DCI based signaling, the mapping/association between the K sets of frequency subband index(es) and the K CSI resource subsets/groups (and therefore, the corresponding CSI-RS resources for FSBM configured therein) indicated/configured in the same CSI resource set. Optionally, the higher layer parameter(s), e.g., CSI-SSB-Resource-Set/NZP-CSI-RS-ResourceSet, that configures a CSI resource set and provides the K sets of frequency subband indexes could also include/provide/indicate the K CSI resource subset/group IDs/indexes each associated/mapped to a set of frequency subband indexes discussed herein.

In yet another example, the higher layer parameter that configures a CSI resource setting comprising at least one CSI resource set for FSBM, e.g., CSI-ResourceConfig, could include/indicate one or more sets (e.g., K) of one or more frequency subband indexes with each set corresponding/associated to a CSI resource subset/group configured in the CSI resource set(s) for FSBM. For example, the K sets of frequency subband index(es) configured in the resource setting are one-to-one mapped to the K CSI resource subsets/groups configured in the CSI resource set(s) for FSBM; for instance, the first set of one or more frequency subband indexes in the resource setting could correspond to the first CSI resource subset/group (and therefore, the $N_1$ CSI-RS resources for FSBM configured therein) in the resource set, the second set of one or more frequency subband indexes in the resource setting could correspond to the second CSI resource subset/group (and therefore, the $N_2$ CSI-RS resources for FSBM configured therein) in the resource set, and so on, and the K-th set of one or more frequency subband indexes in the resource setting could correspond to the K-th CSI resource subset/group (and therefore, the $N_K$ CSI-RS resources for FSBM configured therein) in the resource set. For another example, the UE 116 could be provided/indicated by the network 130, via higher layer RRC signaling/parameter and/or MAC CE command and/or dynamic DCI based signaling, the mapping/association between the K sets of frequency subband index(es) indicated/configured in the CSI resource setting and the K CSI resource subsets/groups (and therefore, the corresponding CSI-RS resources for FSBM configured therein) indicated/configured in the CSI resource set(s) for FSBM. Optionally, the higher layer parameter(s), e.g., CSI-ResourceConfig, that configures a CSI resource setting and provides the K sets of frequency subband indexes could also include/provide/indicate the K CSI resource subset/group IDs/indexes each associated/mapped to a set of frequency subband indexes discussed herein.

In one example for MAC CE based indication, a MAC CE command could contain/comprise/include/provide at least one set of frequency subband index(es) corresponding/associated to a CSI resource subset/group configured/indicated in the CSI resource set for FSBM. For this case, the MAC CE command could also contain/comprise/include/provide the corresponding CSI resource subset/group ID.

In another example, a MAC CE command could contain/comprise/include/provide multiple (e.g., K) sets of frequency subband index(es) each corresponding/associated to a CSI resource subset/group configured/indicated in the CSI resource set for FSBM. For example, the K sets of frequency subband index(es) provided in the MAC CE command are one-to-one mapped to the K CSI resource subsets/groups configured in the CSI resource set(s) for FSBM; for instance, the first set of one or more frequency subband indexes in the MAC CE command could correspond to the first CSI resource subset/group (and therefore, the $N_1$ CSI-RS resources for FSBM configured therein) in the resource set, the second set of one or more frequency subband indexes in the MAC CE command could correspond to the second CSI resource subset/group (and therefore, the $N_2$ CSI-RS resources for FSBM configured therein) in the resource set, and so on, and the K-th set of one or more frequency subband indexes in the MAC CE command could correspond to the K-th CSI resource subset/group (and therefore, the $N_K$ CSI-RS resources for FSBM configured therein) in the resource set. For another example, the UE 116 could be provided/indicated by the network 130, via higher layer RRC signaling/parameter and/or MAC CE command and/or dynamic DCI based signaling, the mapping/association between the K sets of frequency subband index(es) indicated/configured/provided in the MAC CE command and the K CSI resource subsets/groups (and therefore, the corresponding CSI-RS resources for FSBM configured therein) indicated/configured in the CSI resource set(s) for FSBM. Optionally, the MAC CE command that provides the K sets of frequency subband indexes could also include/provide/indicate the K CSI resource subset/group IDs/indexes each associated/mapped to a set of frequency subband indexes discussed herein.

For dynamic DCI based signaling, one or more new DCI fields can be introduced to indicate one or more of the sets of frequency subband index(es), wherein each set could indicate one or more frequency subbands/CSI-RS resources configured in a CSI resource subset/group for FSBM; alternatively, one or more bits/codepoints of one or more existing DCI fields in a DCI format could be repurposed to indicate one or more of the sets of frequency subband index(es), wherein each set could indicate one or more frequency subbands/CSI-RS resources in a CSI resource subset/group for FSBM.

Yet for another example, the UE 116 could receive from the network 130 one or more MAC CE activation commands each activating one or more of the frequency subbands/CSI-RS resources configured in one or more CSI resource subsets/groups, where the activated one or more frequency subbands/CSI-RS resources are used/active for FSBM.

In one example, a MAC CE activation command could activate one or more of the frequency subbands configured/indicated for a CSI resource subset/group (and therefore, one or more of the CSI-RS resources configured/indicated in the CSI resource subset/group), and the activated one or more frequency subbands/CSI-RS resources in the CSI resource subset/group are used/active for FSBM. For this case, the MAC CE activation command could also contain/comprise/include/provide the corresponding CSI resource subset/group ID.

In another example, a MAC CE activation command could activate multiple (e.g., K) sets of one or more frequency subbands/CSI-RS resources with each set corresponding/associated to a CSI resource subset/group configured/indicated in the CSI resource set for FSBM. For example, the MAC CE activation command could activate the first set of one or more frequency subbands/CSI-RS resources from the $N_1$ frequency subbands/CSI-RS resources indicated/configured for/in the first CSI resource subset/group in the resource set, the second set of one or more frequency subbands/CSI-RS resources from the $N_2$ frequency subbands/CSI-RS resources indicated/configured for/in the second CSI resource subset/group in the resource set, and so on, and the K-th set of one or more frequency subbands/CSI-RS resources from the $N_K$ frequency subbands/CSI-RS resources indicated/configured for/in the K-th CSI resource subset/group in the resource set. For another example, the UE 116 could be provided/indicated by the network 130, via higher layer RRC signaling/parameter and/or MAC CE command and/or dynamic DCI based signaling, the mapping/association between the K sets of frequency subbands/CSI-RS resources activated by the MAC CE activation command and the K CSI resource subsets/groups indicated/configured in the CSI resource set(s) for FSBM. A set of frequency subbands/CSI-RS resources activated by the MAC CE activation command are used/active for FSBM. Optionally, the MAC CE activation command that activates the K sets of frequency subbands/CSI-RS resources could also include/provide/indicate the K CSI-RS resource IDs/indexes each associated/mapped to a set of activated frequency subbands/CSI-RS resources.

Yet for another example, the higher layer parameter, e.g., NZP-CSI-RS-Resource, that configures a CSI-RS resource in a CSI resource subset/group for FSBM could include/indicate/comprise an indicator. If the indicator is set to 'enabled'/'on' or the like, the corresponding CSI-RS resource (and therefore, the corresponding frequency subband) is used/active for FSBM for the corresponding CSI resource subset/group. Alternatively, the indicator could correspond to a one-big flag indicator. That is, if the one-bit flag indicator is set to '1' (or '0') or the like, the corresponding CSI-RS resource (and therefore, the corresponding frequency subband) is used/active for FSBM for the corresponding CSI resource subset/group.

In yet another example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in a CSI resource setting provided by CSI-ResourceConfig, one or more (e.g., K≥1) CSI resource sets (each provided by, e.g., CSI-SSB-ResourceSet/NZP-CSI-RS-ResourceSet) each comprising one or more (e.g., $N_k$) CSI-RS resources for FSBM, where k=1, . . . , K. In particular, the k-th CSI resource set, and therefore, the $N_k$ CSI-RS resources configured therein, could correspond to a set of $N_k{\ge}1$ frequency-selective beams (and therefore, the corresponding set of $N_k{\ge}1$ frequency subbands), where each CSI-RS resource configured in the k-th CSI resource set could correspond to a frequency-selective beam (and therefore, the corresponding frequency subband). In the present disclosure, the set of $N_k{\ge}1$ frequency-selective beams can also be referred to as a frequency-selective multi-beam. The indication/configuration of frequency subbands (in terms of their sizes and/or frequency domain resource allocations, etc.) for one or more CSI-RS resources, and the mapping/association between the frequency subbands and the CSI-RS resources could follow one more examples described herein (e.g., by replacing CSI resource subset/group with CSI resource set in one or more of these design examples). Furthermore, the activation/indication of one or more frequency subbands/CSI-RS resources in a CSI resource set for FSBM could follow one more examples described herein (e.g., by replacing CSI resource subset/group with CSI resource set in one or more of these design examples).

In yet another example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130 with one or more (e.g., K≥1) CSI resource settings (each provided by, e.g., CSI-ResourceConfig) each comprising one or more (e.g., $N_k$) CSI-RS resources for FSBM, where k=1, . . . , K. In particular, the k-th CSI resource setting, and therefore, the $N_k$ CSI-RS resources configured therein, could correspond to a set of $N_k{\ge}1$ frequency-selective beams (and therefore, the corresponding set of $N_k{\ge}1$ frequency subbands), where each CSI-RS resource configured in the k-th CSI resource setting could correspond to a frequency-selective beam (and therefore, the corresponding frequency subband). In the present disclosure, the set of $N_k{\ge}1$ frequency-selective beams can also be referred to as a frequency-selective multi-beam. The indication/configuration of the frequency subbands (in terms of their sizes and/or frequency domain resource allocations, etc.) for one or more CSI-RS resources, and the mapping/association between the frequency subbands and the CSI-RS resources could follow one more examples described herein (e.g., by replacing CSI resource subset/group with CSI resource setting in one or more of these design examples). Furthermore, the activation/indication of one or more frequency subbands/CSI-RS resources in a CSI resource setting for FSBM could follow one more examples described herein (e.g., by replacing CSI resource subset/group with CSI resource setting in one or more of these design examples).

A UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. As discussed herein, a UE could be provided/indicated by the network 130, e.g., via higher layer RRC signaling/parameter and/or MAC CE command and/or dynamic DCI based signaling, that one or more CSI-RS resources (each corresponding to a SSB resource or a NZP CSI-RS resource) and/or one or more CSI resource subsets/groups (each comprising one or more CSI-RS resources) and/or one or more CSI resource sets (each comprising one or more CSI resource subsets/groups or one or more CSI-RS resources) and/or one or more CSI resource settings (each comprising one or more CSI resource sets or one or more CSI resource subsets/groups or one or more CSI-RS resources) are (configured) for frequency-selective beam measurement for FSBM. That is, a CSI measurement setting could comprise/configure/indicate/provide CSI resource settings and/or CSI resource sets and/or CSI resource subsets/groups and/or CSI-RS resources for beam measurements for both FSBM and BM (or, non-frequency-selective BM (non-FSBM)); a CSI resource setting could comprise/configure/indicate/provide CSI resource sets and/or CSI resource subsets/groups and/or CSI-RS resources for beam measurements for both FSBM and non-FSBM; a CSI resource set could comprise/configure/indicate/provide CSI resource subsets/groups and/or CSI-RS resources for beam measurements for both FSBM and non-FSBM; and a CSI resource subset/group could comprise/configure/indicate/provide CSI-RS resources for beam measurements for both FSBM and non-FSBM.

In one example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be indicated/configured/provided by the network 130, via higher layer RRC signaling/parameter and/or MAC CE command and/or dynamic DCI based signaling, a bitmap to indicate RS resource(s) for frequency-selective beam measurement for FSBM.

For example, the higher layer parameter, e.g., CSI-MeasConfig, that configures a CSI measurement setting could provide/include/configure/indicate a bitmap with each bit position/entry of the bitmap corresponding to a CSI resource setting configured therein. If a bit position/entry of the bitmap is set to '1' (or '0'), the corresponding CSI resource setting (and therefore, the CSI resource sets and/or the CSI resource subsets/groups and/or CSI-RS resources configured therein) is for frequency-selective beam measurement for FSBM. Alternatively, the UE 116 could receive in a MAC CE command/DCI format the bitmap; the MAC CE command/DCI format could also include/provide/comprise/indicate the corresponding CSI measurement setting ID/index.

For another example, the higher layer parameter, e.g., CSI-ResourceConfig, that configures a CSI resource setting could provide/include/comprise a bitmap with each bit position/entry of the bitmap corresponding to a CSI resource set configured therein. If a bit position/entry of the bitmap is set to '1' (or '0'), the corresponding CSI resource set (and therefore, the CSI resource subsets/groups and/or CSI-RS resources configured therein) is for frequency-selective beam measurement for FSBM. Alternatively, the UE 116 could receive in a MAC CE command/DCI format the bitmap; the MAC CE command/DCI format could also include/provide/comprise/indicate the corresponding CSI resource setting ID/index.

Yet for another example, the higher layer parameter, e.g., CSI-SSB-ResourceSet/NZP-CSI-RS-ResourceSet, that configures a CSI resource set could provide/include/comprise a bitmap with each bit position/entry of the bitmap corresponding to a CSI resource subset/group configured therein. If a bit position/entry of the bitmap is set to '1' (or '0'), the corresponding CSI resource subset/group (and therefore, the CSI-RS resources configured therein) is for frequency-selective beam measurement for FSBM. Alternatively, the UE 116 could receive in a MAC CE command/DCI format the bitmap; the MAC CE command/DCI format could also include/provide/comprise/indicate the corresponding CSI resource set ID/index.

Yet for another example, the higher layer parameter, e.g., CSI-SSB-ResourceSet/NZP-CSI-RS-ResourceSet, that configures a CSI resource set could provide/include/comprise a bitmap with each bit position/entry of the bitmap corresponding to a CSI-RS resource configured therein. If a bit position/entry of the bitmap is set to '1' (or '0'), the corresponding CSI-RS resource (e.g., the corresponding SSB resource or NZP CSI-RS resource) is for frequency-selective beam measurement for FSBM. Alternatively, the UE 116 could receive in a MAC CE command/DCI format the bitmap; the MAC CE command/DCI format could also include/provide/comprise/indicate the corresponding CSI resource set ID/index.

Yet for another example, the higher layer parameter, e.g., CSI-SSB-ResourceSubSet/NZP-CSI-RS-ResourceSubSet, that configures a CSI resource subset/group could provide/include/comprise a bitmap with each bit position/entry of the bitmap corresponding to a CSI-RS resource configured therein. If a bit position/entry of the bitmap is set to '1' (or '0'), the corresponding CSI-RS resource (e.g., the corresponding SSB resource or NZP CSI-RS resource) is for frequency-selective beam measurement for FSBM. Alternatively, the UE 116 could receive in a MAC CE command/DCI format the bitmap; the MAC CE command/DCI format could also include/provide/comprise/indicate the corresponding CSI resource subset/group ID/index.

In another example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. A UE could be indicated/configured/provided by the network 130, via higher layer RRC signaling/parameter and/or MAC CE command and/or dynamic DCI based signaling, a set of IDs/indexes to indicate RS resource(s) for frequency-selective beam measurement for FSBM.

For example, the higher layer parameter, e.g., CSI-MeasConfig, that configures a CSI measurement setting could provide/include/comprise a set of one or more CSI resource setting IDs/indexes. The CSI resource setting(s) (and therefore, the CSI resource sets and/or the CSI resource subsets/groups and/or CSI-RS resources configured therein) that corresponds to the CSI resource setting ID(s)/index(es) configured in the same CSI measurement setting is for frequency-selective beam measurement for FSBM. Alternatively, the UE 116 could receive in a MAC CE command/DCI format the set of one or more CSI resource setting IDs/indexes; the MAC CE command/DCI format could also include/provide/comprise/indicate the corresponding CSI measurement setting ID/index.

For another example, the higher layer parameter, e.g., CSI-ResourceConfig, that configures a CSI resource setting could provide/include/comprise a set of one or more CSI resource set IDs/indexes. The CSI resource set(s) (and therefore, the CSI resource subsets/groups and/or CSI-RS resources configured therein) that corresponds to the CSI resource set ID(s)/index(es) configured in the same CSI resource setting is for frequency-selective beam measurement for FSBM. Alternatively, the UE 116 could receive in a MAC CE command/DCI format the set of one or more CSI resource set IDs/indexes; the MAC CE command/DCI format could also include/provide/comprise/indicate the corresponding CSI resource setting ID/index.

Yet for another example, the higher layer parameter, e.g., CSI-SSB-ResourceSet/NZP-CSI-RS-ResourceSet, that configures a CSI resource set could provide/include/comprise a set of one or more CSI resource subset/group IDs/indexes. The CSI resource subset(s)/group(s) (and therefore, the CSI-RS resources configured therein) that corresponds to the CSI resource subset/group ID(s)/index(es) configured in the same CSI resource subset/group is for frequency-selective beam measurement for FSBM. Alternatively, the UE 116 could receive in a MAC CE command/DCI format the set of one or more CSI resource subset/group IDs/indexes; the MAC CE command/DCI format could also include/provide/ comprise/indicate the corresponding CSI resource set ID/index.

Yet for another example, the higher layer parameter, e.g., CSI-SSB-ResourceSet/NZP-CSI-RS-ResourceSet, that configures a CSI resource set could provide/include/comprise a set of one or more CSI-RS resource IDs/indexes. The CSI-RS resource(s) (e.g., the corresponding SSB resource or NZP CSI-RS resource) that corresponds to the CSI-RS resource ID(s)/index(es) configured in the same CSI resource set is for frequency-selective beam measurement for FSBM. Alternatively, the UE 116 could receive in a MAC CE command/DCI format the set of one or more CSI-RS resource IDs/indexes; the MAC CE command/DCI format could also include/provide/comprise/indicate the corresponding CSI resource set ID/index.

Yet for another example, the higher layer parameter, e.g., CSI-SSB-ResourceSubSet/NZP-CSI-RS-ResourceSubSet, that configures a CSI resource subset/group could provide/ include/comprise a set of one or more CSI-RS resource IDs/indexes. The CSI-RS resource(s) (e.g., the corresponding SSB resource or NZP CSI-RS resource) that corresponds to the CSI-RS resource ID(s)/index(es) configured in the same CSI resource subset/group is for frequency-selective beam measurement for FSBM. Alternatively, the UE 116 could receive in a MAC CE command/DCI format the set of one or more CSI-RS resource IDs/indexes; the MAC CE command/DCI format could also include/provide/comprise/ indicate the corresponding CSI resource subset/group ID/index.

In yet another example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be indicated/configured/ provided by the network 130, via higher layer RRC signaling/parameter and/or MAC CE command and/or dynamic DCI based signaling, an indicator to indicate RS resource(s) for frequency-selective beam measurement for FSBM.

For example, the higher layer parameter, e.g., CSI-MeasConfig, that configures a CSI measurement setting could provide/indicate/configure/include the indicator; if the indicator is set to 'enabled'/'on' or the like, the CSI resource setting(s)—and therefore, the corresponding CSI resource set(s) and/or CSI resource subset(s)/group(s) and/or CSI-RS resource(s) configured therein—configured in the CSI measurement setting could be for frequency-selective beam measurement for FSBM. Alternatively, the indicator could correspond to a one-bit flag indicator; if the one-bit flag indicator is set to '1' (or '0') or the like, the CSI resource setting(s)—and therefore, the corresponding CSI resource set(s) and/or CSI resource subset(s)/group(s) and/or CSI-RS resource(s) configured therein—configured in the CSI measurement setting could be for frequency-selective beam measurement for FSBM.

For another example, the higher layer parameter, e.g., CSI-ResourceConfig, that configures a CSI resource setting could provide/indicate/configure/include the indicator; if the indicator is set to 'enabled'/'on' or the like, the CSI resource set(s)—and therefore, the corresponding CSI resource subset(s)/group(s) and/or CSI-RS resource(s) configured therein—configured in the CSI resource setting could be for frequency-selective beam measurement for FSBM. Alternatively, the indicator could correspond to a one-bit flag indicator; if the one-bit flag indicator is set to '1' (or '0') or the like, the CSI resource set(s)—and therefore, the corresponding CSI resource set(s) and/or CSI resource subset(s)/group(s) and/or CSI-RS resource(s) configured therein—configured in the CSI resource setting could be for frequency-selective beam measurement for FSBM.

Yet for another example, the higher layer parameter, e.g., CSI-SSB-ResourceSet or NZP-CSI-RS-ResourceSet, that configures a CSI resource set could provide/indicate/configure/include the indicator; if the indicator is set to 'enabled'/ 'on' or the like, the CSI resource subset(s)/group(s)—and therefore, the corresponding CSI-RS resource(s) configured therein—configured in the CSI resource set could be for frequency-selective beam measurement for FSBM. Alternatively, the indicator could correspond to a one-bit flag indicator; if the one-bit flag indicator is set to '1' (or '0') or the like, the CSI resource subset(s)/group(s)—and therefore, the corresponding CSI-RS resource(s) configured therein—configured in the CSI resource set could be for frequency-selective beam measurement for FSBM.

Yet for another example, the higher layer parameter, e.g., NZP-CSI-RS-Resource, that configures a CSI-RS resource could provide/indicate/configure/include the indicator; if the indicator is set to 'enabled'/'on' or the like, the corresponding CSI-RS resource could be for frequency-selective beam measurement for FSBM. Alternatively, the indicator could correspond to a one-bit flag indicator; if the one-bit flag indicator is set to '1' (or '0') or the like, the corresponding CSI-RS resource could be for frequency-selective beam measurement for FSBM.

In yet another example, the RS resource(s) configured/ indicated in a CSI resource subset/group as discussed herein is for frequency-selective beam measurement for FSBM.

A unified TCI framework could indicate/include N≥1 DL TCI states and/or M≥1 UL TCI states, wherein the indicated TCI state could be at least one of: a DL TCI state and/or its corresponding/associated TCI state ID, an UL TCI state and/or its corresponding/associated TCI state ID, a joint DL and UL TCI state and/or its corresponding/associated TCI state ID, and separate DL TCI state and UL TCI state and/or their corresponding/associated TCI state ID(s).

There could be various design options/channels to indicate to the UE 116 a beam (i.e., a TCI state) for the transmission/reception of a PDCCH or a PDSCH.

In one example, a MAC CE could be used to indicate to the UE 116 a beam (i.e., a TCI state and/or a TCI state ID) for the transmission/reception of a PDCCH or a PDSCH.

In another example, a DCI could be used to indicate to the UE 116 a beam (i.e., a TCI state and/or a TCI state ID) for the transmission/reception of a PDCCH or a PDSCH. For example, a DL related DCI (e.g., DCI format 1_0, DCI format 1_1, or DCI format 1_2) could be used to indicate to the UE 116 abeam (i.e., a TCI state and/or a TCI state ID) for the transmission/reception of a PDCCH or a PDSCH, wherein the DL related DCI may or may not include a DL assignment. For another example, an UL related DCI (e.g., DCI format 00, DCI format 01, DCI format 0_2) could be used to indicate to the UE 116 a beam (i.e., a TCI state and/or a TCI state ID) for the transmission/reception of a PDCCH or a PDSCH, wherein the UL related DCI may or may not include an UL scheduling grant. Yet for another example, a custom/purpose designed DCI format could be used to indicate to the UE 116 a beam (i.e., a TCI state and/or a TCI state ID) for the transmission/reception of a PDCCH or a PDSCH.

Rel-17 introduced the unified TCI framework, where a unified or master or main TCI state is signaled to the UE 116. The unified or master or main TCI state can be one of: in case of joint TCI state indication, wherein a same beam is used for DL and UL channels, a joint TCI state that can be used at least for UE-dedicated DL channels and UE-dedicated UL channels; in case of separate TCI state indication, wherein different beams are used for DL and UL channels, a DL TCI state can be used at least for UE-dedicated DL channels; in case of separate TCI state indication, wherein different beams are used for DL and UL channels, a UL TCI state can be used at least for UE-dedicated UL channels.

The unified (master or main) TCI state is the TCI state of UE-dedicated reception on PDSCH/PDCCH or dynamic-grant/configured-grant based PUSCH and all dedicated PUCCH resources. Throughout the present disclosure, the term "TCI state" or "TCI state ID" could refer to a single Rel-17 unified TCI state as discussed herein (e.g., a joint DL and UL TCI state, a separate DL TCI state or a separate UL TCI state) or a pair of Rel-17 unified TCI states as discussed herein (e.g., a pair of separate DL and UL TCI states).

A UE could be first provided by the network 130, e.g., via higher layer RRC signaling (e.g., in PDSCH-Config), one or more lists of TCI states. For instance, the UE 116 could be provided by the network 130, e.g., via higher layer RRC signaling (e.g., in PDSCH-Config), a list of up to $N_{joint} \geq 1$ joint DL and UL TCI states each provided by DLorJointTCI-State and/or a list of up to $N_{ul} \geq 1$ separate UL TCI states each provided by UL-TCIState. The UE 116 could also be configured/indicated/provided by the network 130, e.g., via higher layer RRC signaling and/or MAC CE command and/or dynamic DCI based signaling, that one or more TCI states configured/provided in one or more of the higher layer configured lists of TCI states are for frequency-selective beam indication for FSBM.

For example, the higher layer parameter that configures a list of TCI states could indicate/provide/include an indicator. If the indicator is configured or set to 'enabled', the corresponding list of TCI states is for frequency-selective beam indication for FSBM.

For another example, the higher layer parameter that configures a list of TCI states could indicate/provide/include a one-bit flag indicator. If the one-bit flag indicator is configured or set to '1' (or '0'), the corresponding list of TCI states is for frequency-selective beam indication for FSBM.

Yet for another example, the higher layer parameter that configures a list of TCI states could indicate/provide/include a set of TCI state indexes/IDs, wherein the TCI states correspond to the set of TCI state indexes/IDs for frequency-selective beam indication for FSBM.

Yet for another example, the higher layer parameter that configures a list of TCI states could indicate/provide/include a bitmap with each bit position/entry in the bitmap corresponding/associated with a TCI state configured in the list of TCI states. If a bit position/entry in the bitmap is set to '1' (or '0'), the TCI state corresponding/associated with the bit position/entry is for frequency-selective beam indication for FSBM.

Yet for another example, the UE 116 could receive from the network 130 a MAC CE activation command activating one or more TCI states from the higher layer configured list(s) of TCI states for frequency-selective beam indication for FSBM.

Furthermore, the UE 116 could receive from the network 130 a MAC CE activation command activating one or more TCI states from the higher layer configured list(s) of TCI states. The MAC CE activated one or more TCI states are also mapped to one or more (e.g., up to $N_{cp} \geq 1$) TCI codepoints.

A TCI codepoint could correspond to up to $M \geq 1$ joint DL and UL TCI states or up to $M \geq 1$ separate DL TCI states or up to $N \geq 1$ separate UL TCI states or up to $M \geq 1$ (or $N \geq 1$) pairs of separate DL and UL TCI states.

For example, a TCI codepoint could correspond to m joint DL and UL TCI states, where $m \in \{1, \ldots, M\}$. For another example, a TCI codepoint could correspond to m separate DL TCI states, where $m \in \{1, \ldots, M\}$. Yet for another example, a TCI codepoint could correspond to n separate UL TCI states, where $n \in \{1, \ldots, N\}$. Yet for another example, a TCI codepoint could correspond to m (or n) pairs of separate DL and UL TCI states, where $m \in \{1, \ldots, M\}$, $n \in \{1, \ldots, N\}$.

Throughout the present disclosure, indicating $M \geq 1$ (or $N \geq 1$) TCI states/pairs of TCI states in the MAC CE/DCI for beam indication and/or having a MAC CE activated TCI codepoint corresponding to $M \geq 1$ (or $N \geq 1$) TCI states/pairs of TCI states are the design focus; the corresponding designs, descriptions, and discussions also apply for indicating m (or n) TCI state(s)/pair(s) of TCI states in the MAC CE/DCI for beam indication and/or having a MAC CE activated TCI codepoint corresponding to m (or n) TCI state(s)/pair(s) of TCI states, where $m \in \{1, \ldots, M\}$, $n \in \{1, \ldots, N\}$.

The UE 116 could be configured/indicated by the network 130, e.g., via higher layer RRC signaling and/or MAC CE command and/or dynamic DCI based signaling, that one or more of the MAC CE activated TCI codepoints are for frequency-selective beam indication for FSBM.

For example, the MAC CE activation command that activates the one or more TCI codepoints could indicate/provide/include an indicator. If the indicator is configured or set to 'enabled', the corresponding TCI codepoints (and therefore, the corresponding TCI states) activated by the MAC CE activation command are for frequency-selective beam indication for FSBM.

For another example, the MAC CE activation command that activates the one or more TCI codepoints could indicate/ provide/include a one-bit flag indicator. If the one-bit flag indicator is configured or set to '1' (or '0'), the corresponding TCI codepoints (and therefore, the corresponding TCI states) activated by the MAC CE activation command are for frequency-selective beam indication for FSBM.

Yet for another example, the MAC CE activation command that activates the one or more TCI codepoints could indicate/provide/include a set of TCI codepoint indexes/IDs, wherein the TCI codepoints (and therefore, the corresponding TCI states) correspond to the set of TCI codepoint indexes/IDs are for frequency-selective beam indication for FSBM.

Yet for another example, the MAC CE activation command that activates the one or more TCI codepoints could indicate/provide/include a bitmap with each bit position/ entry in the bitmap corresponding/associated with a TCI codepoint activated by the MAC CE activation command. If a bit position/entry in the bitmap is set to '1' (or '0'), the TCI codepoint (and therefore, the corresponding TCI states) corresponding/associated with the bit position/entry is for frequency-selective beam indication for FSBM.

Yet for another example, the UE 116 could receive from the network 130 another MAC CE activation command activating one or more TCI codepoints from the MAC CE activated TCI codepoints for frequency-selective beam indication for FSBM.

The UE 116 could be indicated by the network 130, e.g., in a MAC CE or DCI (e.g., DCI format 1_1 or 1_2 with or without DL assignment), N≥1 (or M≥1) TCI states/pairs of TCI states. For DCI based TCI state/beam indication, the TCI states/pairs of TCI states could be indicated via one or more TCI codepoints in one or more TCI fields of the corresponding DCI format. In the present disclosure, an indicated TCI state/pair of TCI states could correspond to one or more transmission (TX) frequency subbands, and different indicated TCI states/pairs of TCI states could correspond to different TX frequency subbands, wherein each TX frequency subband could be characterized by a number of PRBs and/or a starting RB. Furthermore, a TCI state could comprise/include/indicate one or more (QCL) source RSs (e.g., with different QCL types), and is indicated for one or more target channels/signals including PDCCH, PDSCH, PUCCH, PUSCH, CSI-RS and/or SRS.

The UE 116 could be indicated by the network 130, e.g., in a MAC CE or DCI (e.g., DCI format 1_1 or 1_2 with or without DL assignment), a single (i.e., N=1 or M=1) TCI state/pair of TCI states. Here, the TCI state/pair of TCI states (and therefore, the corresponding source RS(s) indicated therein) could be indicated for one or more (e.g., $N_{fx}≥1$) TX frequency subbands; furthermore, each TX frequency subband could be for a set of target channels/signals including PDCCH, PDSCH, PUCCH, PUSCH, CSI-RS and/or SRS.

The UE 116 could be first configured/indicated/provided by the network 130, via higher layer RRC signaling and/or MAC CE command and/or dynamic DCI based signaling, the TX frequency subband(s) including their bandwidths/ sizes, starting RBs, etc. for the indicated TCI state. There are various means to indicate/configure the TX frequency subband(s) corresponding/associated with the indicated TCI state.

In one example, a higher layer parameter, e.g., that configures the TCI state, e.g., TCI-State, QCL-Info, DLor-JointTCI-State or ULTCI-State, could indicate/include $N_{fx}$ TX frequency subband configurations. A TX frequency subband configuration could contain/comprise at least a TX frequency subband index, a frequency domain allocation of REs for a TX frequency subband, and a frequency domain allocation of RBs for a TX frequency subband including at least a starting RB and a number of PRBs across which the corresponding TX frequency subband spans. Alternatively, one or more of the discussed herein $N_{fx}$ TX frequency subband configurations could be indicated in one or more DCIs, via one or more new DCI fields or by repurposing one or more bits/codepoints of one or more existing DCI fields in the DCI(s). Optionally, one or more of the discussed herein $N_{fx}$ TX frequency subband configurations could be indicated/provided/included in one or more MAC CE commands; for this case, a MAC CE command could also include/indicate/provide the corresponding TCI state ID/index and/or frequency subband index(es). The $N_{fx}$ TX frequency subband configurations discussed herein and the $N_{fx}$ TX frequency subbands for the indicated TCI state could be one-to-one mapped; for instance, the first TX frequency subband configuration could correspond to the first TX frequency subband, the second TX frequency subband configuration could correspond to the second TX frequency subband, and so on, and the $N_{fx}$-th TX frequency subband configuration could correspond to the $N_{fx}$-th TX frequency subband. Alternatively, the UE 116 could be indicated/ provided by the network 130, e.g., via higher layer RRC signaling/parameter and/or MAC CE command and/or dynamic DCI based signaling, the mapping/association between the $N_{fx}$ TX frequency subband configurations and the $N_{fx}$ TX frequency subbands for the indicated TCI state.

In another example, the UE 116 could receive from the network 130, via higher layer RRC signaling (e.g., in TCI-State, QCL-Info, DLorJointTCI-State or ULTCI-State) and/or MAC CE command and/or dynamic DCI based signaling, one or more bitmaps (e.g., $N_{fx}$ bitmaps) each for a TX frequency subband for the indicated TCI state. Each bit position/entry in a bitmap could correspond to a PRB or PRB index among all the PRBs, e.g., configured within the BWP/CC. If a bit position/entry of a bitmap is set to '1' (or '0'), the corresponding PRB or PRB index is allocated for the TX frequency subband corresponding/associated with the bitmap. A bitmap for a TX frequency subband could contain/comprise more than one bit positions/entries set to '1' (or '0'). The higher layer parameter(s), e.g., TCI-State, QCL-Info, DLorJointTCI-State, or ULTCI-State, that provides the one or more bitmaps could also include/provide/ indicate $N_{fx}$ TX frequency subband indexes each associated/ mapped to a bitmap. If the TX frequency subband size/ allocation (e.g., the one or more bitmaps discussed herein) is indicated via one or more DCIs, one or more new DCI fields can be introduced to indicate the one or more bitmaps; alternatively, one or more bits/codepoints of one or more existing DCI fields could be repurposed to indicate the one or more bitmaps. If the TX frequency subband size/alloca-tion (e.g., the one or more bitmaps discussed herein) is indicated in one or more MAC CE commands, a MAC CE command could also indicate/provide/include the corre-sponding TCI state ID/index and/or TX frequency subband index(es). The $N_{fx}$ bitmaps discussed herein and the $N_{fx}$ TX frequency subbands could be one-to-one mapped; for instance, the first bitmap could correspond to the first TX frequency subband, the second bitmap could correspond to the second TX frequency subband, and so on, and the $N_{fx}$-th bitmap could correspond to the $N_{fx}$-th TX frequency sub-band. Alternatively, the UE 116 could be indicated/provided by the network 130, e.g., via higher layer RRC signaling/ parameter and/or MAC CE command and/or dynamic DCI based signaling, the mapping/association between the $N_{fx}$ bitmaps and the $N_{fx}$ TX frequency subbands.

In yet another example, the UE 116 could receive from the network 130, via higher layer RRC signaling (e.g., in TCI-State, QCL-Info, DLorJointTCI-State or ULTCI-State) and/or MAC CE command and/or dynamic DCI based signaling, a bitmap for one or more of the TX frequency subbands. Each bit position/entry in the bitmap could correspond to a PRB or PRB index among all the PRBs, e.g., configured within the BWP/CC. Furthermore, each bit position/entry in the bitmap could be mapped/associated with a TX frequency subband. The mapping/association between the bit positions/entries in the bitmap and the TX frequency subbands could be fixed. For instance, the bitmap can be partitioned into $N_{tx}$ parts each comprising one or more bit positions/entries; for this case, the first part of the bitmap could correspond to the first TX frequency subband, the second part of the bitmap could correspond to the second TX frequency subband, and so on, and the $N_{tx}$-th part of the bitmap could correspond to the $N_{tx}$-th TX frequency subband; the UE 116 could be provided/indicated/configured by the network 130, via higher layer RRC signaling and/or MAC CE command and/or dynamic DCI based signaling, how the bitmap is partitioned. Alternatively, the UE 116 could be provided/indicated/configured by the network 130, via higher layer RRC signaling and/or MAC CE command and/or dynamic DCI based signaling, the mapping/association between the bit positions/entries in the bitmap and the TX frequency subbands. If a bit position/entry of a bitmap is set to '1' (or '0'), the corresponding PRB or PRB index is allocated for the TX frequency subband corresponding/associated with the bit position/entry. The bitmap could contain/comprise more than one bit positions/entries set to '1' (or '0'). The higher layer parameter(s), e.g., in TCI-State, QCL-Info, DLorJointTCI-State, or ULTCI-State, that provides the bitmap could also include/provide/indicate $N_{tx}$ TX frequency subband indexes each associated/mapped to one or more bit positions/entries (e.g., a part discussed herein) in the bitmap. If the TX frequency subband size/allocation (e.g., the bitmap discussed herein) is indicated via one or more DCIs, one or more new DCI fields can be introduced to indicate the bitmap; alternatively, one or more bits/codepoints of one or more existing DCI fields could be repurposed to indicate the bitmap. If the frequency subband size/allocation (e.g., the bitmap discussed herein) is indicated in one or more MAC CE command(s), a MAC CE command could also indicate/provide/include the corresponding TCI state ID/index and/or TX frequency subband index(es).

In yet another example, the UE 116 could receive from the network 130 one or more MAC CE activation commands (e.g., $N_{tx}$ MAC CE activation commands) each for a TX frequency subband for the indicated TCI state. Each MAC CE activation command could activate one or more PRBs or PRB indexes—from all the PRBs configured, e.g., within the BWP/CC—for the corresponding/associated TX frequency subband. For this case, each MAC CE activation command could include/provide/indicate the corresponding TCI state ID/index and/or TX frequency subband index(es).

In yet another example, the UE 116 could receive from the network 130 a MAC CE activation command activating one or more PRBs or PRB indexes—from all the PRBs configured, e.g., within the BWP/CC—for one or more of the TX frequency subbands for the indicated TCI state. For instance, the MAC CE activation command could activate one or more PRBs or PRB indexes—from all the PRBs configured, e.g., within the BWP/CC—for the first TX frequency subband, one or more PRBs or PRB indexes—from all the PRBs configured, e.g., within the BWP/CC—for the second TX frequency subband, and so on, and one or more PRBs or PRB indexes—from all the PRBs configured, e.g., within the BWP/CC—for the $N_{tx}$-th TX frequency subband. For this case, the MAC CE activation command could include/provide/indicate the corresponding TCI state ID/index.

In yet another example, the TX frequency subbands for the indicated TCI state—e.g., the $N_{tx}$ TX frequency subbands for the indicated TCI state—could have the same bandwidth/size. For this case, the UE 116 could be provided by the network 130, via higher layer RRC signaling (e.g., in TCI-State, QCL-Info, DLorJointTCI-State or ULTCI-State) and/or MAC CE command and/or dynamic DCI based signaling, a common TX frequency subband bandwidth/size (e.g., in number of PRBs) and/or $N_{tx}$ and/or one or more starting RBs of one or more TX frequency subbands. In addition, the TX frequency subbands for the indicated TCI state—e.g., the $N_{tx}$ TX frequency subbands for the indicated TCI state—could equally divide the total PRBs configured, e.g., within the BWP/CC. For this case, the UE 116 could be provided by the network 130, via higher layer RRC signaling (e.g., in TCI-State, QCL-Info, DLorJointTCI-State or ULTCI-State) and/or MAC CE command and/or dynamic DCI based signaling, $N_{tx}$ and/or one or more starting RBs of one or more TX frequency subbands.

In yet another example, the TX frequency subbands could correspond to the frequency subbands configured for frequency-selective beam measurement for FSBM (e.g., one more examples described herein) and/or one or more reporting frequency subbands, with which one or more (frequency-selective) CSI/beam reports are associated. For instance, the TX frequency subbands could correspond to the frequency subbands configured for the k-th CSI-RS resource in a CSI resource subset/group or CSI resource set or CSI resource setting for frequency-selective beam measurement for FSBM, or the frequency subbands configured for the CSI-RS resources in the k-th CSI resource subset/group in a resource set for frequency-selective beam measurement for FSBM, where $k \in \{1, \ldots, K\}$. The index, k in this example, of the CSI-RS resource or CSI resource subset/group for frequency-selective beam measurement for FSBM—the corresponding measurement frequency subbands correspond to the TX frequency subbands as discussed herein, could be fixed in the system specifications, and known to both the network 130 and UE sides a prior. Alternatively, the UE 116 could be indicated/configured/provided by the network 130, e.g., via higher layer RRC signaling and/or MAC CE command and/or dynamic DCI based signaling, the index, k in this example, of the CSI-RS resource or CSI resource subset/group for frequency-selective beam measurement for FSBM—the corresponding measurement frequency subbands correspond to the TX frequency subbands as discussed herein. Furthermore, the TX frequency subbands could be one-to-one mapped to the frequency subbands configured for frequency-selective beam measurement for FSBM (or the reporting frequency subbands, with which the CSI/beam reports are associated)—e.g., the first TX frequency subband is associated to the first measurement frequency subband, the second TX frequency subband is associated to the second measurement frequency subband, and so on. Optionally, the UE 116 could be indicated/configured/provided by the network 130, e.g., via higher layer RRC signaling and/or MAC CE command and/or dynamic DCI based signaling, the mapping/association relationship between the TX frequency subbands and the frequency subbands configured for frequency-selective beam measurement for FSBM (or the reporting frequency subbands, with which the CSI/beam reports are associated).

In yet another example, the TX frequency subbands could correspond to the frequency subbands indicated in a DCI (e.g., DCI format 1_1 or 1_2) for DL and/or UL resource allocation. The frequency subbands for resource allocation/assignment (RA) could be indicated in the frequency domain resource allocation (FD-RA) field(s) of a DCI. The FD-RA field could contain a bitmap with each bit position/entry in the bitmap corresponding to a resource block group (RBG)—Type 0; i.e., the bitmap indicates the frequency domain resource allocation in RBG(s). The FD-RA field could contain a resource indicator value (RIV) indicating the continuous virtual resource blocks (VRBs)—Type 1; depending on the value of "VRB-to-PRB mapping", the corresponding PRBs associated with the indicated VRBs could be identified. There could be various means to associate/map the TX frequency subbands and the frequency subbands indicated in the FD-RA field(s) for DL/UL RA.

For example, the mapping/association between the TX frequency subbands and the frequency subbands indicated in FD-RA field(s) for DL/UL RA could be fixed (e.g., in the system specifications) and known to both the network 130 and UE sides a prior. For instance, for Type 0 RA, the first one or more bit positions/entries (and therefore the corresponding RBGs) in the bitmap could be associated with the first TX frequency subband, the second one or more bit positions/entries (and therefore, the corresponding RBGs) in the bitmap could be associated to the second TX frequency subband, and so on. For Type 1 RA, a first RIV (and therefore, the corresponding PRBs) could be associated with the first TX frequency subband, a second RIV (and therefore, the corresponding PRBs) could be associated with the second TX frequency subband, and so on.

For another example, the UE 116 could be indicated/configured/provided by the network 130, e.g., via higher layer RRC signaling/parameter and/or MAC CE command and/or dynamic DCI based signaling, the mapping/association between the TX frequency subbands and the frequency subbands indicated in FD-RA field(s) for DL/UL RA. For instance, for Type 0 RA, the UE 116 could be indicated/configured/provided by the network 130, e.g., via higher layer RRC signaling/parameter and/or MAC CE command and/or dynamic DCI based signaling, the association/mapping between the TX frequency subbands and one or more bit positions/entries (and therefore, the corresponding RBGs) in the bitmap. For Type 1 RA, the UE 116 could be indicated/configured/provided by the network 130, e.g., via higher layer RRC signaling/parameter and/or MAC CE command and/or dynamic DCI based signaling, the association/mapping between the TX frequency subbands and one or more RIVs (and therefore, the corresponding PRBs).

In yet another example, the UE 116 could be indicated by the network 130, e.g., in a DCI (e.g., DCI format 1_1 or 1_2), one or more (e.g., $N_{tx}$) bitmaps in FD-RA field(s) of the DCI format each providing one or more (multiples of) RBGs and associated to a TX frequency subband. For instance, the first indicated bitmap (and therefore, the corresponding indicated RBGs) could be associated with the first TX frequency subband, the second indicated bitmap (and therefore, the corresponding indicated RBGs) could be associated with the second TX frequency subband, and so on. Alternatively, the UE 116 could be indicated/configured/provided by the network 130, e.g., via higher layer RRC signaling/parameter and/or MAC CE command and/or dynamic DCI based signaling, the association/mapping between the TX frequency subbands and the one or more (e.g., $N_{tx}$) bitmaps (and therefore, the corresponding RBGs) in the FD-RA field(s).

In yet another example, the UE 116 could be indicated by the network 130, e.g., in a DCI (e.g., DCI format 1_1 or 1_2), one or more (e.g., $N_{tx}$) RIVs in FD-RA field(s) of the DCI format each providing one or more PRBs and associated to a TX frequency subband. For instance, the first indicated RIV (and therefore, the corresponding indicated PRBs) could be associated with the first TX frequency subband, the second indicated RIV (and therefore, the corresponding indicated PRBs) could be associated with the second TX frequency subband, and so on. Alternatively, the UE 116 could be indicated/configured/provided by the network 130, e.g., via higher layer RRC signaling/parameter and/or MAC CE command and/or dynamic DCI based signaling, the association/mapping between the TX frequency subbands and the one or more (e.g., $N_{tx}$) RIVs (and therefore, the corresponding PRBs) in the FD-RA field(s).

In yet another example, the UE 116 could be indicated by the network 130, e.g., in a DCI (e.g., DCI format 1_1 or 1_2), one or more (e.g., $N_{tx}$) FD-RA fields of the DCI format each providing one or more bitmaps (each providing a number of RBGs) and/or one or more RIVs (each providing a number of PRBs); each FD-RA field is associated to a TX frequency subband. For instance, the first indicated FD-RA field (and therefore, the corresponding bitmap(s) providing a number of RBGs and RIV(s) providing a number of PRBs) could be associated with the first TX frequency subband, the second indicated FD-RA field (and therefore, the corresponding bitmap(s) providing a number of RBGs and RIV(s) providing a number of PRBs) could be associated to the second TX frequency subband, and so on. Alternatively, the UE 116 could be indicated/configured/provided by the network 130, e.g., via higher layer RRC signaling/parameter and/or MAC CE command and/or dynamic DCI based signaling, the association/mapping between the TX frequency subbands and the one or more (e.g., $N_{tx}$) FD-RA fields in a DCI (and therefore, the corresponding bitmap(s) providing one or more RBGs and/or RIV(s) providing one or more PRBs).

In yet another example, one or more examples described herein or combinations of one or more examples described herein could be used to configured/indicate the one or more TX frequency subbands for the indicated TCI state.

For the $N_{tx}$ TX frequency subbands configured/indicated for a TCI state according to one or more of the discussed herein design examples, the UE 116 could be further indicated/configured/provided by the network 130, via higher layer RRC signaling/parameter and/or MAC CE command and/or dynamic DCI based signaling, one or more of the total configured/indicated TX frequency subbands (e.g., one or more of the Nt TX frequency subbands) are active for frequency-selective beam indication for FSBM.

In one example, the UE 116 could receive from the network 130, via higher layer RRC signaling/parameter and/or MAC CE command and/or dynamic DCI based signaling, a bitmap of length $N_{tx}$ with each bit position/entry in the bitmap corresponding to a TX frequency subband configured/indicated according to one more examples described herein. If a bit position/entry in the bitmap is set to '1' (or '0'), the corresponding TX frequency subband is used/active—for the indicated TCI state—for frequency-selective beam indication for FSBM. The bitmap could comprise more than one bit positions/entries set to '1' (or '0') indicating that more than one configured/indicated TX frequency subbands can be used/active—for the indicated TCI state—for frequency-selective beam indication for FSBM. For example, for RRC based configuration, the bitmap could be provided in the higher layer parameter(s), e.g., TCI-State, QCL-Info, DLorJointTCI-State or ULTCI-State, that configures a TCI state. For another example, for MAC CE based indication, a MAC CE command could contain/comprise/include the bitmap; for this case, the MAC CE command could also contain/comprise/include the corresponding TCI state ID/index. Yet for another example, for dynamic DCI based signaling, one or more new DCI fields can be introduced to indicate the bitmap indicating one or more active TX frequency subbands—for the indicated TCI state—for frequency-selective beam indication for FSBM; alternatively, one or more bits/codepoints of one or more existing DCI fields could be repurposed to indicate the bitmap.

In another example, the UE 116 could receive from the network 130, via higher layer RRC signaling/parameter and/or MAC CE command and/or dynamic DCI based signaling, a set of one or more TX frequency subband indexes each determined from $\{1, \ldots, N_{tx}\}$. For this case, the TX frequency subband(s) corresponding to the indicated/configured/provided TX frequency subband index(es) is used/active—for the indicated TCI state—for frequency-selective beam indication for FSBM. For example, for RRC based configuration, the set of one or more TX frequency subband indexes could be indicated/configured/provided in the higher layer parameter(s), e.g., TCI-State, QCL-Info, DLorJointTCI-State or ULTCI-State, that configures a TCI state. For another example, for MAC CE based indication, a MAC CE command could contain/comprise/include the set of TX frequency subband index(es); for this case, the MAC CE command could also contain/comprise/include the corresponding TCI state ID/index. Yet for another example, for dynamic DCI based signaling, one or more new DCI fields can be introduced to indicate the set of TX frequency subband index(es), wherein each set could indicate one or more TX frequency subbands—for the indicated TCI state—for frequency-selective beam indication for FSBM; alternatively, one or more bits/codepoints of one or more existing DCI fields in a DCI format could be repurposed to indicate the set of TX frequency subband index(es).

In yet another example, the UE 116 could receive from the network 130 a MAC CE activation command activating one or more of the $N_{tx}$ TX frequency subbands, where the activated one or more TX frequency subbands are used/active—for the indicated TCI state—for frequency-selective beam indication for FSBM. For this case, the MAC CE activation command could also contain/comprise/include the corresponding TCI state ID/index.

In yet another example, the higher layer parameter that configures a TX frequency subband for the indicated TCI state/pair of TCI states could include/indicate/comprise an indicator. If the indicator is set to 'enabled'/'on' or the like, the corresponding TX frequency subband is used/active—for the corresponding indicated TCI state/pair of TCI states—for frequency-selective beam indication for FSBM. Alternatively, the indicator could correspond to a one-big flag indicator. That is, if the one-bit flag indicator is set to '1' (or '0') or the like, the corresponding TX frequency subband is used/active—for the corresponding indicated TCI state/pair of TCI states—for frequency-selective beam indication for FSBM.

As discussed herein, a UE could be indicated by the network 130, e.g., in a MAC CE or DCI (e.g., DCI format 1_1 or 1_2 with or without DL assignment), a single (i.e., N=1 or M=1) TCI state/pair of TCI states; furthermore, the UE 116 could be indicated/configured/provided by the network 130, via higher layer RRC signaling and/or MAC CE command and/or dynamic DCI based signaling, one or more TX frequency subbands for the indicated TCI state following one more examples described herein. Here, the indicated TCI state could indicate/provide one or more (e.g., $N_{rs}$) QCL source RSs (with the same or different QCL types)—e.g., the higher layer parameter(s) TCI-State, QCL-Info, DLorJointTCI-State or UL-TCIState that configures a TCI state could include/contain/provide the one or more (QCL) source RSs—each corresponding/associated to one or more of the TX frequency subbands configured/indicated for the indicated TCI state/pair of TCI states for frequency-selective beam indication for FSBM.

In one example, the UE 116 could be indicated/configured/provided by the network 130, e.g., via higher layer RRC signaling/parameter and/or MAC CE command and/or dynamic DCI based signaling, one or more (e.g., $N_{rs}$) sets of TX frequency subband indexes each for a QCL source RS indicated in the corresponding TCI state. The indicated/configured one or more sets of TX frequency subband indexes and the QCL source RSs indicated in the corresponding TCI state could be one-to-one mapped—e.g., the first indicated/configured set of TX frequency subband indexes (and therefore, the corresponding TX frequency subbands) is associated to the first indicated QCL source RS in the TCI state, the second indicated/configured set of TX frequency subband indexes (and therefore, the corresponding TX frequency subbands) is associated to the second indicated QCL source RS in the TCI state, and so on, and the $N_{rs}$-th indicated/configured set of TX frequency subband indexes (and therefore, the corresponding TX frequency subbands) is associated to the $N_{rs}$-th indicated QCL source RS in the TCI state. Alternatively, the UE 116 could be indicated/configured/provided by the network 130, e.g., via higher layer RRC signaling/parameter and/or MAC CE command and/or dynamic DCI based signaling, the association/mapping between the indicated/configured one or more sets of TX frequency subband indexes (and therefore, the corresponding TX frequency subbands) and the QCL source RSs indicated in the corresponding TCI state.

In another example, the UE 116 could be indicated/configured/provided by the network 130, e.g., via higher layer RRC signaling/parameter and/or MAC CE command and/or dynamic DCI based signaling, a set of TX frequency subband indexes. The set of TX frequency subband indexes could be partitioned into one or more (e.g., $N_{rs}$) parts—each part comprises one or more of the TX frequency subband indexes in the set—each for a QCL source RS indicated in the corresponding TCI state. The partition of the set of TX frequency subband indexes into the one or more (e.g., $N_{rs}$) parts could be fixed in the system specifications and/or indicated/configured to the UE 116 via higher layer RRC signaling and/or MAC CE command and/or dynamic DCI based signaling. The one or more parts of the indicated/configured set of TX frequency subband indexes and the QCL source RSs indicated in the corresponding TCI state could be one-to-one mapped—e.g., the first part of the indicated/configured set of TX frequency subband indexes (and therefore, the corresponding TX frequency subbands) is associated to the first indicated QCL source RS in the TCI state, the second part of the indicated/configured set of TX frequency subband indexes (and therefore, the corresponding TX frequency subbands) is associated to the second indicated QCL source RS in the TCI state, and so on, and the $N_{rs}$-th part of the indicated/configured set of TX frequency subband indexes (and therefore, the corresponding TX frequency subbands) is associated to the $N_{rs}$-th indicated QCL source RS in the TCI state. Alternatively, the UE 116 could be indicated/configured/provided by the network 130, e.g., via higher layer RRC signaling/parameter and/or MAC CE command and/or dynamic DCI based signaling, the association/mapping between the one or more parts in the indicated/configured set of TX frequency subband indexes (and therefore, the corresponding TX frequency subbands) and the QCL source RSs indicated in the corresponding TCI state.

In yet another example, the UE 116 could be indicated/configured/provided by the network 130, e.g., via higher layer RRC signaling/parameter and/or MAC CE command and/or dynamic DCI based signaling, one or more (e.g., $N_{rs}$) bitmaps each for a QCL source RS indicated in the corresponding TCI state. Each bit position/entry in a bitmap could correspond to a TX frequency subband configured/indicated for the corresponding indicated TCI state/pair of TCI states for frequency-selective beam indication for FSBM. If a bit position/entry of a bitmap is set to '1' (or '0'), the TX frequency subband corresponding/associated to the bit position/entry is used/active for the QCL source RS corresponding/associated to the bitmap. The indicated/configured one or more bitmaps and the QCL source RSs indicated in the corresponding TCI state could be one-to-one mapped—e.g., the first indicated/configured bitmap (and therefore, the corresponding TX frequency subbands) is associated with the first indicated QCL source RS in the TCI state, the second indicated/configured bitmap (and therefore, the corresponding TX frequency subbands) is associated to the second indicated QCL source RS in the TCI state, and so on, and the $N_{rs}$-th indicated/configured bitmap (and therefore, the corresponding TX frequency subbands) is associated to the $N_{rs}$-th indicated QCL source RS in the TCI state. Alternatively, the UE 116 could be indicated/configured/provided by the network 130, e.g., via higher layer RRC signaling/parameter and/or MAC CE command and/or dynamic DCI based signaling, the association/mapping between the indicated/configured one or more bitmaps (and therefore, the corresponding TX frequency subbands) and the QCL source RSs indicated in the corresponding TCI state.

In yet another example, the UE 116 could be indicated/configured/provided by the network 130, e.g., via higher layer RRC signaling/parameter and/or MAC CE command and/or dynamic DCI based signaling, a bitmap comprising one or more (e.g., $N_{rs}$) parts each for a QCL source RS indicated in the corresponding TCI state. The partition of the bitmap into the one or more (e.g., $N_{rs}$) parts could be fixed in the system specifications and/or indicated/configured to the UE 116 via higher layer RRC signaling and/or MAC CE command and/or dynamic DCI based signaling. Each bit position/entry in a bitmap could correspond to a TX frequency subband configured/indicated for the corresponding indicated TCI state/pair of TCI states for frequency-selective beam indication for FSBM. If a bit position/entry of a part in the bitmap is set to '1' (or '0'), the TX frequency subband corresponding/associated to the bit position/entry is used/active for the QCL source RS corresponding/associated to the part of the bitmap. The one or more parts in the indicated/configured bitmap and the QCL source RSs indicated in the corresponding TCI state could be one-to-one mapped—e.g., the first part in the indicated/configured bitmap (and therefore, the corresponding TX frequency subbands) is associated to the first indicated QCL source RS in the TCI state, the second part in the indicated/configured bitmap (and therefore, the corresponding TX frequency subbands) is associated to the second indicated QCL source RS in the TCI state, and so on, and the $N_{rs}$-th part of the indicated/configured bitmap (and therefore, the corresponding TX frequency subbands) is associated to the $N_{rs}$-th indicated QCL source RS in the TCI state. Alternatively, the UE 116 could be indicated/configured/provided by the network 130, e.g., via higher layer RRC signaling/parameter and/or MAC CE command and/or dynamic DCI based signaling, the association/mapping between the one or more parts in the indicated/configured bitmap (and therefore, the corresponding TX frequency subbands) and the QCL source RSs indicated in the corresponding TCI state.

In yet another example, the UE 116 could receive from the network 130 one or more (e.g., $N_{rs}$) MAC CE activation commands each activating one or more TX frequency subbands—from all the TX frequency subbands configured/indicated for the indicated TCI state—for a QCL source RS indicated in the corresponding TCI state. For this case, a MAC CE activation command could also contain/include/provide the corresponding source RS resource ID/index.

In yet another example, the UE 116 could receive from the network 130 a MAC CE activation command activating one or more TX frequency subbands—from all the TX frequency subbands configured/indicated for the indicated TCI state—for each of the $N_{rs}$ QCL source RSs indicated in the corresponding TCI state. For instance, the MAC CE activation command could activate a first part of TX frequency subbands—from all the TX frequency subbands configured/indicated for the indicated TCI state, a second part of TX frequency subbands—from all the TX frequency subbands configured/indicated for the indicated TCI state, and so on. The one or more MAC CE activated parts of TX frequency subbands and the QCL source RSs indicated in the corresponding TCI state could be one-to-one mapped—e.g., the first MAC CE activated part of TX frequency subbands is associated with the first indicated QCL source RS in the TCI state, the second MAC CE activated part of TX frequency subbands is associated to the second indicated QCL source RS in the TCI state, and so on, and the $N_{rs}$-th MAC CE activated part of TX frequency subbands is associated to the $N_{rs}$-th indicated QCL source RS in the TCI state. Alternatively, the UE 116 could be indicated/configured/provided by the network 130, e.g., via higher layer RRC signaling/parameter and/or MAC CE command and/or dynamic DCI based signaling, the association/mapping between the MAC CE activated parts of TX frequency subbands and the QCL source RSs indicated in the corresponding TCI state.

In yet another example, the UE 116 could be indicated/configured/provided by the network 130, e.g., via higher layer RRC signaling/parameter and/or MAC CE command and/or dynamic DCI based signaling, the number(s) of TX frequency subbands for one or more of the $N_{rs}$ QCL source RSs indicated in the corresponding TCI state and/or starting RB(s) for one or more of the $N_{rs}$ QCL source RSs indicated in the corresponding TCI state.

In yet another example, one more examples described herein and/or combinations of one more examples described herein could be used/configured for configuring/indicating the TX frequency subband(s) for a QCL source RS indicated in a TCI state.

For an indicated TCI state/pair of TCI states, and therefore, the corresponding (QCL) source RS(s) indicated therein, the UE 116 could be indicated/configured/provided by the network 130, e.g., via higher layer RRC signaling/parameter and/or MAC CE command and/or dynamic DCI based signaling, the target channel(s)/signal(s) for one or more of the TX frequency subbands configured/indicated for the corresponding indicated TCI state/pair of TCI states/QCL source RS for frequency-selective beam indication for FSBM (the configuration/indication of the TX frequency subband(s) for frequency-selective beam indication for FSBM is discussed in one more examples described herein).

In one example, the channels/signals such as PDSCH and PUSCH that are associated with a TX frequency subband (e.g., the frequency domain resource allocation/assignment indicated in the corresponding FD-RA field(s) for the PDSCH/PUSCH is identical to the TX frequency subband) could follow the QCL assumption provided by the QCL source RS/TCI state corresponding/associated to the TX frequency subband.

In another example, the UE 116 could be indicated/configured/provided by the network 130, e.g., via higher layer RRC signaling/parameter and/or MAC CE command and/or dynamic DCI based signaling, the target channel(s)/signal(s) for each of the TX frequency subbands configured/indicated for the corresponding indicated TCI state/pair of TCI states/QCL source RS(s) for frequency-selective beam indication for FSBM.

In yet another example, the UE 116 could be indicated/configured/provided by the network 130, e.g., via higher layer RRC signaling/parameter and/or MAC CE command and/or dynamic DCI based signaling, the (same) target channel(s)/signal(s) for a subset of the TX frequency subbands configured/indicated for the corresponding indicated TCI state/pair of TCI states/QCL source RS(s) for frequency-selective beam indication for FSBM.

In yet another example, the UE 116 could be indicated/configured/provided by the network 130, e.g., via higher layer RRC signaling/parameter and/or MAC CE command and/or dynamic DCI based signaling, one or more TX frequency subbands (and therefore, the corresponding TCI state(s)/pair(s) of TCI states/QCL source RS(s)) for a target channel/signal.

In yet another example, the UE 116 could be may be indicated/configured/provided by the network 130, e.g., via higher layer RRC signaling/parameter and/or MAC CE command and/or dynamic DCI based signaling, one or more TX frequency subbands (and therefore, the corresponding TCI state(s)/pair(s) of TCI states/QCL source RS(s)) for one or more target channels/signals that are linked, e.g., via RRC signaling.

The UE 116 could also be indicated/configured/provided by the network 130, e.g., via higher layer RRC signaling/parameter and/or MAC CE command and/or dynamic DCI based signaling, one or more UL frequencies/frequency subbands each corresponding/associated to one or more TX frequency subbands indicated/configured for one or more TCI states/pairs of TCI states/QCL source RSs according to one more examples described herein.

Figure 10:
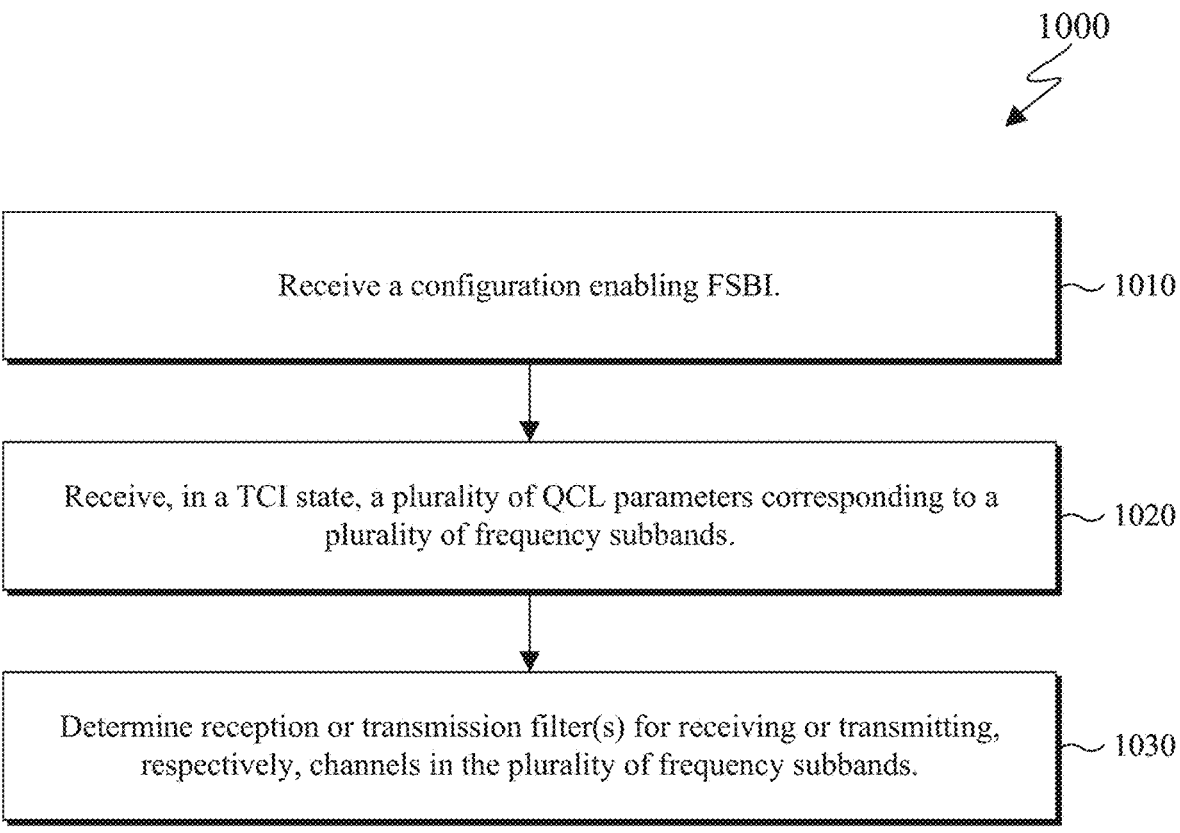
FIG. 10 illustrates an example method performed by a UE in a wireless communication system according to embodiments of the present disclosure.

FIG. 10 illustrates an example method 1000 performed by a UE in a wireless communication system according to embodiments of the present disclosure. The method 1000 of FIG. 10 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1000 is for illustration only and other embodiments can be used without departing from the scope of the present disclosure.

The method 1000 begins with the UE receiving a configuration enabling FSBI (1010). For example, in 1010, the configuration corresponds to at least one of a higher layer parameter FreqSelectiveBeamIndication configured or enabled for the TCI state, a FSBI indicator enabled for a higher layer configured list of TCI states that includes the TCI state, the FSBI indicator enabled for one or more TCI states activated by medium access control (MAC) control element (CE) that includes the TCI state, and the FSBI indicator enabled for downlink control information (DCI) that indicates the TCI state.

The UE then receives, in a TCI state, a plurality of QCL parameters corresponding to a plurality of frequency subbands (1020). For example, in 1020, a QCL parameter among the plurality of QCL parameters includes a RS of a QCL type, the RS corresponds to a SSB or a CSI-RS, the QCL type corresponds to 'typeA', 'typeB', 'typeC' or 'typeD', and the QCL parameter is associated with a frequency subband from the plurality of frequency subbands, according to: a fixed rule in system specifications or a network configuration or indication received via RRC signaling, a MAC-CE, or DCI. In various embodiments, the network configuration or indication includes at least one of: indexes or identities (IDs) of the plurality of frequency subbands and corresponding QCL parameters included in the TCI state, an index or ID of the frequency subband in a higher layer parameter that configures the QCL parameter, and indexes or IDs of the plurality of frequency subbands and corresponding QCL parameters included in DCI that provides the TCI state. In various embodiments, the UE may also receive information of the plurality of frequency subbands, where the information corresponds to at least one of: a bitmap corresponding to a frequency subband among the plurality of frequency subbands, identities (IDs) of the plurality of frequency subbands, and index of the frequency subband among the plurality of frequency subbands. Where, when the information corresponds to the bitmap and when an entry of the bitmap is set to '1', a corresponding frequency subband belongs to the plurality of frequency subbands.

The UE then determines, based on the plurality of frequency subbands and the plurality of QCL parameters, one or more reception or transmission filters for receiving or transmitting, respectively, channels in the plurality of frequency subbands (1030). For example, in 1030, the UE determines, based on the RS, a downlink receive spatial filter for receiving a PDSCH, a PDCCH, or a CSI-RS in the frequency subband corresponding to the QCL parameter and the UE determines, based on the RS, an uplink transmission spatial filter for transmitting a PUSCH, a PUCCH, or a SRS in the frequency subband corresponding to the QCL parameter. In various embodiments, the UE receives one or more TCI states corresponding to the plurality of frequency subbands and determines, based on the plurality of frequency subbands and the one or more TCI states, the one or more reception or transmission filters for receiving or transmitting, respectively, at least dedicated channels in the plurality of frequency subbands. For example, each of the one or more TCI states includes a RS of a QCL type, the RS corresponds to a SSB or a CSI-RS, and the QCL type corresponds to 'typeA', 'typeB', 'typeC' or 'typeD'. For example, a TCI state from the one or more TCI states corresponds to a frequency subband according to one of a fixed rule in system specifications or an indication of indexes or IDs of one or more frequency subbands corresponding to the TCI state and the one or more TCI states are provided by DCI.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Any of the above variation embodiments can be utilized independently or in combination with at least one other variation embodiment.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE), comprising:
a transceiver configured to:
    receive a configuration enabling frequency selective beam indication (FSBI), and
    receive, in a transmission configuration indication (TCI) state, a plurality of quasi co-location (QCL) parameters corresponding to a plurality of frequency subbands; and
a processor operably coupled to the transceiver, the processor configured to determine, based on the plurality of frequency subbands and the plurality of QCL parameters, one or more reception or transmission filters for receiving or transmitting, respectively, channels in the plurality of frequency subbands.

2. The UE of claim 1, wherein the configuration corresponds to at least one of:
a higher layer parameter FreqSelectiveBeamIndication configured or enabled for the TCI state,
a FSBI indicator enabled for a higher layer configured list of TCI states that includes the TCI state,
the FSBI indicator enabled for one or more TCI states activated by medium access control (MAC) control element (CE) that includes the TCI state, and
the FSBI indicator enabled for downlink control information (DCI) that indicates the TCI state.

3. The UE of claim 1, wherein:
a QCL parameter among the plurality of QCL parameters includes a reference signal (RS) of a QCL type,
the RS corresponds to a synchronization signal block (SSB) or a channel state information RS (CSI-RS),
the QCL type corresponds to 'typeA', 'typeB', 'typeC' or 'typeD', and
the QCL parameter is associated with a frequency subband from the plurality of frequency subbands, according to:
    a fixed rule in system specifications, or
    a network configuration or indication received via radio resource control (RRC) signaling, a medium access control (MAC) control element (CE), or downlink control information (DCI).

4. The UE of claim 3, wherein the network configuration or indication includes at least one of:
indexes or identities (IDs) of the plurality of frequency subbands and corresponding QCL parameters included in the TCI state,
an index or ID of the frequency subband in a higher layer parameter that configures the QCL parameter, and
indexes or IDs of the plurality of frequency subbands and corresponding QCL parameters included in DCI that provides the TCI state.

5. The UE of claim 3, wherein the processor is further configured to:
determine, based on the RS, a downlink receive spatial filter for receiving a physical downlink shared channel (PDSCH), a physical downlink control channel (PDCCH), or a CSI-RS in the frequency subband corresponding to the QCL parameter; and
determine, based on the RS, an uplink transmission spatial filter for transmitting a physical uplink shared channel (PUSCH), a physical uplink control channel (PUCCH), or a sounding reference signal (SRS) in the frequency subband corresponding to the QCL parameter.

6. The UE of claim 1, wherein:
the transceiver is further configured to receive information of the plurality of frequency subbands,
the information corresponds to at least one of:
    a bitmap including entries respectively corresponding to a frequency subband in a frequency band,
    identities (IDs) of the plurality of frequency subbands, and
    an index of the frequency subband among the plurality of frequency subbands, and
when the information corresponds to the bitmap and when an entry of the bitmap is set to '1', a corresponding frequency subband belongs to the plurality of frequency subbands.

7. The UE of claim 1, wherein:
the transceiver is further configured to receive one or more TCI states corresponding to the plurality of frequency subbands,
the processor is further configured to determine, based on the plurality of frequency subbands and the one or more TCI states, the one or more reception or transmission filters for receiving or transmitting, respectively, at least dedicated channels in the plurality of frequency subbands,
each of the one or more TCI states includes a reference signal (RS) of a QCL type,
the RS corresponds to a synchronization signal block (SSB) or a channel state information RS (CSI-RS), and
the QCL type corresponds to 'typeA', 'typeB', 'typeC' or 'typeD'.

8. The UE of claim 7, wherein:
a TCI state from the one or more TCI states corresponds to a frequency subband according to one of:
    a fixed rule in system specifications, or
    an indication of indexes or IDs of one or more frequency subbands corresponding to the TCI state, and
the one or more TCI states are provided by downlink control information (DCI).

9. A base station (BS), comprising:
a transceiver configured to:
    transmit a configuration enabling frequency selective beam indication (FSBI), and
    transmit, in a transmission configuration indication (TCI) state, a plurality of quasi co-location (QCL) parameters corresponding to a plurality of frequency subbands; and
a processor operably coupled to the transceiver, the processor configured to determine, based on the plurality of frequency subbands and the plurality of QCL parameters, one or more reception or transmission filters for receiving or transmitting, respectively, channels in the plurality of frequency subbands.

10. The BS of claim 9, wherein the configuration corresponds to at least one of:

a higher layer parameter FreqSelectiveBeamIndication configured or enabled for the TCI state, a FSBI indicator enabled for a higher layer configured list of TCI states that includes the TCI state, the FSBI indicator enabled for one or more TCI states activated by medium access control (MAC) control element (CE) that includes the TCI state, and the FSBI indicator enabled for uplink control information (UCI) that indicates the TCI state.

11. The BS of claim 9, wherein:

a QCL parameter among the plurality of QCL parameters includes a reference signal (RS) of a QCL type, the RS corresponds to a synchronization signal block (SSB) or a channel state information RS (CSI-RS), the QCL type corresponds to 'typeA', 'typeB', 'typeC' or 'typeD', and the QCL parameter is associated with a frequency subband from the plurality of frequency subbands, according to:

a fixed rule in system specifications, or a network configuration or indication transmitted via radio resource control (RRC) signaling, a medium access control (MAC) control element (CE), or uplink control information (UCI).

12. The BS of claim 11, wherein the network configuration or indication includes at least one of:

indexes or identities (IDs) of the plurality of frequency subbands and corresponding QCL parameters included in the TCI state, an index or ID of the frequency subband in a higher layer parameter that configures the QCL parameter, and indexes or IDs of the plurality of frequency subbands and corresponding QCL parameters included in UCI that provides the TCI state.

13. The BS of claim 11, wherein:

the transceiver is further configured to transmit one or more TCI states corresponding to the plurality of frequency subbands, the processor is further configured to determine, based on the plurality of frequency subbands and the one or more TCI states, the one or more reception or transmission filters for receiving or transmitting, respectively, at least dedicated channels in the plurality of frequency subbands, each of the one or more TCI states includes a reference signal (RS) of a QCL type, the RS corresponds to a synchronization signal block (SSB) or a channel state information RS (CSI-RS), and the QCL type corresponds to 'typeA', 'typeB', 'typeC' or 'typeD'.

14. A method performed by a user equipment (UE), the method comprising:

receiving a configuration enabling frequency selective beam indication (FSBI);

receiving, in a transmission configuration indication (TCI) state, a plurality of quasi co-location (QCL) parameters corresponding to a plurality of frequency subbands; and determining, based on the plurality of frequency subbands and the plurality of QCL parameters, one or more reception or transmission filters for receiving or transmitting, respectively, channels in the plurality of frequency subbands.

15. The method of claim 14, wherein the configuration corresponds to at least one of:

a higher layer parameter FreqSelectiveBeamIndication configured or enabled for the TCI state, a FSBI indicator enabled for a higher layer configured list of TCI states that includes the TCI state, the FSBI indicator enabled for one or more TCI states activated by medium access control (MAC) control element (CE) that includes the TCI state, and the FSBI indicator enabled for downlink control information (DCI) that indicates the TCI state.

16. The method of claim 14, further comprising:

a QCL parameter among the plurality of QCL parameters includes a reference signal (RS) of a QCL type, the RS corresponds to a synchronization signal block (SSB) or a channel state information RS (CSI-RS), the QCL type corresponds to 'typeA', 'typeB', 'typeC' or 'typeD', and the QCL parameter is associated with a frequency subband from the plurality of frequency subbands, according to:

a fixed rule in system specifications, or a network configuration or indication received via radio resource control (RRC) signaling, a medium access control (MAC) control element (CE), or uplink control information (UCI).

17. The method of claim 16, wherein the network configuration or indication includes at least one of:

indexes or identities (IDs) of the plurality of frequency subbands and corresponding QCL parameters included in the TCI state, an index or ID of the frequency subband in a higher layer parameter that configures the QCL parameter, and indexes or IDs of the plurality of frequency subbands and corresponding QCL parameters included in DCI that provides the TCI state.

18. The method of claim 16, wherein determining the one or more reception or transmission filters for receiving or transmitting, respectively, the channels in the plurality of frequency subbands further comprises:

determining, based on the RS, a downlink receive spatial filter for receiving a physical downlink shared channel (PDSCH), a physical downlink control channel (PDCCH), or a CSI-RS in the frequency subband corresponding to the QCL parameter; and determining, based on the RS, an uplink transmission spatial filter for transmitting a physical uplink shared channel (PUSCH), a physical uplink control channel (PUCCH), or a sounding reference signal (SRS) in the frequency subband corresponding to the QCL parameter.

19. The method of claim 14, further comprising:

receiving information of the plurality of frequency subbands, the information corresponds to at least one of:

a bitmap including entries respectively corresponding to a frequency subband in a frequency band, identities (IDs) of the plurality of frequency subbands, and an index of the frequency subband among the plurality of frequency subbands, and when the information corresponds to the bitmap and when an entry of the bitmap is set to '1', a corresponding frequency subband belongs to the plurality of frequency subbands.

20. The method of claim 14, further comprising:

receiving one or more TCI states corresponding to the plurality of frequency subbands, wherein determining the one or more reception or transmission filters for receiving or transmitting, respectively, the channels in the plurality of frequency subbands further comprises determining, based on the plurality of frequency subbands and the one or more TCI states, the one or more reception or transmission filters for receiving or transmitting, respectively, at least dedicated channels in the plurality of frequency subbands, wherein each of the one or more TCI states includes a reference signal (RS) of a QCL type, wherein the RS corresponds to a synchronization signal block (SSB) or a channel state information RS (CSI-RS), and wherein the QCL type corresponds to 'typeA', 'typeB', 'typeC' or 'typeD'.

\* \* \* \* \*